US006822606B2

(12) United States Patent
Ponsford et al.

(10) Patent No.: US 6,822,606 B2
(45) Date of Patent: Nov. 23, 2004

(54) SYSTEM AND METHOD FOR SPECTRAL GENERATION IN RADAR

(75) Inventors: Tony Ponsford, Waterloo (CA); Reza Dizaji, Waterloo (CA)

(73) Assignee: Raytheon Canada Limited, Waterloo ( * ) Notice: Subject to any disclaimer, the term of this patent is extended or adjusted under 35 U.S.C. 154(b) by 0 days.

(21) Appl. No.: 10/383,775

(22) Filed: Mar. 7, 2003

(65) Prior Publication Data

US 2004/0178951 A1 Sep. 16, 2004

Related U.S. Application Data

(60) Provisional application No. 60/365,163, filed on Mar. 19, 2002, and provisional application No. 60/363,556, filed on Mar. 13, 2002.

(51) Int. Cl.[7] .......................... G01S 13/00; G01S 13/95
(52) U.S. Cl. .......................... 342/192; 342/26; 342/89; 342/159; 342/175; 342/195; 342/94
(58) Field of Search ............................... 342/159, 165, 342/166–175, 192–197, 378–384, 89–103, 26; 708/801

(56) References Cited

U.S. PATENT DOCUMENTS

| | | | |
|---|---|---|---|
| 4,549,183 A | | 10/1985 | Farina |
| 4,862,180 A | * | 8/1989 | Martin ...................... 342/192 |
| 4,937,584 A | * | 6/1990 | Gabriel et al. .............. 342/378 |
| 5,262,785 A | | 11/1993 | Silverstein et al. |
| 5,262,789 A | | 11/1993 | Silverstein |
| 5,473,332 A | | 12/1995 | James et al. |
| 5,617,099 A | | 4/1997 | Warren et al. |
| 5,760,734 A | * | 6/1998 | Urkowitz ................... 342/159 |
| 5,786,788 A | | 7/1998 | Schober et al. |
| 5,892,700 A | * | 4/1999 | Haardt ...................... 708/801 |
| 5,945,940 A | * | 8/1999 | Cuomo ....................... 342/90 |

FOREIGN PATENT DOCUMENTS

EP 0 554 512 A1 8/1993

OTHER PUBLICATIONS

K.F. McDonald et al., "Performance Characterization of STAP Algorithms with Mismatched Steering and Clutter Statistics", IEEE Proceedings, Oct. 2000, pp. 646–650.
A.J. Zejak et al., "Doppler Optimised Mismatched Filters", Electrocics Letters IEE Stevenage, Mar. 1991, pp. 558–560.
Copy of International Search Report from PCT/US03/06895 dated Oct. 16, 2003.
Haimovich A., "The eigencanceler: A New Space–Time Interference Canceler", Proceedings of the National Radar Conference, Mar. 1994, pp. 194–199.
Copy of International Search Report from PCT/US03/06895; ISA–EPO; Dated Jul. 29, 2003.

* cited by examiner

*Primary Examiner*—Bernarr Earl Gregory
(74) *Attorney, Agent, or Firm*—Daly, Crowley & Mofford, LLP

(57) ABSTRACT

This invention relates to a spectral generator and a spectral generation method for receiving pre-processed range-doppler-sensor data and generating at least one noise-reduced high-resolution spectrum therefrom. The spectral generator comprises a window generator that generates a window which defines a plurality of range-doppler cells. The spectral generator further comprises a covariance matrix calculator that is in communication with the window generator to receive the range-doppler-sensor data within the window and calculate a covariance matrix estimate for a range-doppler cell of interest in the window. The spectral generator also includes a spectral calculator that is in communication with the covariance matrix calculator to calculate a high-resolution spectral vector based on a location matrix and a noise subspace matrix estimate.

50 Claims, 45 Drawing Sheets

SYSTEM AND METHOD FOR SPECTRAL GENERATION IN RADAR

CROSS REFERENCE TO RELATED APPLICATIONS

This application claims priority under 35 U.S.C. §119 (e) to provisional application Ser. No. 60/363,556 filed Mar. 13, 2002, and to provisional application Ser. No. 60/365,163 filed Mar. 19, 2002, the disclosures of which are hereby incorporated by reference.

FIELD OF THE INVENTION

This invention relates to signal processing methods for spectral generation in radar data, and in particular, to spectral generation methods having noise reduction properties for radar data.

BACKGROUND OF THE INVENTION

High Frequency Surface Wave Radar (HFSWR) is effective for the continuous detection and tracking of ships, aircraft, icebergs and other surface targets from a shore based location. HFSWR is currently being used to enhance search and rescue activities as well as to monitor sea state, illegal immigration, drug trafficking, illegal fishing, smuggling and piracy.

An HFSWR system is installed along a coastal line and includes a directional transmitting antenna that is directed towards the ocean and a directional receiving antenna array that is directed towards the ocean, as well as the hardware and software needed for system operation. The transmitting antenna generates a train of electromagnetic (EM) pulses which illuminate a desired surveillance area. The receiving antenna array is calibrated to have equal gain and phase over the entire surveillance area. Objects in the surveillance area then reflect the EM pulses towards the receiving antenna array which collects radar data. Some of the objects may be elements that must be detected (the radar signatures from these elements are referred to as "targets") while the rest of the objects are elements that do not have to be detected (the radar signatures from these elements are referred to as "clutter" which is one type of noise in a radar system). More sophisticated pulse-coded or frequency-coded EM pulses may be used to combat range-wrap which occurs when a reflected EM pulse (in response to a previously transmitted EM pulse) is received by the receiving antenna array after subsequent EM pulses have been transmitted.

Conventionally, the radar data collected from each antenna element or sensor in the receiving antenna array is preprocessed by passing the data through a bandpass filter to filter extraneous unwanted signals in the radar data, and then through a heterodyne receiver which demodulates the radar data from the RF band to an IF band where analog to digital conversion occurs. The radar data is then demodulated to the baseband where low-pass filtering and downsampling occurs. The radar data collected by the receiving antenna array is complex (i.e. has real and imaginary components). Accordingly, the downsampled radar data is also complex and each of the signal processing components required to perform the above-mentioned operations are implemented to handle complex data.

The downsampled radar data is then processed by a matched filter that has a transfer function or impulse response that is related to the transmitted EM pulse. The matched filtered radar data is then separated into segments for analysis. Each segment is known in the art as a coherent integration time (CIT) or a dwell. The matched filtered radar data in each CIT is range-aligned by noting the time at which each data point was sampled relative to the time that a preceding EM pulse was transmitted. The range-aligned data may then be subjected to a combination of low-pass filtering for further noise reduction and downsampling for more efficient signal processing. The output of this processing is a plurality of time samples of range data where each time sample series corresponds to a range value. The maximum range value for which the plurality of time series is collected depends on the pulse repetition interval used in transmitting the EM pulses (i.e. the frequency at which EM pulses are transmitted).

A target is detected from range, doppler and azimuth information that is generated from the preprocessed recorded radar data. The range information is used to provide an estimate of the targets distance from the receiving antenna array. The azimuth information is used to provide an estimate of the angle of the target's location with respect to the center of the receiving antenna array, and the doppler information is used to provide an estimate of the target's radial velocity by measuring the target's doppler shift. The target's doppler shift is related to the change in frequency content of the EM pulse that is reflected by the target with respect to the original frequency content of that EM pulse.

As mentioned previously, range data is generated by noting the time at which data is sampled relative to the time at which a preceding EM pulse is transmitted. Doppler processing corresponds to the detection of a frequency shift $\Delta f$ at the EM pulse signal frequency that is due to a reflection from a target. Accordingly, doppler information is generated for a given range value by subjecting the time series obtained for that range value to comb filter processing, filter bank processing or FFT (Fast Fourier Transform) processing. The azimuth data is conventionally obtained by digital beamforming. More specifically, the radar data at a given range cell and a given doppler cell is weighted by a complex exponential for each antenna element of the receiving antenna array and then summed across all antenna elements. The phase of the complex exponential is related to an azimuth angle, the antenna element spacing and the wavelength of the transmitted EM pulses as is well known to those skilled in the art. Beamforming gives the appearance that the antenna array is tuned to a certain region of the surveillance area defined by the azimuth value used in the complex exponential weights. In this fashion, many beams may be formed to simultaneously cover the entire surveillance area.

To determine a target's range, azimuth and velocity, a detector processes the generated range, azimuth and doppler information for a given CIT. In general, the detector looks for peaks at a given cell (i.e. a data value or pixel) in a two-dimensional plot known as a range-doppler plot. Target detection usually comprises comparing the amplitude in a given cell with the average amplitude in neighboring cells. The detected targets are then forwarded to a plot extractor which filters the detected targets to reject all of those detections that do not conform to the range, doppler and azimuth properties that are expected for a true target. These filtered targets are then forwarded to a tracker which associates successive detections of a given target to form a track for the target. In this fashion, the movement of a detected target may be tracked throughout the surveillance area.

The detection process is hindered by the addition of noise, which includes the clutter previously mentioned, in each cell. This may result in the missed detection of a target or the false detection of noise as a target. The noise is problematic since there will be a varying noise level in different cells as well as for radar data collected in different CITs, in different sea-state conditions, during different times of day and season and at different locations. The major sources of radar noise include self-interference, such as ocean clutter, ionospheric clutter and meteoroid clutter, and external interference such as co-channel interference, atmospheric interference and impulsive noise. Self-interference results from the operation of the radar while external interference is independent of radar operation.

Ionospheric clutter is one of the most significant causes of interference and is difficult to suppress due to its target-like nature and high signal amplitude. Ionospheric clutter includes EM pulses that reflect off of the earth's ionosphere and return directly to the radar (i.e. near vertical incidence clutter), and EM pulses that bounce off of the ionosphere, reflect from the ocean and return to the radar along the reverse path (i.e. sky-wave self-interference clutter also referred to as range-wrap clutter). In general, ionospheric clutter accumulates in an annular band spanning narrow bands of range cells, all azimuth cells and most of the ship doppler band. This narrow band of range cells corresponds to the height or multiple heights of the ionospheric layers relative to the HFSWR installation site. Near vertical incidence ionospheric clutter is also characterized as being very strong, isolated in range and smeared in the doppler dimension over many milli-Hertz. During the night, ionospheric clutter is at its highest level due to the disappearance of the ionospheric D layer and the merging of the ionospheric F1 and F2 layers. Furthermore, the characteristics of ionospheric clutter vary with season and other environmental parameters so it is not easy to introduce a robust method to suppress ionospheric noise.

To combat range-wrap clutter, Frank complementary codes may be used as is known to those skilled in the art. Another known solution is to operate the radar system at a higher frequency that does not support sky-wave propagation. By increasing the carrier frequency of the transmitted EM pulses above the layer-critical frequency, the transmitted EM pulses will penetrate through the ionospheric layers. However, this approach may decrease the performance of the radar system in detecting ships at long range due to the greater propagation loss that is incurred at higher transmission frequencies.

The sea surface comprises a number of waves having different wavelengths and amplitudes. Ocean clutter results from EM pulses that are reflected by ocean waves that are harmonics of the radar wavelength. Two large peaks that dominate ocean clutter are referred to as Bragg lines which appear as two columns of peaks in a range-doppler plot along all range cells at doppler frequencies determined by the radar operating frequency. The Bragg lines can smear radar detection performance at their corresponding doppler frequencies. However, there is also higher order scatter, related to the sea-state, that results in additional peaks and a continuum of ocean clutter between the Bragg lines. This continuum of ocean clutter contains energy that is related to the sea-state (i.e. surface wind speed and duration) and often limits the detection of small, low-speed targets such as ships. In addition, the ocean clutter has shown very poor spatial correlation.

Meteoroid clutter results from meteoroids which are small meteor particles that penetrate the Earth's atmosphere and generate ionization trails that produce transient radar returns. A transient meteoroid radar return usually appears as a large peak at a specific range. Meteoroid clutter results in an increase of the background noise level in range-doppler plots.

Co-channel interference results from both local and distant users of the HFSWR frequency band, such as television broadcasters. This interference has directionality since it originates from spatially correlated sources. However, due to multiple reflections in non-uniform ionospheric layers, the direction of arrival of co-channel interference is wide as can be seen from radar data with co-channel interference shown in FIG. 1. Co-channel interference is also range independent and occurs at specific doppler frequency ranges as can be seen from another sample of radar data shown in FIG. 2. Co-channel interference may be avoided by choosing alternate carrier frequencies for transmitting the EM pulses. However, co-channel interference from distant sources poses a more serious problem since this interference is random in time and frequency. Furthermore, there is typically greater co-channel interference at night than during the day due to the lack of D layer absorption during the night.

Atmospheric interference is spatially white with a level that varies as a function of frequency, time of day, season and geographical location. For instance, the noise level due to atmospheric interference at the lower end of the HF band, increases about 20 dB during the night in comparison with daytime levels.

Impulsive noise is due to lightning and manifests itself as a sequence of rapid pulses that are randomly distributed in time and have an amplitude with a large dynamic range. This can be seen in FIG. 3 which shows a sequence of radar returns plotted versus transmitted EM pulse number (or pulse index) for a given range value. Impulsive noise, shown in FIG. 4, is not spatially white and results from both local and distant storms. Impulsive noise usually occurs throughout the daily operation of an HFSWR system. Impulsive noise results in an increase in the background noise level. The frequency characteristics of impulsive noise change as a function of the intensity of local storm activity.

Needless to say, detection is a very important part of a radar system, and is compromised by the various types of noise described above. Accordingly, to improve detection, these various forms of noise must be suppressed preferably before or during the generation of the range-doppler plot (i.e. spectral estimation) on which detection is usually performed.

For instance, it is known in the prior art that detection in these various forms of interference can be improved by distributing the interference energy over a larger number of cells in the range-doppler plot. This is achieved by improving the range, doppler or azimuth resolution during spectral estimation. However, range resolution is determined by the bandwidth of the transmitted signal and is usually restricted whereas doppler resolution is determined by the CIT which is also limited. Furthermore, azimuth resolution is limited by the aperture size of the receiving antenna array (i.e. the physical size of the receiving antenna array).

One technique that has been introduced to circumvent these restrictions on resolution is the use of high-resolution spectral estimators to increase azimuthal resolution. However, a statistically robust estimation of the covariance matrix of the radar data is required to obtain good results. The estimation of the covariance matrix should also compensate for the various types of radar noise while enhancing the signal contribution to the covariance matrix estimate. Failure to achieve this will result in a range-doppler plot in which the noise will obscure the target and compromise target detection. Accordingly, there is a need for a high-resolution spectral estimator that is statistically robust, can suppress noise and enhance possible targets in the radar data.

Other prior art noise suppression methods have been directed towards external interference cancellation techniques by exploiting the directional characteristics of external interference signals. These techniques employ a main antenna or a main antenna array to obtain radar data for potential targets and external interference, and an auxiliary antenna or an auxiliary antenna array to estimate the external interference only. However, these methods require additional hardware. Specifically, these methods require an auxiliary antenna or an auxiliary antenna array. One prior art solution to this problem involves using a receiving antenna array in which some of the array elements are used as the main antenna array and some of the array elements are used as the auxiliary array. However, this results in a main antenna array having a smaller aperture which degrades azimuthal resolution. Accordingly, there is a need for a method of suppressing external interference without requiring the additional hardware of an auxiliary antenna array and without degrading the azimuthal resolution of the main antenna array.

Other challenges in radar detection include properties that vary across targets such as target type and target velocity. For instance, surface targets, such as ships, appear larger on a range-doppler plot than air targets, such as planes, for a given range and doppler resolution. In addition, air targets are usually much faster than surface targets. This is important since a target whose radial velocity changes within a given CIT has spectral components that are smeared over several Doppler bins. Accordingly, there is also a need for signal processing methods which recognize that targets have varying properties and adapt based on these properties to enhance the appearance of targets on a range-doppler plot.

SUMMARY OF THE INVENTION

The inventors of the present invention have developed several embodiments of a system and method of spectral generation and noise suppression to produce range-doppler plots in which potential targets are enhanced. The inventors have developed the systems and methods of the present invention based on the fact that different classes of targets provide different radar signatures on a range-doppler plot although each radar signature has a peaked shape. Furthermore, targets are statistically independent of the various forms of clutter and have radar signatures with strong spatial correlation provided that the signal-to-clutter ratio is sufficient. In addition, the inventors have recognized that various forms of clutter have varying degrees of spatial correlation. For instance ocean clutter (first and higher order) mostly has poor spatial correlation whereas ionospheric clutter has strong spatial correlation.

The inventors have determined that a high-resolution spectral estimator that separates the radar data into signal and noise subspaces may be used to suppress ocean clutter since the ocean clutter appears mainly in the noise subspace due to poor spatial correlation. Furthermore, if the azimuth of ionospheric clutter is different than the azimuth of a possible target, then the high-resolution spectral estimator should be able to distinguish between the ionospheric clutter and the radar signature from the possible target because of the absence of sidelobes in high-resolution spectral estimators. However, robust covariance matrix estimation is needed in order for the high-resolution spectral estimator to enhance radar signatures from targets. The inventors have based covariance matrix estimation on a weighted average of the covariance matrices of range-doppler cells that are in a neighborhood of the range-doppler cell for which a high-resolution spectral vector is generated. The high resolution spectral estimator uses at least a portion of the noise subspace to form a high resolution spatial estimate.

One disadvantage of conventional subspace-based spectral estimators is obtaining good results at low signal-to-clutter (SCR) ratios. The inventors have found that one solution is to reduce the noise subspace dimension by involving only those eigenvectors that correspond to smaller singular values and hence lie more toward spatially white noise. Another approach is to incorporate spatial smoothing on the covariance matrix estimate that is used by the subspace-based spectral estimator to generate a high-resolution spatial vector. The spatial smoothing may be based on any one of forward spatial smoothing, backward spatial smoothing or forward/backward spatial smoothing.

As mentioned previously, another important class of interference is external interference. The inventors of the present invention have developed a module and a method based on a combination of adaptive array processing and matched/mis-matched filtering that is used to suppress external interference. The module may be combined with the spectral generator to provide enhanced high-resolution range-doppler plots. The data recorded by a main sensor array is communicated to matched and mis-matched filter modules in the noise suppression module. The matched filter module provides matched radar data that contains radar returns from possible targets, self-interference and external interference while the mis-matched filter module provides mis-matched radar data that contains only external interference. Accordingly, a virtual auxiliary sensor array may be constructed based on the mis-matched radar data to provide radar data to an adaptive beamformer. The adaptive beamformer preferably generates Wiener-based weights that are applied to the mis-matched radar data to produce an auxiliary beam that provides an estimate of the external interference in the matched radar data for each sensor in the main sensor array that recorded radar data. The external interference estimate is then removed from the recorded radar data for each of the aforementioned sensors to provide noise suppressed range-doppler-sensor radar data. This data may then be provided to the spectral generator of the present invention to produce high-resolution range-doppler plots in which external interference has been suppressed.

Accordingly, in one aspect, the present invention is a spectral generator for radar which receives pre-processed range-doppler-sensor data and generates at least one noise-reduced high-resolution spectrum. The spectral generator comprises a window generator that generates a window which defines a plurality of range-doppler cells. The spectral generator further comprises a covariance matrix calculator that is in communication with the window generator. The covariance matrix calculator receives the range-doppler-sensor data and calculates a covariance matrix estimate for a range-doppler cell of interest in the window. The covariance matrix estimate is calculated from covariance matrices calculated for at least a portion of the plurality of range-doppler cells in the window that are around the range-doppler cell of interest. The spectral generator also includes a spectral calculator that is in communication with the covariance matrix calculator to calculate a high-resolution spectral vector based on a location matrix and a noise subspace matrix estimate.

The spectral generator may further include a covariance matrix smoother that is in communication with the covariance matrix calculator. The covariance matrix smoother smoothes the covariance matrix estimate.

The spectral generator may further include a noise suppression module that is in communication with the covariance matrix calculator to provide noise suppressed radar data instead of the pre-processed range-doppler-sensor data to the covariance matrix calculator. The noise suppression module estimates external interference in the pre-processed radar data and suppresses the external interference in the pre-processed radar data to produce the noise suppressed radar data.

In another aspect, the present invention provides a method of spectral generation for radar. The method comprises:

a) generating a window that defines a plurality of range-doppler cells;

b) calculating a covariance matrix estimate for a range-doppler cell of interest in the window from pre-processed range-doppler-sensor data, wherein the covariance matrix estimate is generated from covariance matrices calculated for at least a portion of the plurality of range-doppler cells within the window; and, c) calculating a high-resolution spectral vector based on a location matrix and a noise subspace matrix estimate. The noise subspace matrix estimate is derived from the covariance matrix estimate.

The spectral generation method may further comprise smoothing the covariance matrix estimate and calculating the noise subspace matrix based on the smoothed covariance matrix estimate.

The spectral generation method may further comprise a step of suppressing noise to provide noise suppressed radar data instead of the pre-processed range-doppler-sensor data. The step of suppressing noise is effected by estimating external interference in the pre-processed radar data and suppressing the external interference in the pre-processed radar data to produce the noise suppressed radar data.

In another aspect, the present invention provides a noise suppression module for suppressing external interference in pre-processed radar data. The noise suppression module comprises a first processing module and a second processing module that are in communication with the pre-processed radar data. The first processing module receives the pre-processed radar data and produces matched radar data whereas the second processing module receives the pre-processed radar data and produces mis-matched radar data. The noise suppression module further comprises an adaptive beamformer that is in communication with the first processing module and the second processing module. The adaptive beamformer receives a portion of matched radar data and a portion of mis-matched radar data, and produces an external interference estimate of the external interference in the portion of matched radar data. The noise suppression module further comprises a suppressor that is in communication with the first processing module and the adaptive beamformer. The suppressor provides a portion of the noise suppressed radar data based on the portion of matched radar data and the external interference estimate.

The noise suppression module may further comprise an ordered-statistics filter module that is in communication with the first processing module. The ordered-statistics filter module produces ordered-statistics filtered matched radar data.

In a further aspect, the present invention provides a method of suppressing external interference in pre-processed radar data. The method comprises:

a) processing the pre-processed radar data to produce matched radar data;

b) processing the pre-processed radar data to produce mis-matched radar data;

c) selecting a portion of the matched radar data and a portion of the mis-matched radar data and performing adaptive beamforming to produce an estimate of the external interference in the portion of matched radar data; and, d) producing a portion of the noise suppressed radar data by suppressing the external interference estimate from the portion of matched radar data.

The method may further comprise performing ordered-statistics filtering on the matched radar data to produce ordered-statistics filtered matched radar data.

BRIEF DESCRIPTION OF THE DRAWINGS

For a better understanding of the present invention and to show more clearly how it may be carried into effect, reference will now be made, by way of example only, to the accompanying drawings which show a preferred embodiment of the present invention and in which:

FIG. 12e is an azimuthal plot at the range and doppler frequency of the target for the high-resolution range-doppler data produced by the spectral generator of the present invention for the radar data of FIG. 12a;

FIG. 28b is a doppler plot of the data of FIG. 28a produced by conventional beamforming along with the doppler data of FIG. 28a;

DETAILED DESCRIPTION OF THE INVENTION

Figure 1:
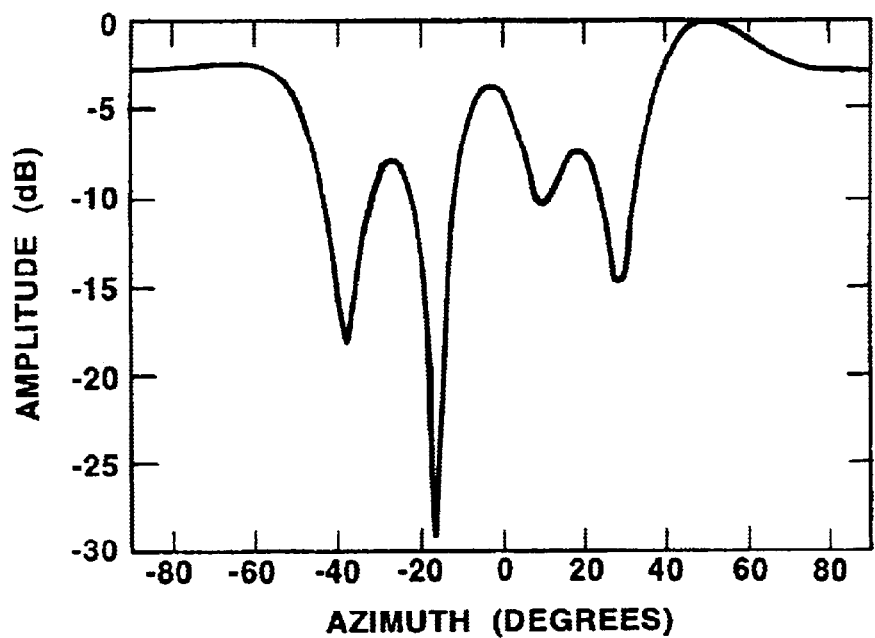
FIG. 1 is a plot of amplitude versus azimuth for radar data recorded in the presence of external interference.

All of the experimental data shown herein has been taken from the SWR-503™ HFSWR system located at Cape Race, Newfoundland, Canada, developed by Raytheon Canada Limited. The SWR-503 HFSWR system comprises a receiving antenna array having 16 antenna elements (i.e. a main sensor array having 16 sensors).

As used herein, each of the terms "range data", "doppler data", "azimuth data", "sensor data" or "pulse data" denotes a one-dimensional series of data points in a given domain. The term "range-doppler data" denotes two-dimensional data for a given azimuth or for a given sensor and the term "range-sensor data" denotes two-dimensional data for a given doppler value or a given pulse index. In addition, the terms "range-pulse-sensor data", "range-doppler-sensor data" and "range-doppler-azimuth data" denotes three-dimensional data. Furthermore, the term "a portion" of data means that the portion of data has a dimension smaller than the data from which it was obtained. Accordingly, a portion of data may be one-dimensional or two-dimensional when the portion of data is taken from a three-dimensional data set. Furthermore, the term "spectrum" is used to denote a range-doppler plot.

Suppression of noise from radar data before or during the generation of range-doppler plots is beneficial since most radar systems perform detection on the range-doppler plots. To achieve noise suppression, the signal characteristics of radar returns from targets and the various types of noise present in the radar data should be examined to determine suitable methods of noise suppression.

The targets of a radar system reflect the EM pulses that are transmitted by the transmitting antenna of the radar system. Hence the radar returns from targets are dependent on the transmitted EM pulses. The targets for a radar system, especially an HFSWR radar system, comprise diverse objects such as ships, icebergs, planes and missiles. Each of these targets has a unique radar signature which is defined as the pattern that each of these targets makes on a range-doppler plot although these radar signatures usually appear as peaks. Accordingly, to enhance the radar signatures from targets, a spectral estimation technique that can provide a sharp spectral estimate should be used to enhance the peaked shape of the radar signatures. Furthermore, from observing a variety of targets, based on differences in radar signature, targets should preferably be split into two classes: surface targets (i.e. ships and the like) and air targets (i.e. planes and the like). In addition, it should be borne in mind that the range resolution and doppler resolution will affect the number of range-doppler cells that are contained in the radar signature of a target.

In addition, the various forms of clutter have various degrees of spatial correlation. For instance, ocean clutter has poor spatial correlation. Accordingly, to suppress ocean clutter while generating range-doppler plots, a spectral estimation technique that can separate target radar returns from ocean clutter by exploiting the differences in spatial correlation should be used. However, ionospheric clutter has strong spatial correlation and has a radar signature that appears in the form of either distributed or point targets. Accordingly, a spectral estimation technique is needed that can provide a high spatial resolution that is sufficient to separate the radar signature of ionospheric clutter from the radar signature of targets existing in a different direction. A high resolution spectral estimator is also beneficial since sidelobes are not produced in the spectral estimate. Accordingly, radar signatures from clutter will not obscure radar signatures from targets due to spectral spreading which occurs in FFT-based spectral estimators, since ionospheric clutter is confined to fewer range-doppler cells. This occurs because the ionospheric layers are not ideally distributed along the range dimension for different azimuths.

One such spectral estimator which satisfies the above criteria is the MUSIC (MUltiple SIgnal Classification) spectral estimator (Schmidt, R. O., "Multiple Emitter Location and Signal Parameter Estimation", IEEE Transactions AP-34, No. 3, 1986). The MUSIC spectral estimator estimates signal and noise subspaces which are orthogonal (i.e. statistically independent). Provided that the Signal-to-Clutter Ratio (SCR) is sufficient, the signal subspace will include the radar returns from possible targets and the noise subspace will include data having poor correlation which includes ocean clutter. The spectral estimate produced by the MUSIC spectral estimator has peaks for signal vectors that are orthogonal to the noise vectors which define the noise subspace. Accordingly, radar signatures from targets should be enhanced by the MUSIC spectral estimator. Furthermore, the MUSIC spectral estimation method produces a high resolution spectral estimate. Accordingly, the radar signatures from ionospheric clutter should not affect target detection if the target's azimuth is not in the direction of the ionospheric clutter since the absence of sidelobes in the high-resolution spectral estimate prevents spectral leakage of ionospheric clutter which would otherwise obscure the radar signature of targets.

The signal and noise subspaces are identified based on an eigendecomposition or a singular value decomposition (which are mathematically related as is well known to those skilled in the art) of a covariance matrix representing range-doppler data for a given range-doppler cell RDC in a range-doppler plot. The covariance matrix for the range-doppler cell RDC should preferably be estimated using as much radar data as possible to obtain a statistically robust estimate. Conventionally, the covariance matrix for the range-doppler cell RDC may be estimated using observations across a plurality of sensors. Each observation can be represented by a row vector x from which a covariance matrix C is calculated by using the outer product as is well known to those skilled in the art. Accordingly, the covariance matrix C is calculated according to:

$$C = x^H \cdot x \quad (1)$$

where H is the Hermitian operator which is the complex-conjugate transpose of a matrix or a vector. If there are K sensors in a main sensor array (i.e. the receiving antenna array), then the covariance matrix C has a dimension of K-by-K (i.e. K rows and K columns). To calculate an estimated covariance matrix based on a number of observations, covariance matrices can be calculated for a plurality of observation vectors. All covariance matrices can then be averaged to calculate the estimated covariance matrix $C_{est}$ according to:

$$C_{est} = \sum_{i=1}^{N_c} C_i \quad (2)$$

where $C_i$ is the covariance matrix for the $i^{th}$ observation vector and there are $N_c$ observations.

Once the covariance matrix estimate $C_{est}$ is calculated, it is necessary to calculate the eigenvectors which span the signal subspace and the eigenvectors that span the noise subspace. The eigenvectors may be calculated by any suitable means. Preferably, this is achieved using Singular Value Decomposition (SVD) as is well known to those skilled in the art. The SVD of the covariance matrix estimate $C_{est}$ is given by:

$$C_{est} = U \cdot \Sigma \cdot V \quad (3)$$

where U and V are matrices having eigenvectors that span the signal and noise subspaces, and $\Sigma$ is a diagonal matrix having singular values ($\sigma_1^2$, $\sigma_2^2$, ..., $\sigma_K^2$) along the diagonal. Given K sensors in the main sensor array, the covariance matrix estimate $C_{est}$ has K independent singular values and K independent eigenvectors if the covariance matrix estimate $C_{est}$ is full rank.

The eigenvectors of the covariance matrix estimate $C_{est}$ approximate an orthonormal set of basis vectors, some of which span the signal subspace and some of which span the noise subspace. The amplitudes of the singular values represent the degree of spatial correlation of the signal content and the spatial correlation of the noise content within the plurality of observation vectors The noise subspace eigenvectors are obtained by separating the singular values associated with the noise subspace from the singular values associated with the signal subspace. Thresholding may be used to separate the noise singular values from the signal singular values since the signal singular values are typically larger in magnitude than the noise singular values. Alternatively, the two eigenvectors associated with the two largest singular values may be discarded since in practice there will most likely be at most two targets at the same range and moving at the same velocity. The two largest eigenvectors would represent these targets. A noise subspace matrix estimate $N_{est}$ is then calculated by retaining the noise eigenvectors as shown in equation 4.

$$N_{est} = U(:, b+1:K) \quad (4)$$

where b is preferably 3 as explained above so that the two largest eigenvectors are not in the noise subspace matrix estimate $N_{est}$. The MUSIC spectral estimate is then calculated according to:

$$\text{MUSIC} = \frac{1}{diag(F^H \cdot N_{est} \cdot N_{est}^H \cdot F)} \quad (5)$$

where the matrix F contains vectors along which some of the signals may be directed. Since the signal vectors are orthogonal to the noise subspace defined by the noise eigenvectors, the MUSIC spectral estimate will produce a peak at the spectral location of the signal. Furthermore, the MUSIC spectral estimation method does not take the singular values into account which is beneficial since the Bragg lines corrupt the singular values and consequently obscure possible targets. However, to obtain a good MUSIC spectral estimate, adequate statistical characterization of the signals within the covariance matrix estimate is needed. The performance of a MUSIC spectral estimator is heavily dependent on the amount and type of data used to calculate the covariance matrix estimate.

Figure 5:
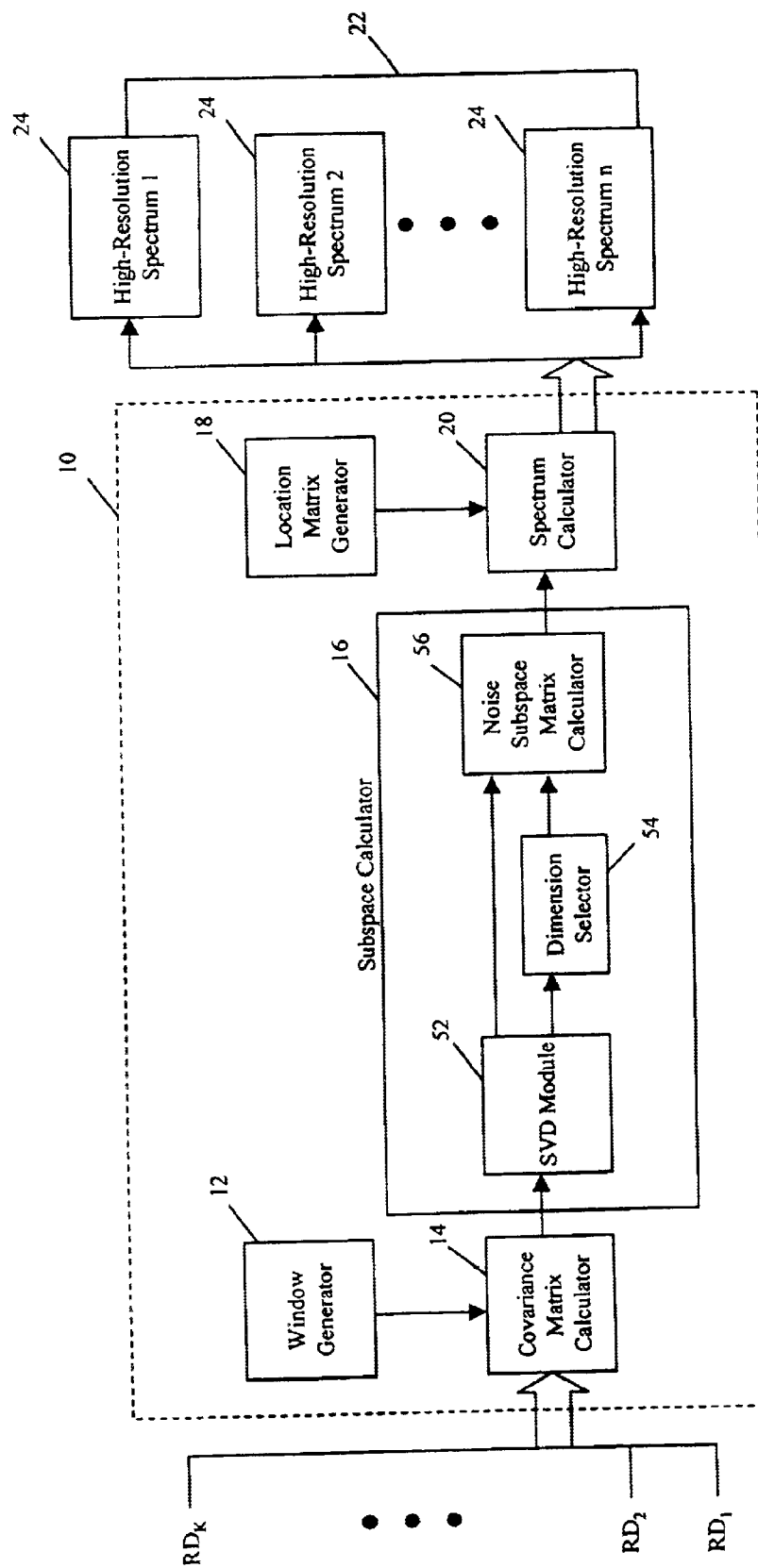
FIG. 5 is a block diagram of a spectral generator in accordance with the present invention.

Referring now to FIG. 5, shown therein is a spectral generator 10 in accordance with the present invention. The spectral generator 10 receives a plurality of range-doppler data $RD_1$, $RD_2$, ..., $RD_K$. Each range-doppler data signal is a two dimensional data series that is generated from radar data recorded by a given sensor from a main sensor array having a plurality of sensors $S_1$, $S_2$, ..., $S_K$ (not shown in FIG. 5). Each sensor may be any receiving antenna element known to those skilled in the art that is suitable for receiving radar signals. It should be understood by those skilled in the art that the radar data collected to produce the range-doppler data $RD_1$, $RD_2$, ..., $RD_K$ has been derived from pre-processed radar data that has been subjected to conventional signal processing operations which include bandpass filtering, heterodyning, A/D conversion, demodulation and downsampling. The radar data is also subjected to matched filtering for further noise reduction and to combat range wrap. The radar data is then subjected to doppler processing to produce the range-doppler data $RD_1$, $RD_2$, ..., $RD_K$. These operations are well known to those skilled in the art and will not be further described. Furthermore, it will be understood by those skilled in the art that all of the elements of the invention allow for the processing of data which is complex (i.e. has real and imaginary parts).

As shown in FIG. 5, the spectral generator 10 comprises a window generator 12, a covariance matrix calculator 14 in communication with the window generator 12 and the range-doppler data $RD_1$, $RD_2$, ..., $RD_K$, a subspace calculator 16 in communication with the covariance matrix calculator 14, a location matrix generator 18, and a spectrum calculator 20 in communication with the subspace calculator 16 and the location matrix generator 18. The spectral generator 10 may generate a plurality of high-resolution spectra 22 given the range-doppler data $RD_1$, $RD_2$, ..., $RD_K$. However, the spectral generator 10 may also generate at least one high-resolution spectrum 24. The number of high-resolution spectra 24 that are generated by the spectral generator 10 depends on the location matrix generator 18 as explained further below.

Figure 6A:
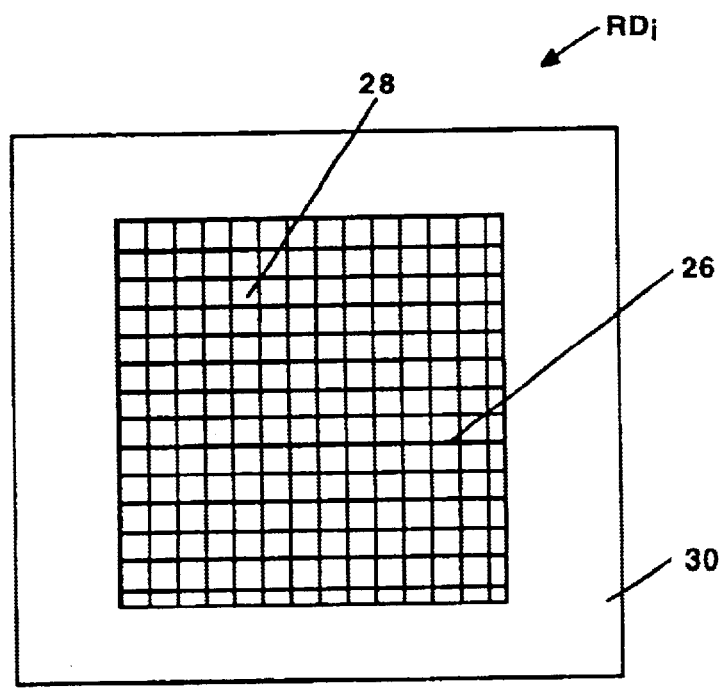
FIG. 6a is a plot illustrating the active area and guard area of a range-doppler plot in accordance with the present invention.

As previously mentioned, the range-doppler data $RD_1$, $RD_2$, ..., $RD_K$ are two dimensional data signals that are derived from radar data recorded by a given sensor $S_I$ in a main sensor array. Referring to FIG. 6a, a range-doppler data signal $RD_I$ is defined as having an active area 26 having a plurality of range-doppler cells 28 as well as a guard area 30 which also has a plurality of range-doppler cells (not shown in FIG. 6a). FIG. 6a is not to scale and will contain many more range-doppler cells 28 in the active area 26 than those shown, The need for the guard area 30 will be explained further below. Each cell 28 in the active area 26 is processed by the spectral generator 10 to produce at least one high-resolution spectrum 24 (i.e. at least one high-resolution range-doppler plot). The range-doppler cells in the guard area 30 are not processed for target detection.

Figure 6B:
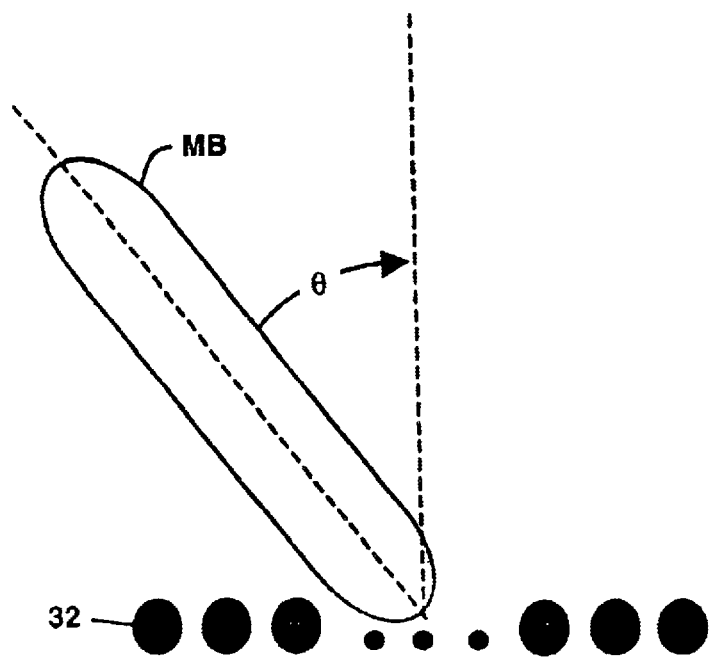
FIG. 6b is a diagram illustrating the concept of azimuth.

Each high resolution spectrum 24 is generated for a given azimuth θ. Referring to FIG. 6b, the azimuth θ is the angle that a main beam MB makes with the center of the main sensor array 32. The main beam MB is produced by the main sensor array 32 in the sense that the radar data recorded by the sensors of the main sensor array 32 is weighted (i.e. one weight per sensor) to give the appearance that the main sensor array 32 was directed in the direction of the azimuth θ while it recorded the radar data. Conventional beamforming tunes the main beam MB of the main sensor array 32 using weights that are similar to those used in the FFT spectral estimator. However, the spectral generator 10 of the present invention preferably uses the MUSIC spectral estimation method to tune the main beam MB to provide a higher angular resolution.

Figure 7A:
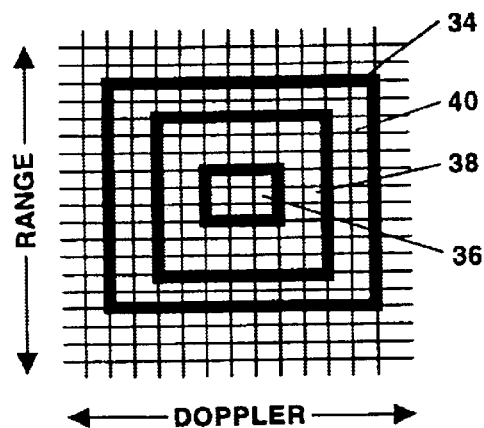
FIG. 7a is a weighted window in accordance with the present invention.

To implement the MUSIC spectral estimation method, the window generator 12 generates a weighted window having a plurality of weights. The weighted window defines a plurality of range-doppler cells from which covariance matrices C are obtained to calculate the covariance matrix estimate $C_{est}$ for a range-doppler cell of interest that is preferably at the center of the weighted window. The weighted window is defined as having at least two regions comprising a first region and a second region. The first region is at an inner portion of the weighted window. The second region surrounds the first region and has weights that are preferably chosen such that they are less than or equal to the weights in the first region. Alternatively, referring to FIG. 7a, shown therein is an embodiment of a weighted window 34 having a first region 36, a second region 38 which surrounds the first region 36, and a third region 40 which surrounds the second region 38. The weights in the second region 38 are preferably chosen such that they are less than or equal to the weights in the first region 36 and the weights in the third region 40 are preferably chosen such that they are less than or equal to the weights in the second region 38. Furthermore, the shape of the first region 36, the second region 38, and the third region 40 do not have to have a rectangular shape as shown in FIG. 7a, but may be of any shape. However, the shape is preferably matched to the target that is desired to be enhanced in the range-doppler plot.

Figure 7B:
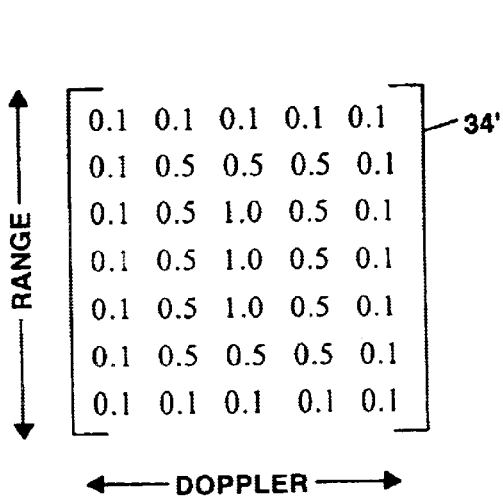
FIG. 7b is an example of the weighted window having weights for an air mode of radar operation.
Figure 7C:
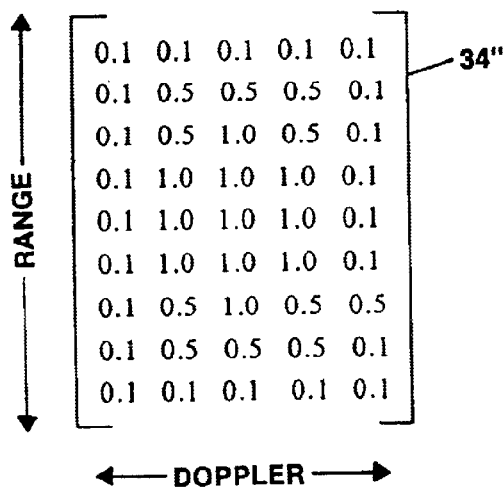
FIG. 7c is an example of the weighted window having weights for a ship mode of radar operation.

The window generator 12 may generate different weighted windows depending on the radar mode of operation (i.e. for instance, whether surface or air targets are to be detected). The size of the weighted windows also depend on the range and doppler resolution of the radar system, the nature of the noise in the range-doppler data and the validity of the covariance matrix estimate. For instance, given a range resolution of 7.5 km, an example of a weighted window 34' that may be used when the radar mode of operation is set to air mode is shown in FIG. 7b. Referring to FIG. 7c, shown therein is an example of a weighted window 34" that may be used when the radar mode of operation is set to ship mode.

Figure 7D:
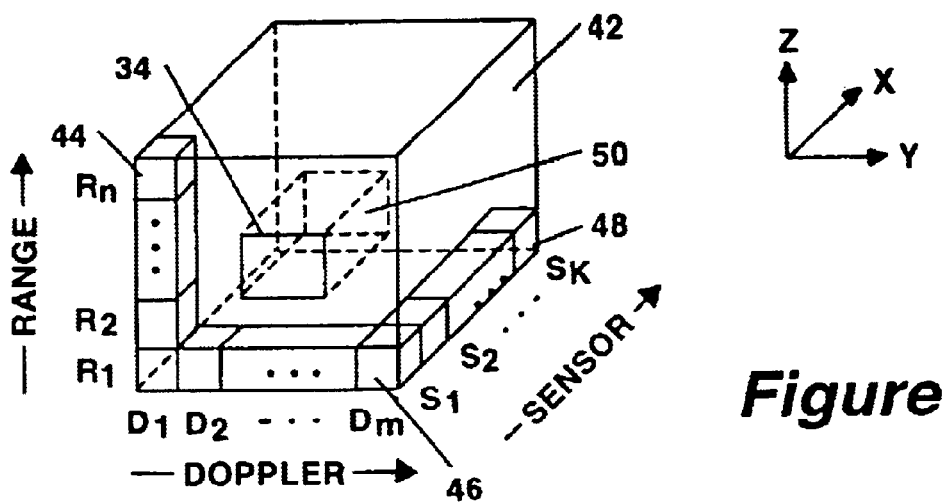
FIG. 7d shows the radar data organization for radar data recorded by a main sensor array in accordance with the present invention.

The covariance matrix estimate $C_{est}$ is preferably obtained by calculating the weighted average of all of the covariance matrices C for each range-doppler cell in the weighted window 34. Referring to FIG. 7d, the range-doppler data signals $RD_1$, $RD_2$, . . . , $RD_K$ can be concatenated to form range-doppler-sensor data 42 shown as a three-dimensional data cube with the range dimension extending along the z axis, the doppler dimension extending along the y axis and the sensor dimension extending along the x axis according to the x-y-z coordinate system shown in FIG. 7d. Furthermore, the radar data 42 is segmented into time segments in accordance with a CIT. The CIT is preferably different given different radar modes of operation. The CIT may be 10 to 40 seconds for missile or aircraft detection. Alternatively, the CIT may also be 2 to 5 minutes for ship detection or for observing oceanographic conditions.

Referring now to range vector 44, there are a series of range cells having range index values $R_1$, $R_2$, . . . , $R_N$ containing the EM values that are recorded by sensor $S_1$ in response to the first transmitted EM pulse. The distance represented by a given range cell is calculated by recording the time at which the EM value for the range cell was sampled with respect to the time that the corresponding EM pulse was transmitted, multiplying that time by the speed of light and dividing by two. Referring to doppler vector 46, there are a series of doppler cells having doppler index values $D_1$, $D_2$, . . . , $D_M$, containing EM values that were obtained by performing an FFT (a conventional operation as commonly known by those skilled in the art) on radar returns from pulses that were transmitted in the CIT for the radar data recorded by sensor $S_1$ at the range value of the range index value $R_1$. Referring now to sensor vector 48, there are a series of EM values that are measured by each sensor $S_1$, $S_2$, . . . , $S_K$, at the range value of range index $R_1$ after the transmission of the last EM pulse (in this example). Accordingly, each of the EM values contained within the sensor vector 48 were sampled at the same time (hence the same range index $R_1$) after the same transmitted EM pulse.

Figure 7E:
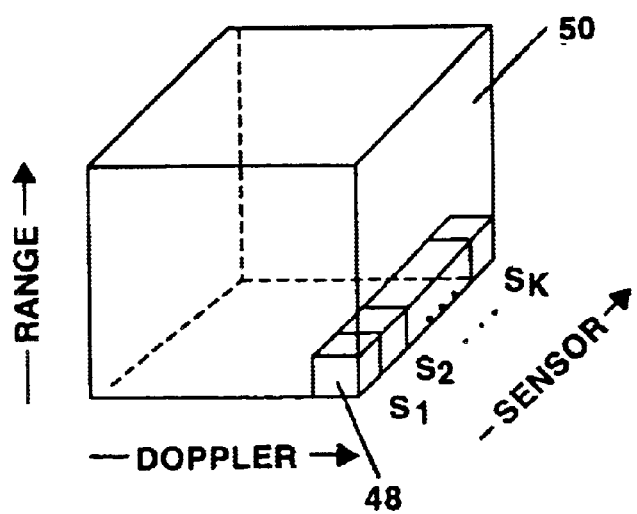
FIG. 7e shows the radar data used to obtain covariance matrices for the range-doppler cells in the weighted window.

Referring now to FIGS. 7d and 7e, the weighted window 34 is placed on the radar data 44 to extract a portion of the radar data 50 for use in covariance matrix estimation. The weighted window 34 is two-dimensional to identify the neighborhood of range-doppler cells along the range and doppler dimensions that are required for covariance matrix estimation. Sensor vectors for each of these range-doppler cells are then obtained from the radar data 42 which is represented by the cube 50. Each sensor vector is analogous to the vector x in equation 1. Preferably the covariance matrix estimate $C_{est}$ for the central range-doppler cell RDC in the portion of radar data 50 is obtained based on the aforementioned sensor vectors, of which sensor vector 48 is an example from the portion of radar data 50. From these sensor vectors covariance matrices are generated according to equation 1 by the covariance matrix calculator 14. The covariance matrix estimate $C_{est}$ is then calculated by the covariance matrix calculator 14 according to:

$$C_{est} = \sum_{g=1}^{G} \sum_{h=1}^{H} WW(g, h) \cdot C_{gh} \qquad (6)$$

where WW is a matrix containing the weights of the weighted window 34, g and h are indices that span the rows and columns of the weighted window 34 and $C_{gh}$ is the covariance matrix for the sensor vector in the portion of radar data 50 that corresponds to the $g^{th}$ row and the $h^{th}$ column of the weighted window 34.

Referring again to FIGS. 7b and 7c, the weighted windows 34' and 34" have three regions in which the first region 36 has weights preferably equal to the value 1, the second region 38 has weights preferably equal to the value 0.5 and the third region 40 has weights preferably equal to the value 0.1. Furthermore, the shape of the first region for each weighted window 34' and 34" is different since the weighted windows 34' and 34" were generated for different radar modes of operation. Different weights may also be used for different radar modes of operation. The first region 36 is preferably shaped to match the radar signature expected for air targets in weighted window 34' and for surface targets in weighted window 34". To retain the power of a possible target in the covariance matrix estimate $C_{est}$, the weights in the first region of the weighted window 34 are the largest weights in the weighted window 34. To increase the statistical robustness of the covariance matrix estimate $C_{est}$, the covariance matrices for range-doppler cells in the second 38 and third region 40 are also used. However, these covariance matrices are preferably not given as much weight in the calculation of the covariance matrix estimate $C_{est}$ since the range-doppler cells in the second 38 and third regions 40 do not likely contain much of the radar signature of a possible target when the weighted window is centered on a possible target. As is well known to those skilled in the art, the possible targets show up as peaks in a range-doppler plot. Accordingly, the second 38 and third regions 40 comprise the skirts or the radar signature of a possible target as well as noise when the weighted window 34 is centered on the possible target. Therefore, the amplitude of the noise in a range-doppler cell increases relative to the amplitude of the radar signature of the possible target as the distance between the range-doppler cell and the first region 36 in the weighted window 34 increases. Accordingly, it is preferable to have decreasing weights in the weighted window 34 as one moves from the first region 36 to the second region 38 and from the second region 38 to the third region 40 to obtain an estimate of the background noise in the covariance matrix with the weights scaled to retain the amplitude of a possible target within the weighted window 34.

Referring again to FIG. 5, the covariance matrix calculator 14 communicates with the subspace calculator 16. The subspace calculator 16 comprises an SVD module 52, a dimension selector 54 and a noise subspace matrix calculator 56. The SVD module 52 is in communication with the covariance matrix calculator 14 to receive the covariance matrix estimate $C_{est}$ and perform singular value decomposition on the covariance matrix estimate $C_{est}$. Any suitable singular value decomposition method commonly known to those skilled in the art may be used by the SVD module 52.

The dimension selector 54 is in communication with the SVD module 52 to receive the $\Sigma$ matrix calculated from the singular value decomposition of the covariance matrix estimate $C_{est}$. The dimension selector 52 determines the dimension of the signal and noise subspaces. The dimension selector 52 may utilize a number of various techniques to estimate these dimensions. One of these techniques is to use a threshold to include those singular values that are greater than the threshold to form a signal subspace. By reducing the threshold value, targets with weak spatial correlation are allowed to appear in the output. In other words, the sensitivity of the spectral generator 10 is increased to emphasize targets with a poor signal to noise ratio. However, in practice, as mentioned previously, the possibility of having more than 2 or 3 targets at different azimuths with the same range and doppler values is rare. Accordingly, the dimension selector 52 may be set to choose a signal subspace of dimension preferably equal to two.

It should be borne in mind that for noise/clutter that does not have a white spatial distribution, the estimated noise power will vary depending on the degree of correlation of the noise/clutter. Furthermore, for radar signatures from possible targets having a poor spatial correlation (i.e. low SCR), the target is represented by more than one singular value and may be among the noise singular values. To enhance the radar signatures from these targets in a range-doppler plot, the noise subspace dimension should preferably be decreased as described further below.

The noise subspace matrix calculator 56 is in communication with the SVD module 52 to receive the matrix U (alternatively, the matrix V could be used since the matrix V is related to the matrix U). The noise subspace matrix calculator 56 is also in communication with the dimension selector 54 to receive the signal subspace dimension. The noise subspace matrix calculator 56 forms a noise subspace matrix from eigenvectors that correspond to the noise subspace of the covariance matrix estimate $C_{est}$. The noise subspace matrix estimate $N_{est}$ is then calculated according to equation 4. The noise subspace matrix estimate $N_{est}$ has a dimension of (K-b)-by-K.

The location matrix generator 18 generates a location matrix A that has weights that are used to generate the plurality of high-resolution spectrums 22. The location matrix A is given by equation 7.

$$A = [A_{\theta 1}, A_{\theta 2}, A_{\theta 3}, \ldots, A_{\theta Z}], -\pi \leq \theta_i \leq \pi \qquad (7)$$

A location vector $A_{\theta i}$ is a vector given by:

$$A_{\theta 1} = [1 \; e^{j2\pi(d/\lambda)\sin(\theta i)} \; e^{j4\pi(d/\lambda)\sin(\theta i)} \ldots e^{j2\pi(K-1)d/\lambda\sin(\theta i)}]^T \qquad (8)$$

where K is the number of sensors in the main sensor array 32, d is the spacing between each sensor in the main sensor array 32, $\lambda$ is the wavelength of the transmitted EM pulses and $\theta_i$ is the azimuth value for which the high resolution plot is generated. The location matrix A is also known as the array manifold and each location vector $A_{\theta i}$ is also known as an array manifold vector to those skilled in the art. There may be a distinct location vector $A_{\theta i}$ for every possible target azimuth. Since there are a plurality of possible target azimuths, there are preferably a plurality of possible array manifold vectors $A_{\theta i}$ in the location matrix A.

The location matrix A has a dimension of K-by-Z. Each location vector $A_{\theta i}$ is used to generate a different high-resolution spectrum 24 as discussed further below. Accordingly, the number of location vectors $A_{\theta i}$ in the location matrix A determine the number of high-resolution spectrums 24 that are generated by the spectral estimator 10. Accordingly, if the location matrix A only has one column then only one high-resolution spatial spectrum 24 is generated. The number of location vectors $A_{\theta i}$ and the azimuth resolution (i.e. the difference between two consecutive azimuth values such as $\theta_1$ and $\theta_2$, $\theta_2$ and $\theta_3$, etc.) may be predetermined before the operation of the spectral generator 10 and specified by a user of the spectral generator 10.

The spectrum calculator 20 is in communication with the location matrix generator 18 to receive the location matrix A. The spectrum calculator 20 is also in communication with the subspace calculator 16 to receive the noise subspace matrix estimate $N_{est}$. The spectrum calculator 20 calculates a high-resolution spectral vector MUSRDC that provides a value for each of the plurality of high-resolution spectrums 22 at the range-doppler cell RDC for which the covariance matrix estimate $C_{est}$ was originally calculated according to equation 10:

$$RDC_{Mus} = \frac{1}{diag(A^H \cdot N_{est} \cdot N_{est}^H \cdot A)} \qquad (10)$$

where the operator diag( ) returns the values along the diagonal of the matrix $A^H \cdot N_{est} \cdot N_{est}^H \cdot A$. Equation 10 is in accordance with the MUSIC spectral estimation method. The resulting vector $MUS_{RDC}$ is a one-dimensional azimuthal vector having a dimension of 1-by-Z. The high-resolution spectral estimate results from the projection of the array manifold vectors onto the noise subspace defined by $N_{est}$. If there is a possible target in the direction of any array manifold vector, then it will be substantially orthogonal to the noise subspace, and the denominator in equation 10 will become very small. This results in a peak in the spectral estimate $MUS_{RDC}$ at the spatial frequencies of the possible target. The term "substantially orthogonal" is used to indicate that the noise subspace is an approximation since it is estimated from finite data. At this point, the high-resolution spectral vector $\text{MUS}_{RDC}$ is stored in any suitable storage means such that the location of the high-resolution spectral vector $\text{MUS}_{RDC}$ corresponds to the location of the sensor vector for that same range-doppler cell in the range-doppler-sensor data 42. The storage means may be any suitable element known to those skilled in the art such as a database, a hard-drive, a CD-ROM and the like.

The above discussion applies to the generation of a high resolution spectral estimate for one range-doppler cell. Accordingly, the covariance matrix calculator 14, the subspace calculator 16 and the spectrum calculator 20 must generate a high-resolution spectral vector $\text{MUS}_{RDC}$ for each range-doppler cell in the active area 26 of the range-doppler data $RD_1, RD_2, \ldots, RD_K$ by sliding the weighted window 34 across the range-doppler cells and performing the above-stated operations. Each of the generated high-resolution spectral vectors are stored in the storage means such that a noise suppression high-resolution range-doppler-azimuth data set is generated. This data set is three dimensional and includes a range dimension, a doppler dimension and an azimuth dimension. One of the high-resolution spectrums 24 is obtained by taking a two-dimensional slice of the noise suppressed high-resolution range-doppler-azimuth data set for a given azimuth value.

Figure 8:
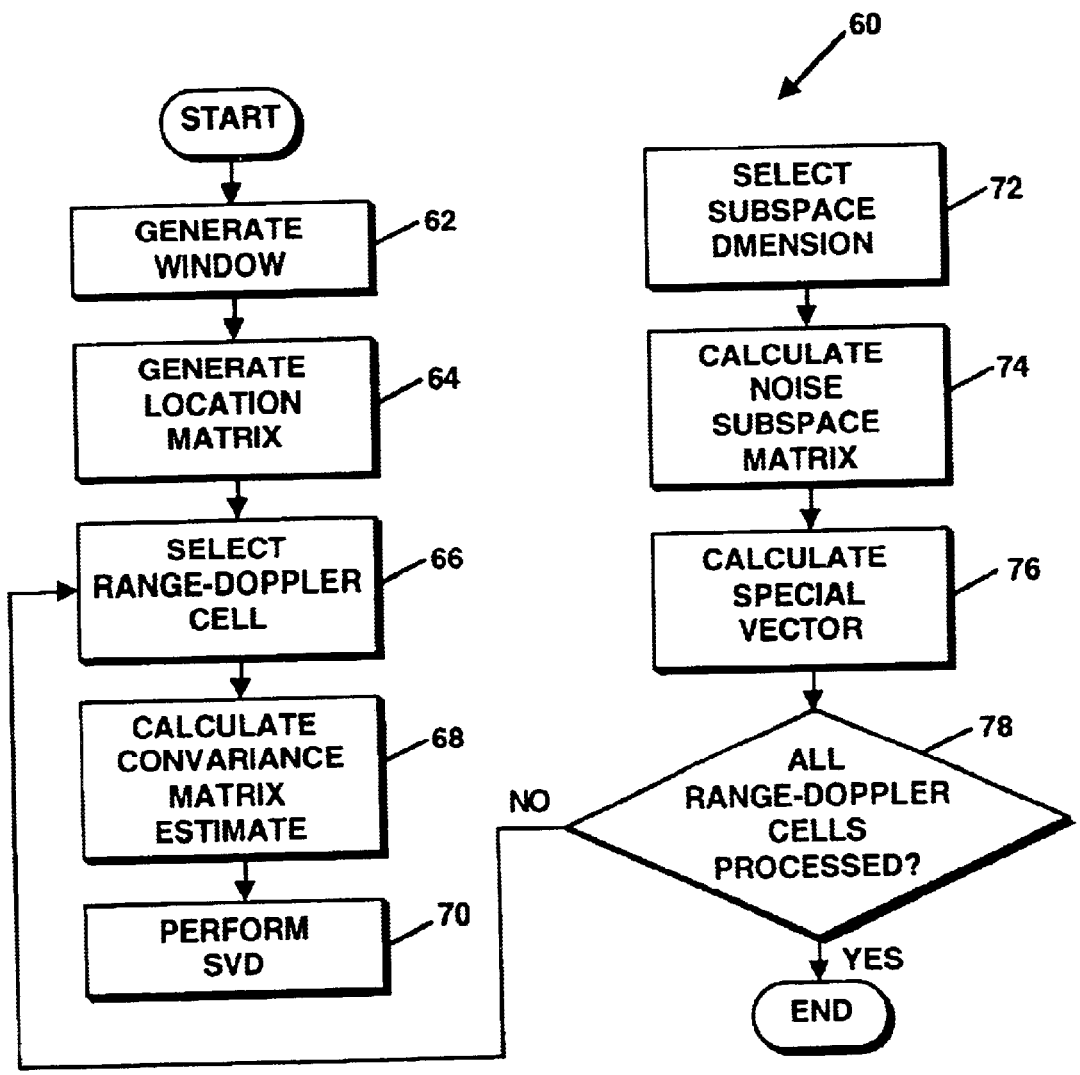
FIG. 8 is a flowchart of a spectral generation method in accordance with the present invention.

Referring now to FIG. 8, shown therein is a spectral generation method 60 performed by the spectral generator 10 in accordance with the present invention. The calculations that are performed during the spectral generation method 60 have already been discussed above and will not be discussed in detail here. The spectral generation method 60 begins at step 62 where the weighted window 34 is generated. The next step 64 is to generate the location matrix A. A range-doppler cell is then selected for which a high resolution spectral vector is generated according to steps 68 to 76. At step 68, the covariance matrix estimate $C_{est}$ is calculated for the range-doppler cell. Singular value decomposition is then performed on the covariance matrix estimate $C_{est}$ at step 70. The signal subspace dimension is then chosen at step 72 and the noise subspace matrix estimate $N_{est}$ is calculated for the range-doppler cell at step 74. The high-resolution spectral vector $\text{MUS}_{RDC}$ is then calculated for the range-doppler cell at step 76. This vector is stored in the fashion described above. If it is determined at step 78 that there are more range-doppler cells to process, then the spectral estimation method 60 moves to step 66 where the next range-doppler cell is selected. The weighted window 34 is shifted so that the next range-doppler cell to be processed is preferably at the center of the weighted window 34. The operations at steps 68 to 76 are then repeated.

The spectral generation method 60 may start at the upper left corner of the active area 26 of the range-doppler data $RD_1, RD_2, \ldots, RD_K$ and process every range-doppler cell in that row until the last range-doppler cell in the row is processed. At this point the weighted window 34 may then be moved down 1 row and placed at the left-most range-doppler cell in the active area 26 so that all of the range-doppler cells in that row (i.e. range) may be processed. In this fashion all of the range-doppler cells for the range-doppler data $RD_1, RD_2, \ldots, RD_K$ are processed by the spectral generation method 60. This may be referred to as processing the range-doppler cells in a row-wise fashion. Alternatively, other methods of moving along the range-doppler cells of the range-doppler data $RD_1, RD_2, \ldots, RD_K$ to generate at least one high-resolution spectrum 24 may be used. For example, the range-doppler cells may be processed in a column-wise fashion.

When the spectral generation method 60 is operating on range-doppler cells near or at the edges of the active area 26, the range-doppler cells in the guard area 28, that fall within the weighted window 34, are used to calculate the covariance matrix estimate $C_{est}$. This is the reason for the incorporation of the guard area 30 around the active area 26 of the range-doppler data $RD_1, RD_2, \ldots, RD_K$. Accordingly, spectral estimation is performed for only those range-doppler cells that are in the active area 26.

Certain variations of the MUSIC spectral estimation method may be used in the spectral estimator 10 and the spectral estimation method 60 of the present invention. Alternative spectral estimation methods include the root-MUSIC spectral estimation method (Barabell, A. J., 1983, "Improving the resolution performance of eigenstructure based direction finding algorithms", in ICASSP Proceedings, Boston, Mass., 1983, pp. 336–339), the eigenvector method (uses a weighted version of the MUSIC spectral estimation method) and the root-eigenvector method. Another alternative may be the delta-MUSIC or derivative-MUSIC spectral estimation method which not only utilizes the signal space information of the correlation matrix but also the spatial derivative of the correlation matrix. The delta-MUSIC spectral estimation method may be considered an example of a high resolution sum/difference beamformer. Furthermore, the delta-MUSIC method has a resolution threshold that is far superior to that of the MUSIC spectral estimation method and Is relatively insensitive to the problem of source correlation or closely spaced sources. Other subspace-based spectral estimation methods such as the ESPRIT method may also be utilized.

Figure 9A:
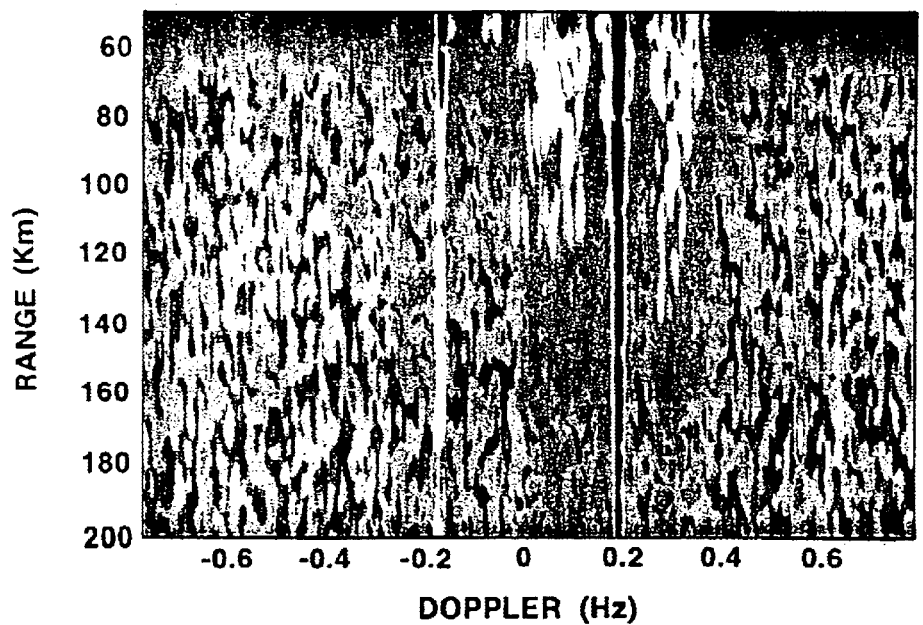
FIG. 9a is a range-doppler plot produced by conventional beamforming for an example of radar data.
Figure 9B:
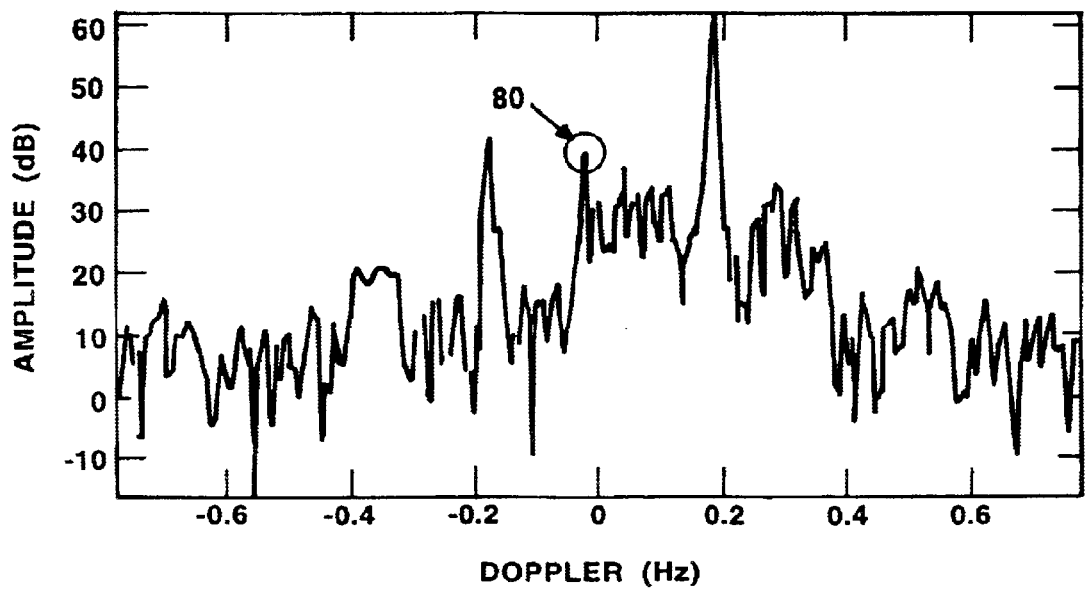
FIG. 9b is a slice along the doppler dimension of the range-doppler plot of FIG. 9a at the range of the target.

Referring now to FIG. 9a, shown therein is a range-doppler plot obtained for an example of radar data using FFT-based beamforming as is commonly known to those skilled in the art. The radar data was recorded during the winter season. The radar data contains a target 80 (not visible in FIG. 9a) at a range of 109 km having an azimuthal angle of 8.6°. The first order and higher order Bragg lines can be seen in FIG. 9a. However, the target 80 cannot be seen. Referring now to FIG. 9b, a slice of the range-doppler plot of FIG. 9a along the doppler dimension at the range of the target 80 shows the presence of strong ocean clutter which prevents the detection of the target 80 given a low SCR of less than 10 dB.

Figure 10A:
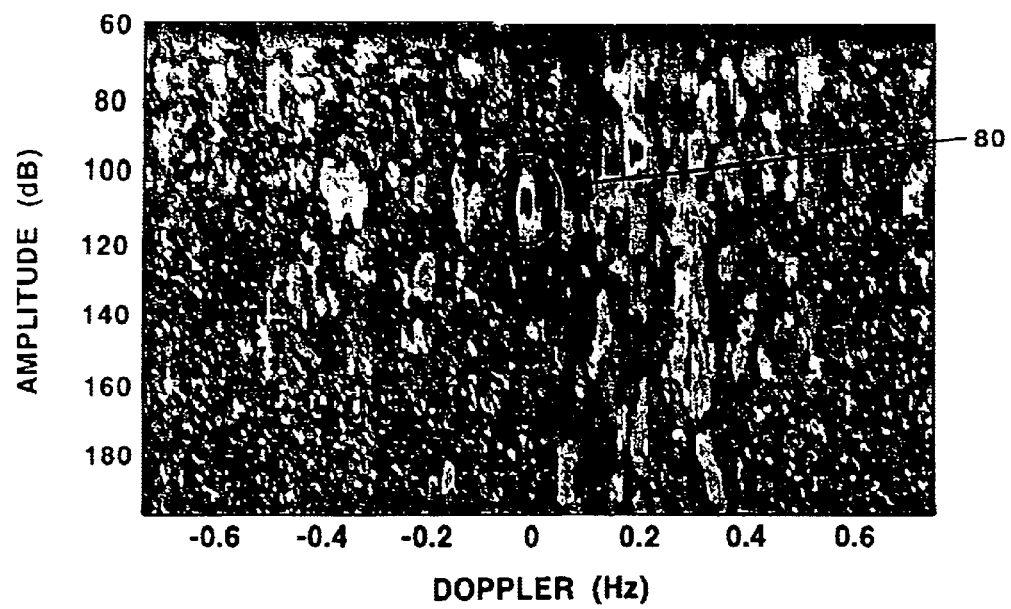
FIG. 10a is a high-resolution range-doppler plot of the radar data shown in FIG. 9a produced by the spectral generator of the present invention.
Figure 10B:
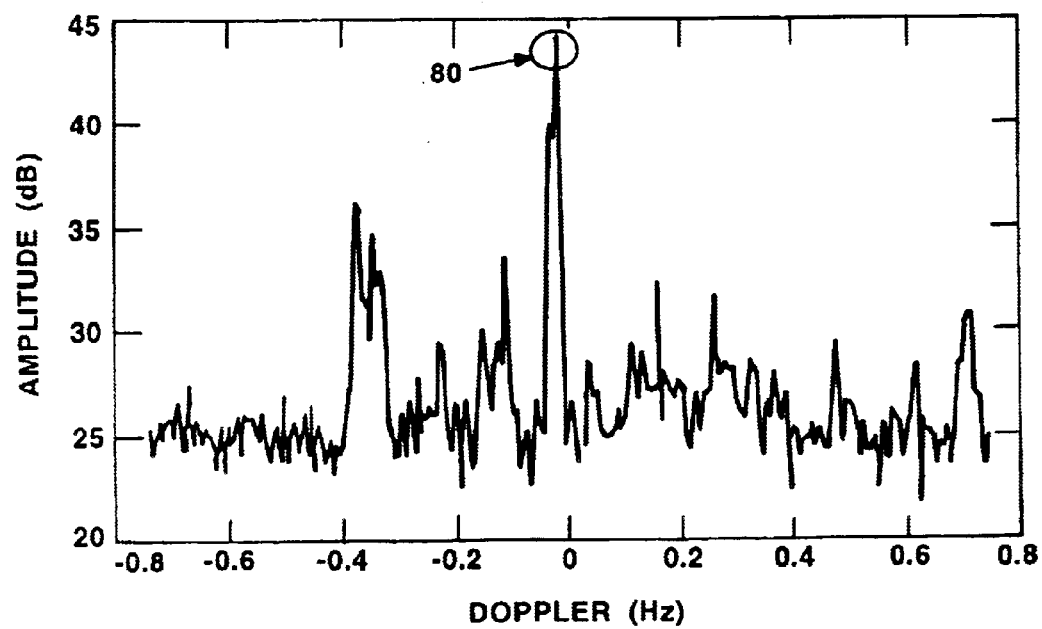
FIG. 10b is a slice along the doppler dimension of the range-doppler plot of FIG. 10a at the range of the target.

Referring now to FIGS. 10a and 10b, FIG. 10a shows a high-resolution range-doppler plot of the radar data of FIG. 9a while FIG. 10b shows a slice along the doppler dimension of the high-resolution range-doppler plot of FIG. 10a. Both FIGS. 10a and 10b show that after applying the spectral estimation method 60 of the present invention, the target 80 becomes visible. The ocean clutter has been suppressed due to its poor spatial correlation. The target has an SSCR of 20 dB (i.e. a signal to signal plus clutter ratio).

Figure 11A:
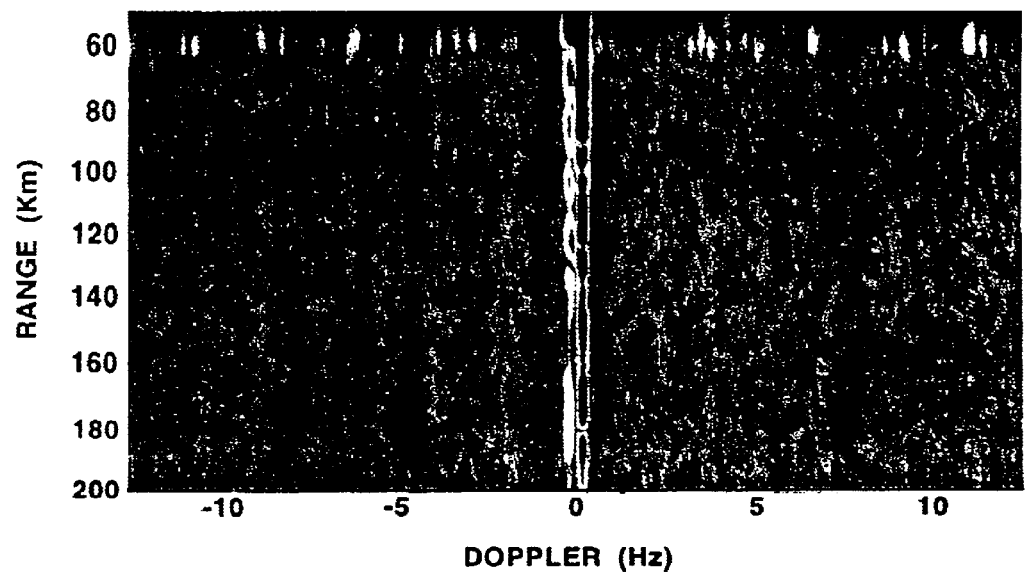
FIG. 11a is a range-doppler plot produced by conventional beamforming for another example of radar data.
Figure 11B:
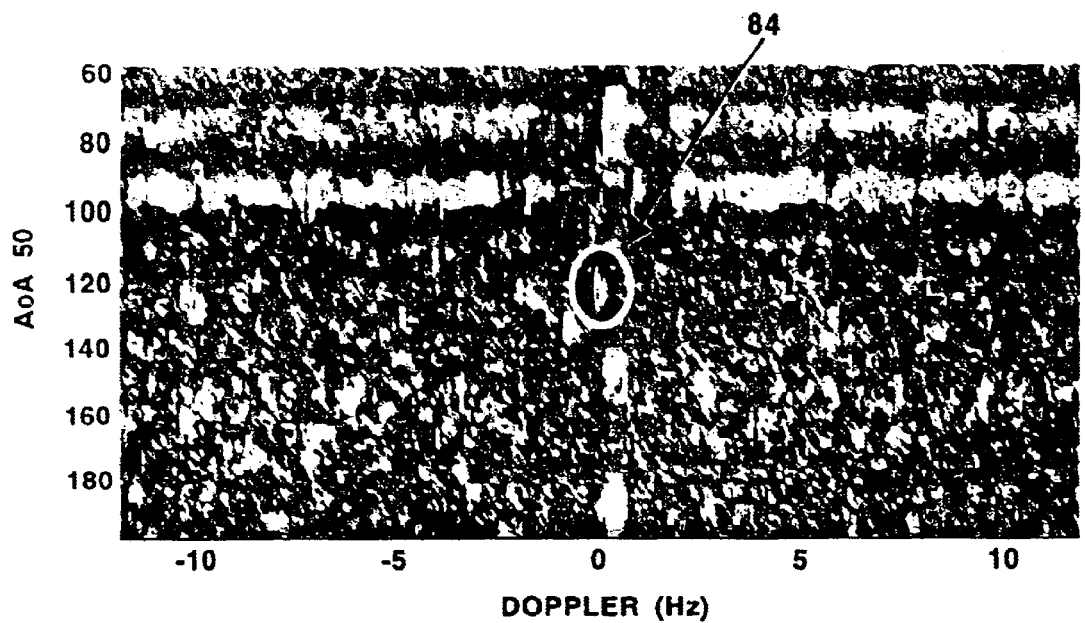
FIG. 11b is a high-resolution range-doppler plot of the radar data shown in FIG. 11a produced by the spectral generator of the present invention.

Referring now to FIG. 11a, shown therein is a range-doppler plot obtained for another example of radar data using FFT-based beamforming. The radar data contains a target 82 (not visible in FIG. 11a) at a range of 127.7 km having an azimuth of 50°. The first order and higher order Bragg lines in FIG. 11a prevent target detection. Referring now to FIG. 11b, shown therein is a high-resolution range-doppler plot of the radar data of FIG. 11a produced by the spectral generator 10 operating in air mode. The target 82 is now visible due to the suppression of clutter. The target 82 has an SSCR of approximately 20 dB.

Figure 12A:
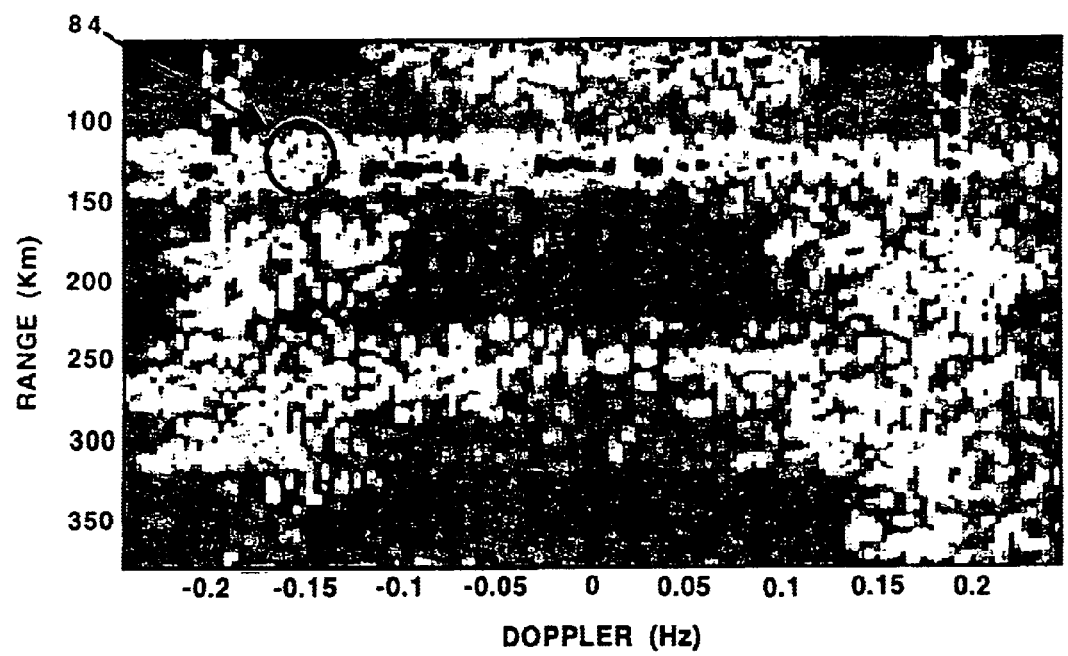
FIG. 12a is a range-doppler plot produced by conventional beamforming for an example of radar data having ionospheric clutter.

Referring next to FIG. 12a, shown therein is a range-doppler plot produced by conventional beamforming of another example of radar data recorded during the summer season. The radar data has a target 84 at a range of 110 km and an azimuth of −39°. Due to the spectral leakage effect (i.e. side-lobe effect) in performing the FFT-based spectral estimation, strong ionospheric clutter at the same range as the target 84 but having a slightly different azimuthal angle smears the radar signature of the target 84 by increasing the clutter level around the target 84. Hence the target 84 is not visible.

Figure 12B:
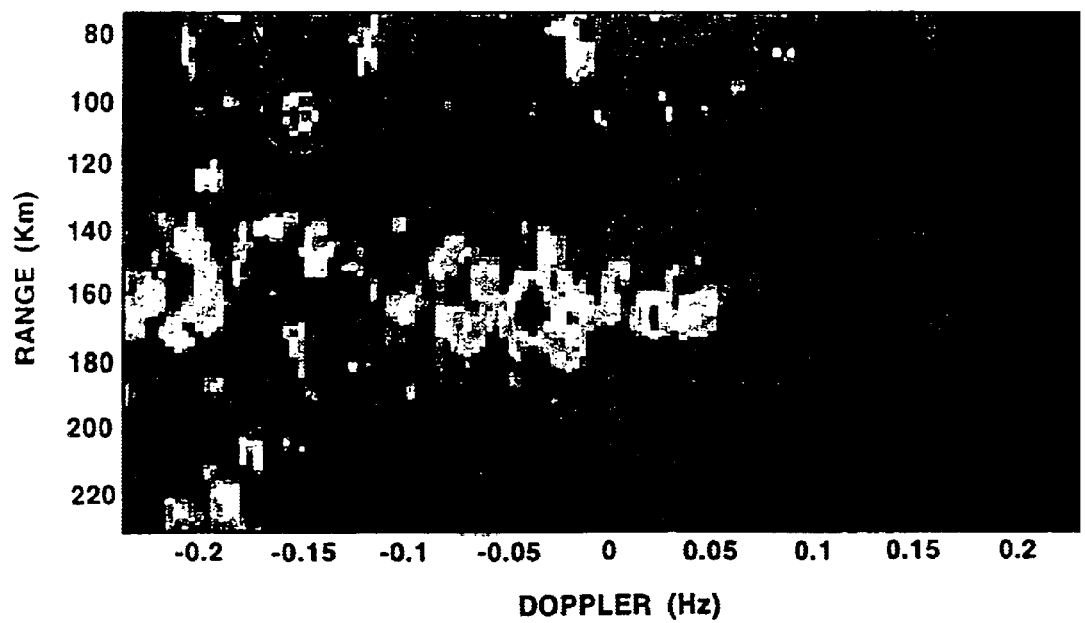
FIG. 12b is a high-resolution range-doppler plot of the radar data shown in FIG. 12a produced by the spectral generator of the present invention.

Referring next to FIG. 12*b*, shown therein is a high-resolution range-doppler plot of the radar data of FIG. 12*a*, produced by the spectral generator 10 of the present invention. The high-resolution range-doppler plot provides the appearance of a stronger target in comparison with the range-doppler plot of FIG. 12*a*. This example shows that the high-resolution spectral estimator enjoys the benefit of high angular resolution and the lack of the side-lobe effect. The target 84 now has an SSCR of 25 dB.

Figure 12C:
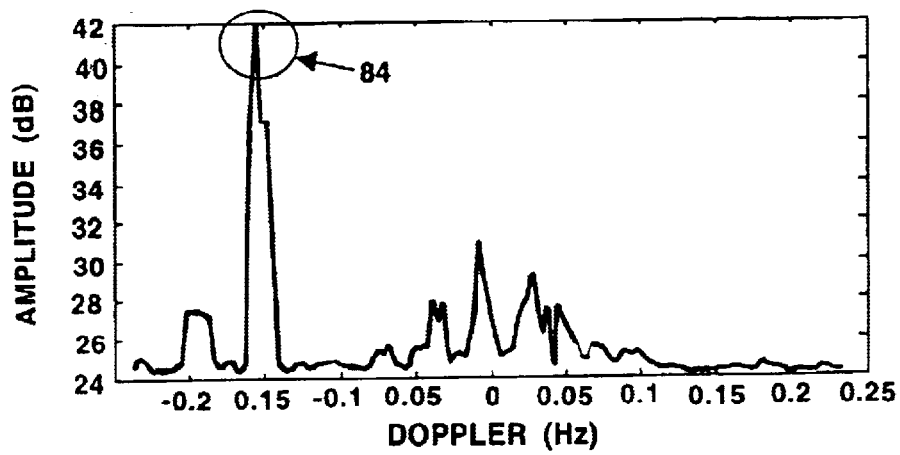
FIG. 12c is a slice along the doppler dimension of the high-resolution range-doppler plot of FIG. 12b at the range of the target.
Figure 12D:
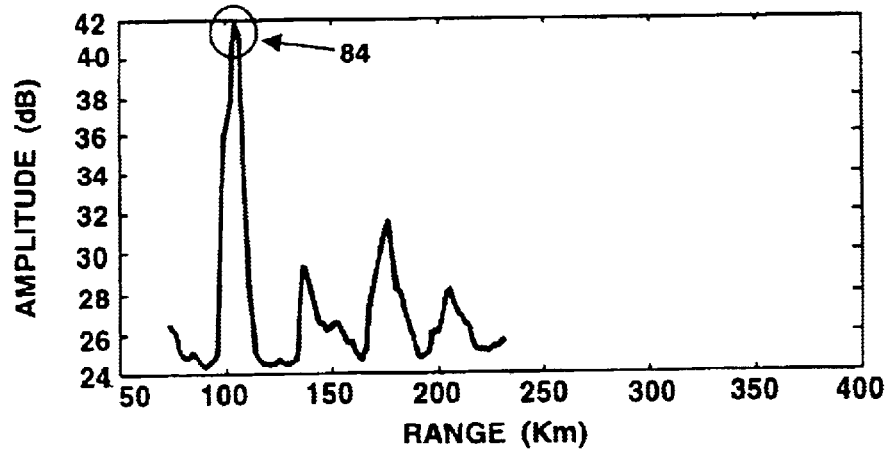
FIG. 12d is a slice along the range dimension of the high-resolution range-doppler plot of FIG. 12b at the doppler frequency of the target.
Figure 12E:
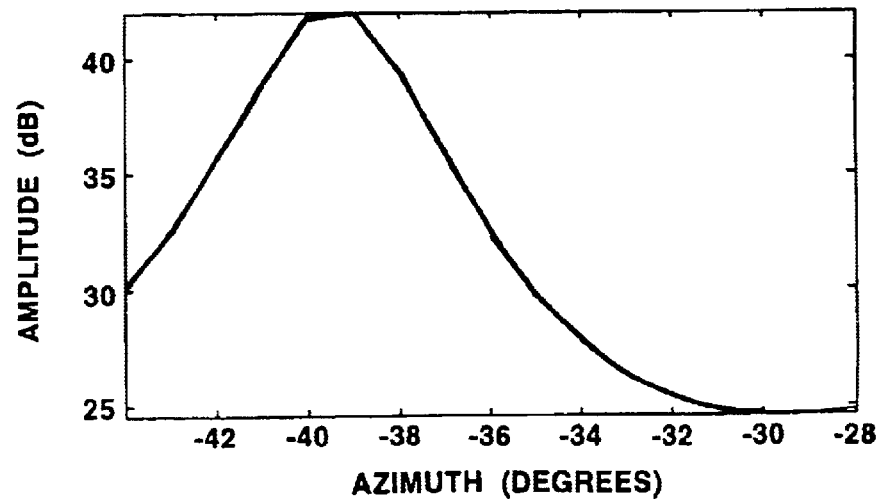

Referring now to FIGS. 12*c* to 12*e*, FIG. 12*c* shows a slice along the doppler dimension of the high-resolution range-doppler plot of FIG. 12*b* at the range of the target 84. The target 84 has a large peak compared to the surrounding background noise. FIG. 12*d* shows a slice along the range dimension of the high-resolution range-doppler plot of FIG. 12*b* at the doppler frequency of the target 84. FIG. 12*d* also shows that the target 84 has a large peak compared to the surrounding background noise. FIG. 12*e* shows a high-resolution azimuthal plot of the radar data of FIG. 12*a* at the range and doppler frequency of the target 84. FIG. 12*e* provides a relatively sharp estimate of the azimuth of the target 84.

As previously discussed, another important class of interference in HFSWR is external interference which comprises co-channel interference, atmospheric noise and impulsive noise. In co-pending patent application having Ser. No. 10/384,203, filed Mar. 7, 2003 and entitled "A Noise Suppression System and Method for Phased-Array Based Systems", the inventors of the present invention have shown that co-channel interference can be suppressed by using an adaptive array processing technique combined with a matched-mismatched filtering scheme. Matched filters receive the pre-processed radar data that is derived from radar data recorded by each sensor in the main sensor array 32 to provide matched radar data that is used to produce the main beam. Mis-matched filters receive the pre-processed radar data from at least a portion of the sensors of the main sensor array to provide mis-matched radar that is taken as the output of a virtual auxiliary sensor array. The output of the virtual auxiliary sensor array is used to produce an auxiliary beam that provides an estimate of the external interference in the main beam. Accordingly, for a given main beam azimuth, an auxiliary beam is adaptively directed towards the energy sources of external interference in the main beam to suppress the external interference in the main beam. In addition, the azimuthal resolution of the main sensor array is not compromised since each sensor in the main sensor array is used to produce the main beam, while mis-matched filtering is used to provide an independent estimate of the external interference in the main beam thus discarding the need for a physically separate auxiliary sensor array.

It is desirable to integrate the above-mentioned noise suppression method with the high-resolution spectral estimator of the present invention to suppress external interference. However, the external interference suppression method cannot be directly implemented for high-resolution spectral estimators in general since these estimators require sensor data and the noise suppression method, as it was originally formulated, produces beamformed data. To overcome this problem, a noise suppression module and method are herein described that are similar to the noise suppression method discussed above which provides noise suppressed data that may be used by the spectral estimator 10. In this method, the external interference in the radar data recorded by a given sensor is suppressed based on an estimate of the external interference provided by an auxiliary beam.

Figure 13:
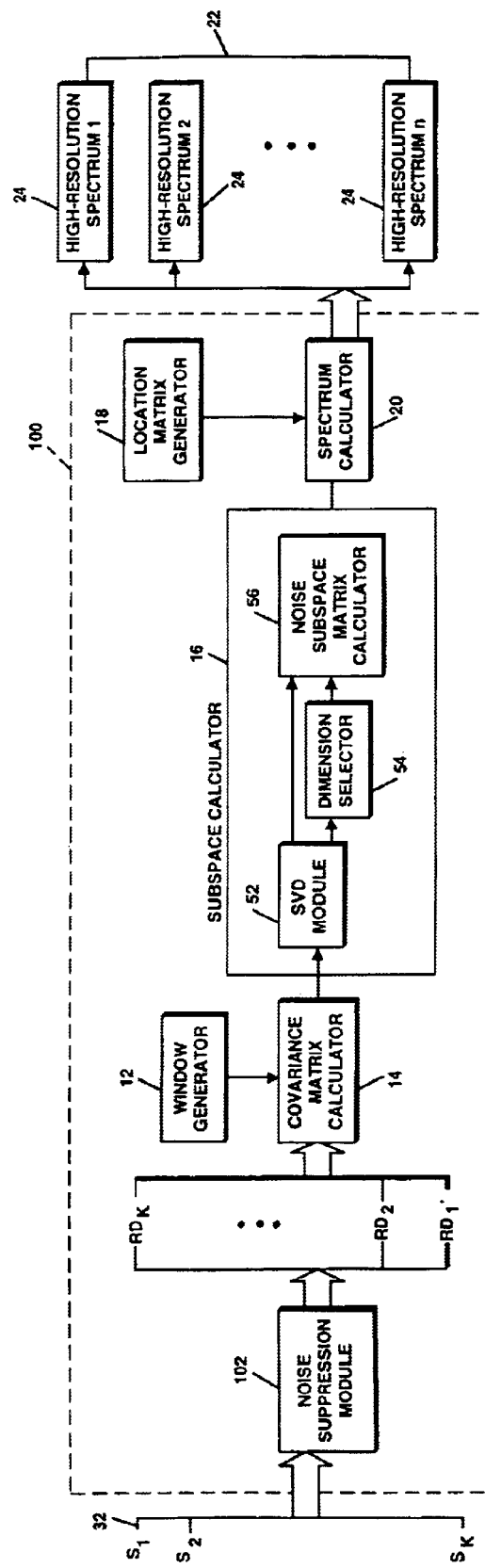
FIG. 13 is a block diagram of an alternate embodiment of the spectral generator of the present invention incorporating a noise suppression module.

Referring now to FIG. 13, shown therein is an alternate embodiment of a spectral generator 100 comprising a noise suppression module 102. The noise suppression module 102 receives the pre-processed radar data that is derived from radar data obtained from a plurality of sensors $S_1, S_2, \ldots, S_K$ from the main sensor array 32 and provides a plurality of range-doppler signals $RD_1', RD_2', \ldots, RD_K'$, in which external interference has been suppressed. The rest of the spectral generator 100 is identical to the spectral generator 10 and will not be discussed. Implementation details for the noise suppression module 102 are outlined below.

As mentioned previously, self-generated interference occurs in response to the transmitted EM pulses. Accordingly, when the radar data recorded by the main sensor array 32 is passed through a matched filter that is matched to the transmitted EM pulses, the self-generated interference as well as the radar returns from possible targets will appear at the output of the matched filter. If the data recorded by the main sensor array 32 were passed through a second filter that had an impulse response that was orthogonal to the transmitted EM pulses, then the self-generated interference and the radar returns from possible targets would not appear in the output of the second filter. However, external interference is independent of radar operation and will be present at the output of both the matched filter and the second filter.

The second filter is a mis-matched filter. A matched filter has a transfer function having only the same frequency components as those contained in the signal to which the matched filter is matched. A mis-matched filter has a transfer function that is the opposite of that of the matched filter. Accordingly, matched and mis-matched filters are defined as being orthogonal to each other or as having zero cross-correlation. Accordingly, the mis-matched filter will provide an output that may be used as an observation of the external interference that is present in the output of the matched filter. It is therefore possible to use a single receiving antenna array to provide radar data for detecting radar returns from possible targets as well as radar data for estimating external interference without encountering the disadvantages of the prior art noise reduction schemes mentioned previously (i.e. requiring an additional receiving antenna array or using some elements of the receiving antenna array only for external interference estimation thereby sacrificing azimuthal resolution).

Figure 14:
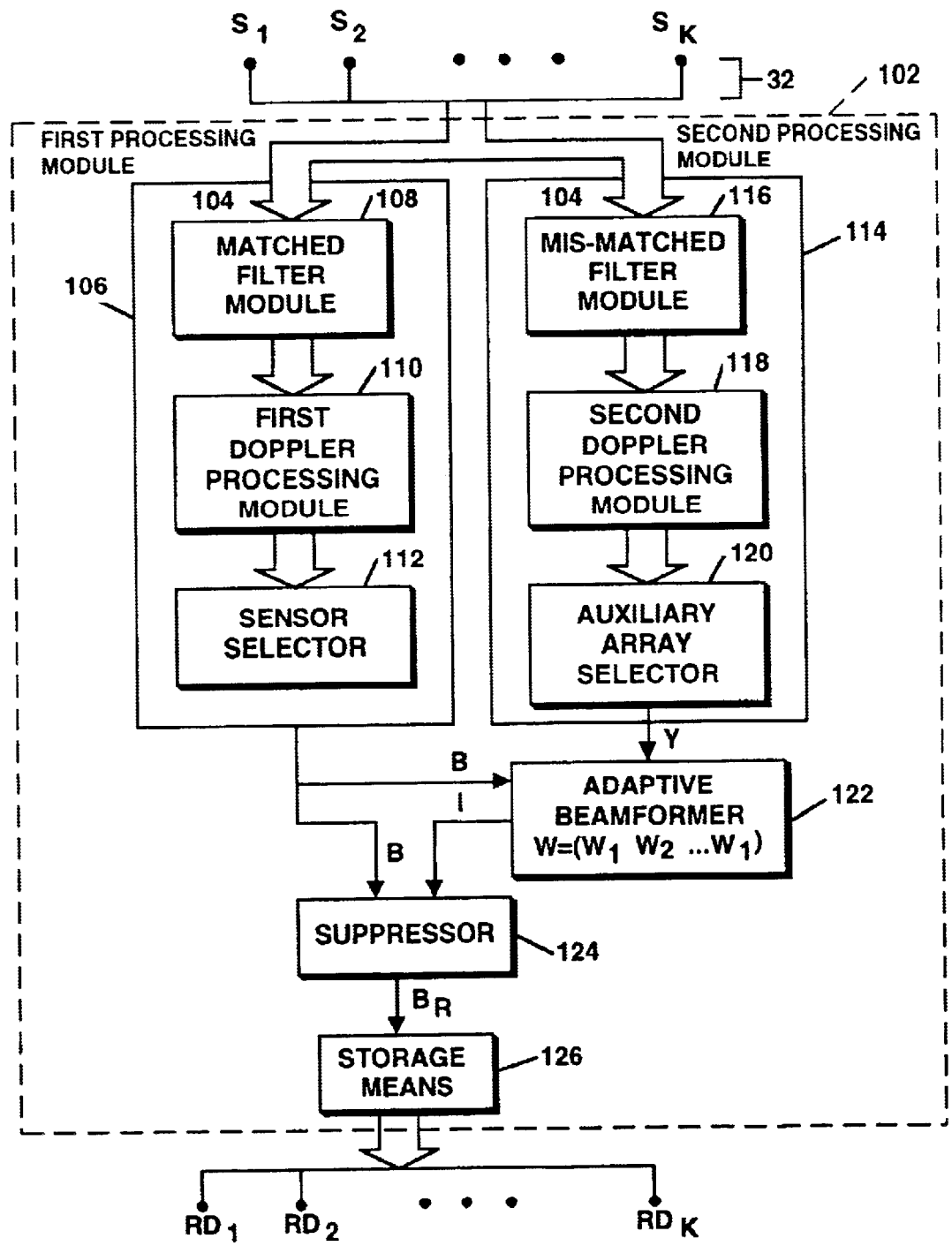
FIG. 14 is a block diagram of the noise suppression module of FIG. 13.

Referring now to FIG. 14, shown therein is a block diagram of the noise suppression module 102 in accordance with the present invention. The noise suppression module 102 is in communication with the main sensor array 32 which has a plurality of sensors $S_1, S_2, \ldots, S_K$ to provide range-pulse-sensor data which is explained in further detail below. As mentioned previously, each sensor may be any receiving antenna element known to those skilled in the art that is suitable for receiving radar signals. Furthermore, it should be understood by those skilled in the art that the radar data collected by the main sensor array 32 is subjected to conventional signal processing operations to provide pre-processed radar data 104. The conventional signal processing methods include bandpass filtering, heterodyning, A/D conversion, demodulation and downsampling. The components to effect these signal processing methods are well known in the art and are not shown in FIG. 14. Furthermore, it should be understood that all of the elements of the invention allow for the processing of data which is complex (i.e. has real and imaginary parts).

The noise suppression module 102 comprises a first processing module 106 having a matched filter module 108, in communication with the pre-processed radar data 104 and a first doppler processing module 110, in communication with the matched filter module 108. The matched filter module 110 receives the pre-processed radar data 104 and performs matched filtering on the radar data to produce matched radar data. The first doppler processing module 110 then receives the matched radar data and performs doppler processing on the data to produce matched range-doppler data.

The first processing module 106 further comprises a sensor selector 112 that is in communication with the first doppler processing module 110 to receive the matched range-doppler data. The sensor selector 112 selects the range-doppler data for a given sensor $S_i$ and provides a portion B of the matched range-doppler data for further processing by the noise suppression module 102 as described further below. The position of the sensor selector 112 may be interchanged with the matched filter module 108 or the first doppler processing module 110 as long as the last module in the first processing module 106 provides the portion B of matched range-doppler data for a given sensor $S_i$.

The noise suppression module 102 also comprises a second processing module 114 having a mis-matched filter module 116, in communication with the pre-processed radar data 104, a second doppler processing module 118, in communication with the mismatched filter module 116, and an auxiliary array selector 120 in communication with the second doppler processing module 118. The mis-matched filter module 116 receives the pre-processed radar data 104 and performs mis-matched filtering to produce mis-matched radar data. The second doppler processing module 118 then receives the mis-matched radar data and performs doppler processing to produce mis-matched range-doppler data. The auxiliary array selector 120 then receives the mis-matched range-doppler data and constructs a virtual auxiliary sensor array having sensors $A_1, A_2, \ldots, A_L$, selected from at least a portion of the plurality of sensors $S_1, S_2, \ldots, S_K$ that contributed to the radar data 104. A portion of the mis-matched range-doppler-sensor data Y is provided to produce an interference estimate as described further below.

The virtual auxiliary sensor array may comprise either all or a portion of the plurality of sensors $S_1, S_2, \ldots, S_K$ from the main sensor array 32 that contributed to the radar data 104. Accordingly, some sensors from the main sensor array 12 contribute both to the radar data 104 and to an auxiliary beam AB that is produced by the virtual auxiliary sensor array as described further below. Therefore, there should be no loss in azimuthal resolution for the high-resolution range-doppler plots 24 that are produced by the spectral generator 100. The construction of the virtual auxiliary sensor array is explained further below.

The noise suppression module 102 further comprises an adaptive beamformer 122 that is in communication with the first processing module 106 and the second processing module 114. The adaptive beamformer 122 receives the portion of matched radar data B for a given sensor $S_i$ as well as the portion of mismatched range-doppler-sensor data Y. From these inputs, the adaptive beamformer 122 generates an adaptive weight vector W=[$W_1$ $W_2$ ... $W_L$] which is applied to the portion of mismatched range-doppler-sensor data Y to generate an estimate I of the portion of matched radar data B. The estimate I is calculated for the same range and doppler cells from which the portion of matched radar data B was taken. Accordingly, the adaptive beamformer 122 produces weights that tune an auxiliary beam AB based on the mis-matched range-doppler-sensor data.

The adaptive weight vector W is generated so that the difference between the portion of matched radar data B and the estimate I is minimized. Since the portion of matched radar data B contains possible radar target returns along with self-generated interference and external interference while the estimate I only contains external interference, the difference between the portion of radar data B and the estimate I will be minimized when the adaptive weight vector W is chosen such that the external interference in the estimate I approximates the external interference in the portion of radar data B. Accordingly, the estimate I is considered to be an estimate of the external interference in the portion of matched radar data B. Therefore, for a given sensor $S_i$, the adaptive beamformer 122 tunes the auxiliary beam AB so that the external interference in the auxiliary beam AB approximates the external interference in the portion of radar data B for the sensor $S_i$.

The noise suppression module 102 further comprises a suppressor 124 and a storage means 126. The suppressor 124 is in communication with the first processing module 106 and the adaptive beamformer 122 to receive the portion of radar data B and the external interference estimate I. The suppressor 32 removes the external interference estimate I from the portion of radar data B to produce a portion of noise suppressed matched radar data $B_r$. The portion of noise suppressed radar data $B_r$ is used to construct a noise suppressed radar data set (represented by range-doppler signals $RD_1, RD_2, \ldots RD_K$) which may then be processed by the remaining components of the spectral generator 100 to produce at least one high-resolution spectrum 24. More generally, the noise suppressed radar data may be processed by the components of any conventional radar system such as a detection module and a tracker. The storage means 126 receives the portion of radar data $B_R$ and stores it in the correct location of the noise suppressed radar data set. The storage means 126 may be the RAM of a computer, a database on a computer system or a storage medium such as a hard drive, a CD-ROM, a zip drive and the like.

A technique based on Wiener theory is preferably employed to choose the adaptive weight vector W such that the external interference estimate I approximates the external interference in the portion of matched radar data B. Accordingly, the auxiliary beam AB is calculated for the virtual auxiliary sensor array such that the difference between the external interference estimate I and the portion of radar data B is minimized in a mean-square error (MSE) sense as is taught by Wiener theory.

The formulation of the adaptive weight vector W based on Wiener theory is as follows. The portion of mis-matched range-doppler-sensor data at a snap shot n (i.e. an observation in time) is represented by Y(n) and the portion of matched radar data at snap shot n is represented by B(n). The output of the adaptive beamformer 122 at snap shot n is given by equation 11:

$$\hat{I}(n|Y(n))=W^H Y(n) \quad (11)$$

where $\hat{I}(n|Y(n))$ denotes the external interference estimate I(n) given the snapshot of mis-matched radar data Y(n). As previously discussed, it is desirable to have the interference estimate Î(n|Y(n)) approximate B(n). The error in estimating Î(n|Y(n)) is therefore given by equation 12.

$$e(n) = B(n) - W^H Y(n) \quad (12)$$

Accordingly, the mean square error $J_n(W)$ is given by equation 13.

$$J_n(W) = E[e(n)e^*(n)] = E[B(n)B^*(n)] - W^H E[Y(n)B^*(n)] - E[B(n)Y^H(n)] W + W^H E[Y(n)Y^H(n)]W \quad (13)$$

Assuming that the portion of matched radar data B(n) and the portion of mis-matched range-doppler-sensor data Y(n) for a given snap shot n are jointly stationary, then equation 13 may be simplified to equation 14.

$$J_n(W) = \sigma_d^2(n) - p(n)^H W - W^H p(n) + W^H R(n) W \quad (14)$$

where $\sigma_d^2(n)$ is the variance of B(n) assuming it has zero mean and p(n) is the expectation $E[Y(n)^H \cdot B(n)]$ which is the N-by-1 vector resulting from the cross-correlation of the portion of mismatched range-doppler-sensor data Y(n) and the portion of matched radar data B(n). The symbol R(n) denotes the expectation $E[Y^H(n) \cdot Y(n)]$ which is the N-by-N autocorrelation matrix of the portion of mis-matched range-doppler-sensor data Y(n). The cross-correlation p(n) indicates the degree of similarity between the portion of matched radar data B(n) and the portion of mis-matched range-doppler-sensor data Y(n) while the autocorrelation R(n) indicates the degree of similarity between the data of the virtual auxiliary sensor array.

The mean square error function $J_n(W)$ is a second order function of the adaptive weight vector W assuming that the portion of mis-matched range-doppler-sensor data Y(n) and the portion of matched radar data B(n) are jointly stationary. The goal is to minimize the mean square error function $J_n(W)$ by selecting an optimum adaptive weight vector $W_{O,n}$. Accordingly, as is well known to those skilled in the art, the mean-square error $J_n(W)$ is differentiated with respect to the adaptive weight vector W and the derivative is set equal to zero as shown in equation 15.

$$\frac{dJ_n(W)}{dW} = -2p(n) + 2R(n)W = 0 \quad (15)$$

The solution of equation 15 yields the optimum set of adaptive weights $W_{O,n}$ which is given by equation 16.

$$R(n)W_{O,n} = p(n) \rightarrow W_{O,n} = R(n)^{-1} p(n) \quad (16)$$

To implement the noise suppression module 102, an estimate of the autocorrelation matrix R(n) and the cross-correlation vector p(n) is required. The expected value operator E[ ] that is used in the calculation of R(n) and p(n) may be replaced with the averaging operator as is commonly known to those skilled in the art. However, the averaging should be carried out over a portion of data in which the maximum amount of external interference exists. Furthermore, R(n) and p(n) must be estimated in a way that the energy of possible targets in the radar data plays an insignificant role. This is preferable since both the main sensor array 32 and the virtual auxiliary sensor array share the same sensors.

Figure 2:
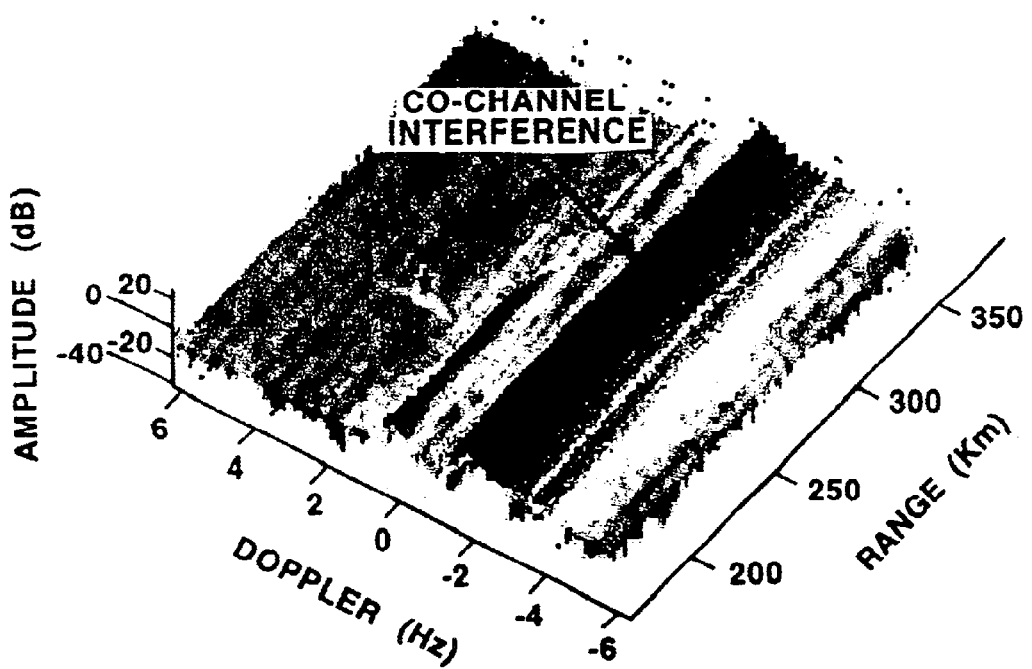
FIG. 2 is a range-doppler plot for an example of radar data containing co-channel interference.
Figure 3:
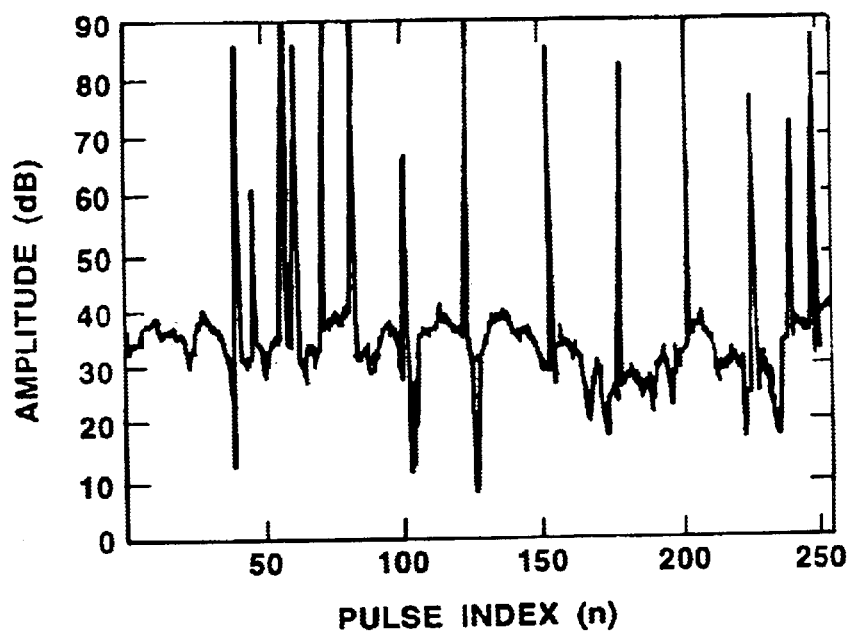
FIG. 3 is a plot of amplitude versus pulse index at a given range for an example of radar returns having impulsive noise.
Figure 4:
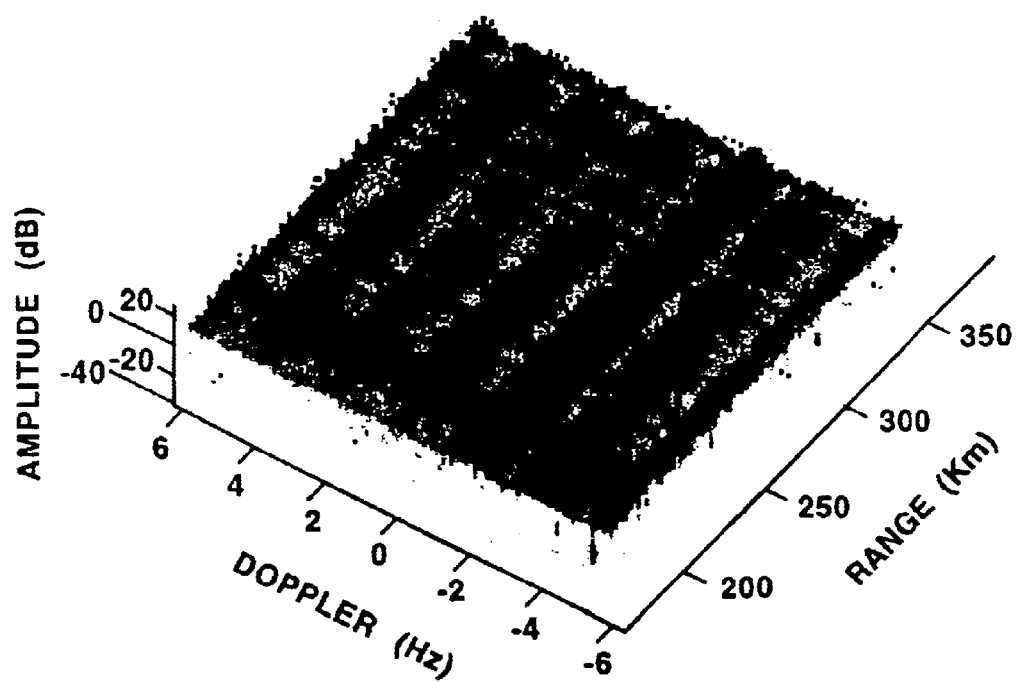
FIG. 4 is a range-doppler plot for an example of radar data containing impulsive noise.
Figure 15:
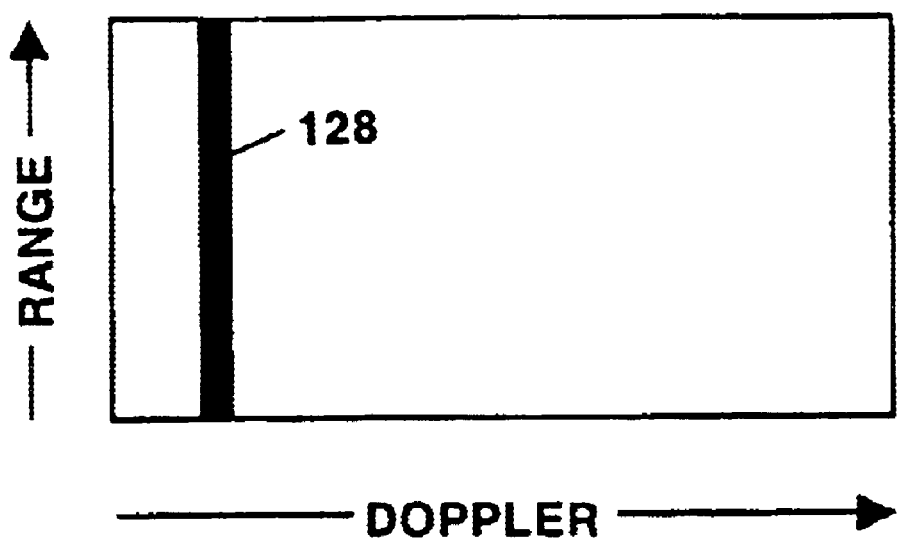
FIG. 15 is a range-doppler plot illustrating the shape of a region over which correlation-based calculations are preferably done for external interference estimation.

Referring to FIG. 2, co-channel interference exists throughout the range space for specific doppler frequencies as can be seen by the ridges occurring at doppler frequencies between −2 and −4 Hz. Conversely, referring to FIG. 4, impulsive noise is spread throughout the entire range-doppler space. A good estimate of external interference comprising both co-channel interference and impulsive noise may be obtained by averaging range-doppler data over areas having a significant overlap of co-channel interference and impulsive noise. In other words, the shape of the region over which averaging is performed is preferably selected such that it includes most of the interference. This amounts to averaging the range-doppler data along the range-dimension at a given doppler frequency as represented by the strip 128 shown in FIG. 15. Alternatively, this strip 128 may be another shape (this is dictated by the shape of the interference). Accordingly, the cross-correlation vector p(n) at snap shot n can be estimated along the range dimension for a given doppler frequency $D_i$ according to equation 17:

$$\hat{p}(n, D_1) = \frac{1}{N_r} \sum_{r=1}^{N_r} Y^*(n, r, D_i) B(n, r, D_i) \quad (17)$$

where r represents range index and $N_r$ is the number of range cells in the averaging process. Similarly, the autocorrelation matrix R(n) at snap shot n can be estimated along the range dimension for a given doppler frequency $D_i$ according to equation 18.

$$\hat{R}(n, D_1) = \frac{1}{N_r} \sum_{r=1}^{N_r} Y^*(n, r, D_i) Y(n, r, D_i) \quad (18)$$

To simplify the rest of the description, the snap shot index (n) will be discarded.

Figure 16:
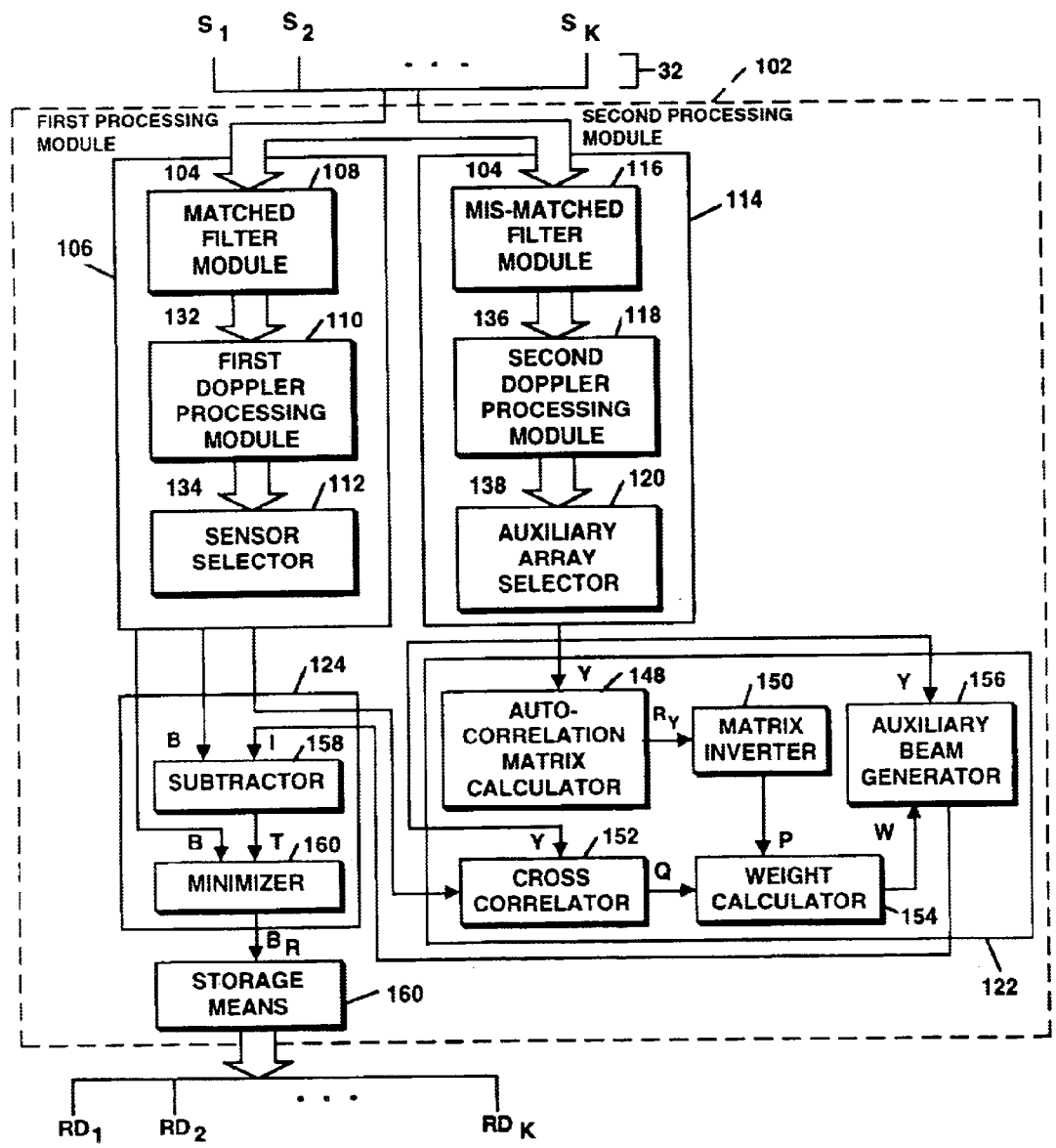
FIG. 16 is a more detailed block diagram of the noise suppression module of FIG. 14.

Referring now to FIG. 16, shown therein is a more detailed block diagram of the noise suppression module 102 of the present invention. Reference will also be made to FIGS. 17a to 17h which show the radar data at various nodes in the noise suppression module 102 to facilitate explaining the operation of the module 102 in accordance with the present invention. Pre-processed radar data 104 is obtained from the operation of pre-processing elements on the radar data recorded by the plurality of sensors $S_1, S_2, \ldots, S_K$ of the main sensor array 32 as previously mentioned. The modules that perform these pre-processing operations are not shown in the block diagram of FIG. 16. The pre-processed radar data 104 may be represented by a three dimensional matrix of range-pulse-sensor data (represented by the thick block lines in FIG. 16). Furthermore, the radar data 104 has been preferably calibrated to correct for known phase and amplitude errors in each sensor. Calibration is preferably done by having a transmitter moved to various known locations in the surveillance area and transmitting EM pulses that are recorded by the main sensor array 32. The locations of the transmitter are then derived from the recorded radar data and compared with the known locations of the transmitter to provide a calibration vector having a plurality of weights that are used to calibrate the radar data recorded by the main sensor array 32. Calibration vectors may be generated for various transmission frequencies.

Figure 17A:
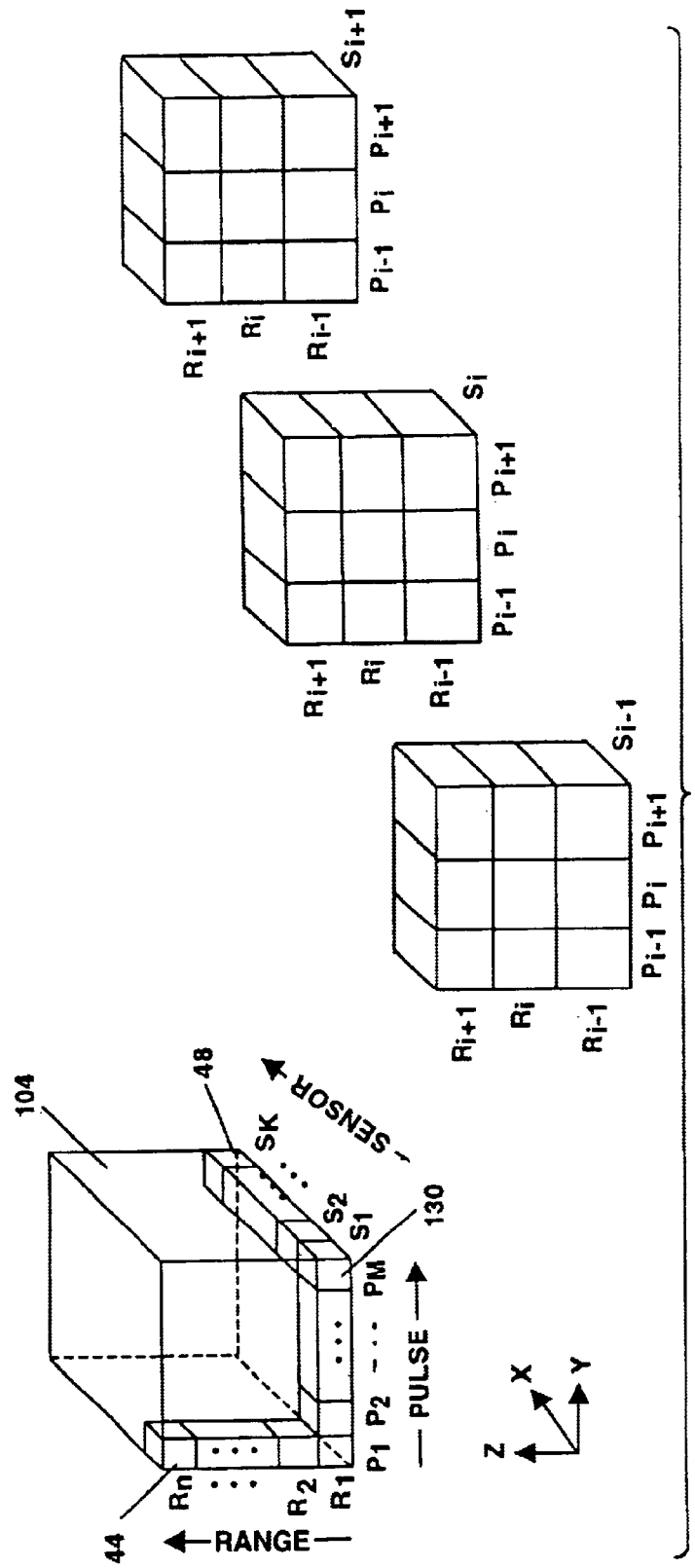
FIGS. 17a to 17h illustrate the radar data at various nodes in the noise suppression module of FIG. 16.

The organization of the range-pulse-sensor data 104 is shown in FIG. 17a with the range dimension extending along the z axis, the pulse dimension extending along the y axis and the sensor dimension extending along the x axis according to the x-y-z coordinate system shown therein. Preferably, the radar data is segmented into time segments in accordance with a CIT. The CIT may be different given different radar modes of operation such as ship mode or air mode as previously discussed.

Range vector 44 and sensor vector 48 have previously been described and will not be further discussed here. Pulse vector 130 comprises a series of pulse cells having pulse index values $P_1, P_2, \ldots, P_M$ that contain EM values that were recorded by sensor $S_1$ at the range value of the range index value $R_1$ for each pulse that was transmitted in the CIT. Accordingly, the pulse index $P_1$ represents the first pulse that was transmitted, the pulse index $P_2$ represents the second pulse that was transmitted, etc. The sampled EM values within the pulse vector 130 were all sampled at the same time after each EM pulse was transmitted (hence they all correspond to the range value represented by range index $R_1$). FIG. 17a also shows portions of range-pulse two-dimensional data for a given sensor to show how the radar data 104 is organized. As is evident from FIG. 17a, there are a plurality of range vectors 44, pulse vectors 130 and sensor vectors 48 that make up the range-pulse-sensor radar data 104.

The pre-processed range-pulse-sensor data 104 is provided to the matched filter module 108 which match filters the data 104 to provide matched range-pulse-sensor data 132. The matched filter module 108 is preferably a digital filter with a transfer function that is matched to the transmitted EM pulses. The matched filter module 108 may comprise a single digital filter that operates along the range dimension for a given pulse index $P_I$ and a given sensor $S_i$ (i.e. the matched filter operates on range vectors such as range vector 44 from the radar data 104). This matched filtering operation is performed for each pulse index $P_I$ and each sensor $S_i$. The match filtering may be done in a sequential manner such that the transfer function of the matched filter is changed depending on the pulse return being processed (i.e. matched to the EM pulse that evoked the current pulse return). Alternatively, the matched filter module 16 may comprise a bank of digital filters, each having a transfer function matched to one of the transmitted EM pulses. The system would then switch the incoming pulse returns to the corresponding matched filter.

The transmitted EM pulses are preferably designed utilizing Frank codes to combat range wrap (Frank R. L., IEEE Trans. On IT, Vol. 9, pp. 43–45, 1963). Accordingly, Frank codes are also used to generate the filter coefficients for the matched filter module 108. Frank codes are used to phase modulate each generated EM pulse as is well known to those skilled in the art. Accordingly, a given EM pulse is divided into subpulses which each have a phase in accordance with a Frank code obtained from a Frank code matrix. The generated EM pulses are all orthogonal to each other since the rows of a Frank code matrix are orthogonal. An example of a P4 Frank matrix is P4=[1 1 1 1; 1 j–1 j; 1–1 1–1; 1–j–1 j] where the rows of the matrix are separated by a semicolon. Accordingly an EM pulse based on the fourth row of the Frank P4 matrix, for example, would have four sinusoidal sub-pulses having phases of 0°, 270°, 180° and 90° respectively. Furthermore, the coefficients of a matched filter that is matched to this EM pulse would have the same samples as the generated EM pulse that are complex conjugated and in reversed order. This may be repeated for each row of the Frank P4 matrix so that there would be 4 distinct EM pulses and 4 distinct matched filters. These four distinct EM pulses would be repeatedly transmitted in a sequential fashion such as EM1, EM2, EM3 and EM4 (where each number represents a row in the P4 matrix). The radar returns are then processed by the corresponding matched filter.

Other Frank codes based on a P8, P16 or a P32 matrix may also be used. However, in the case of a P32 matrix, the phases required for phase modulation would need to be precisely generated since the phases are much closer together and this requires more expensive hardware. Other codes, such as Barker codes, may be used given different requirements for the bandwidth of the generated EM pulses.

Figure 17B:
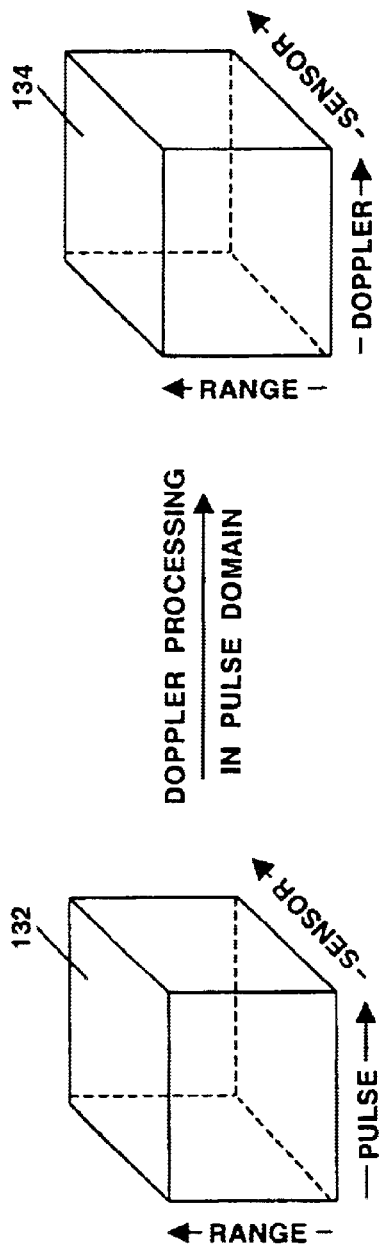

The matched range-pulse-sensor data 132 is then provided to the first doppler processing module 110 which processes the data to provide matched range-doppler-sensor data 134. The first doppler processing module 106 performs doppler processing along the pulse dimension (or pulse domain) of the matched range-pulse-sensor data 132 to provide the matched range-doppler-sensor data 134. Doppler processing preferably includes performing an FFT with an appropriate window function on each pulse vector 130 to convert the time series data for each range index value $R_I$ to a frequency series. FIG. 17b illustrates the conversion of the matched range-pulse-sensor data 132 into the matched range-doppler-sensor data 134. Alternatively, instead of using the FFT to implement doppler processing, a bank of narrowband filters may be used as is commonly known to those skilled in the art.

Figure 17C:
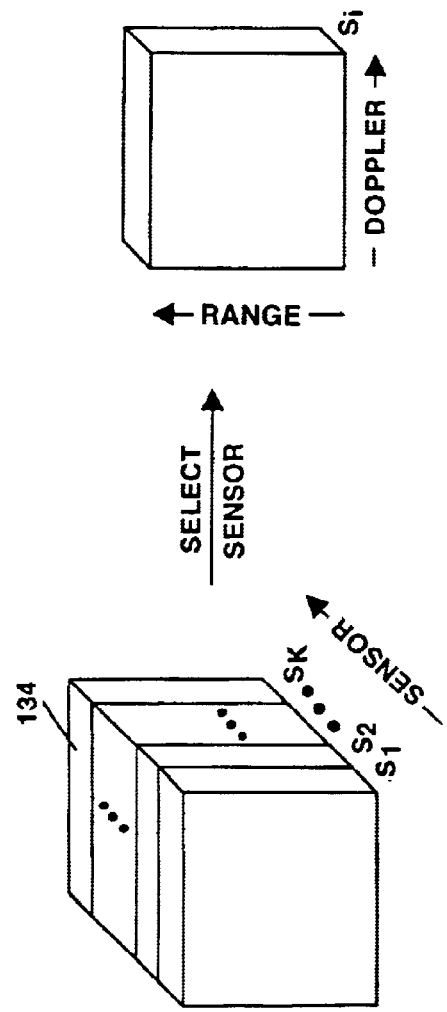

The matched range-doppler-sensor data 134 is then provided to the sensor selector 112 which selects matched range-doppler data for a given sensor $S_i$ from the matched range-doppler-sensor data 134. This operation is shown in FIG. 17c. The sensor selector 112 also provides a portion B of the selected matched range-doppler sensor data for further processing as described below.

The pre-processed range-pulse-sensor data 104 is also provided to the mis-matched filter module 116 which "mis-match" filters the radar data 104 to provide mis-matched range-pulse-sensor data 136. The mis-matched filter module 116 is preferably a digital filter with a transfer function that is mis-matched to the transmitted EM pulses. The mis-matched filter module 116 may be implemented and operated on the range-pulse-sensor data 104 in the same fashion as the matched filter module 108 to produce the mis-matched range-pulse-sensor radar data 136. However, in this case the mis-matched filter uses a transfer function that rejects the transmitted EM pulse. Accordingly, using the example given above for the matched filter module 108, if the transmitted EM pulse was generated based on the fourth row of the Frank P4 matrix, then the phases of sinusoidal sub-pulses would be obtained from any of the rows of the Frank P4 matrix other than the fourth row. The resulting sinusoidal sequence would then be reversed in order to obtain the coefficients of the mis-matched filter in the mis-matched filter module 116. Accordingly, if the rows of the P4 matrix are sequentially used to repeatedly provide a series of EM pulses then a series of mis-matched filters would be needed in the mis-matched filter module 116 to process the returns of each of these EM pulses such that the mis-matched filter output is uncorrelated to the matched filter output produced by the matched filter module 108.

The mis-matched range-pulse-sensor data 136 is then provided to the second doppler processing module 118 which processes the data to produce mis-matched range-doppler-sensor data 138. The second doppler processing module 118 is implemented in a similar fashion to the first doppler processing module 110 and will not be further discussed.

Figure 17D:
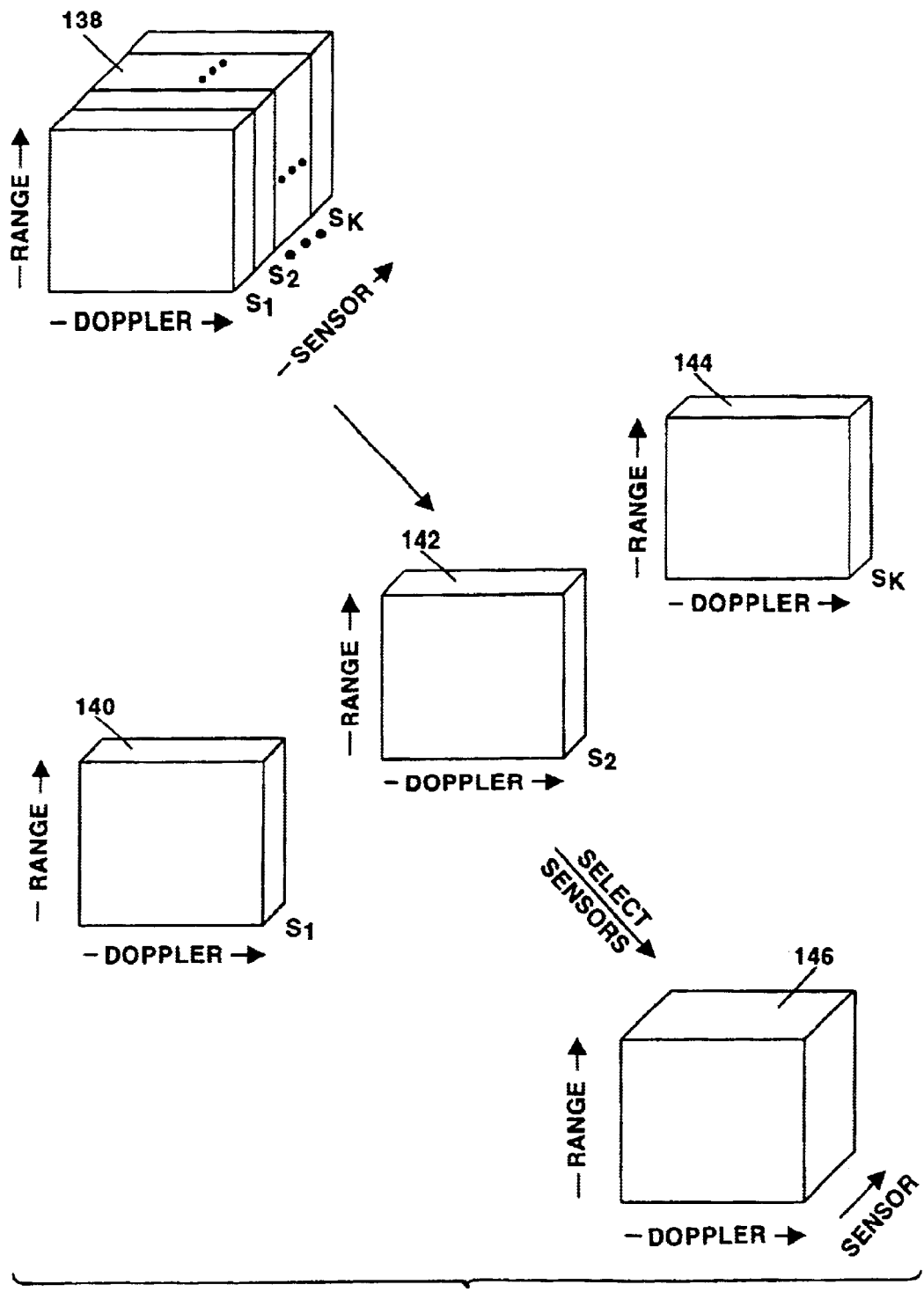

The second processing module 114 further comprises the auxiliary array selector 120 which provides mis-matched range-doppler-sensor data for constructing the virtual auxiliary sensor array. Referring to FIG. 17d, this corresponds to taking the mis-matched range-doppler-sensor data 138, dividing the data 138 into two-dimensional slices 140, 142, ..., 144, and selecting a subset of these slices (I.e. selecting L slices) which are then concatenated to form mis-matched range-doppler-sensor data 146. The array of sensors contributing to the data 146 are referred to as the virtual auxiliary sensor array having sensors $A_1, A_2, \ldots, A_L$ (not shown). The auxiliary array selector 120 also provides a portion Y of the mis-matched range-doppler sensor data 146 for further processing as described below.

As previously mentioned, the virtual auxiliary sensor array may be constructed from all or a subset of the sensors from the main sensor array 32 that contribute to the radar data 104. If the virtual auxiliary sensor array comprises a subset of the main sensor array 32 then one condition should preferably be satisfied. The aperture size of the virtual auxiliary sensor array should be the same as the aperture size of the main sensor array 32. This means that the leftmost and rightmost spatially oriented sensors in the main sensor array 32 that contributed to the radar data 104 should also be the leftmost and rightmost spatially oriented sensors in the virtual auxiliary sensor array. Furthermore, given a fixed main sensor array 32, the virtual auxiliary sensor array may be predetermined before the operation of the noise suppression module 102. Accordingly, during the operation of the noise suppression module 102, the sensors in the virtual auxiliary sensor array may be supplied by a look-up table given a desired number of sensors in the virtual auxiliary sensor array. The look-up table indicates the position of each auxiliary array sensor $A_I$ in the main sensor array 32.

Although the block diagram in FIG. 16 shows that the auxiliary array selector 120 is connected between the second doppler processing module 118 and the adaptive beamformer 122, the position of the auxiliary array selector 120 may be changed for more efficient signal processing. For instance, the auxiliary array selector 120 may be placed between the mis-matched filter module 116 and the second doppler processing module 118. Alternatively, the auxiliary array selector 122 may be located before the mis-matched filter module 116.

The noise suppression module 102 further comprises the adaptive beamformer 122 which is in communication with the second processing module 114 and the first processing module 106. The adaptive beamformer 122 comprises an autocorrelation matrix calculator 148, a matrix inverter 150, a cross correlator 152, a weight calculator 154 and an auxiliary beam generator 156 connected as shown in FIG. 16.

Figure 17E:
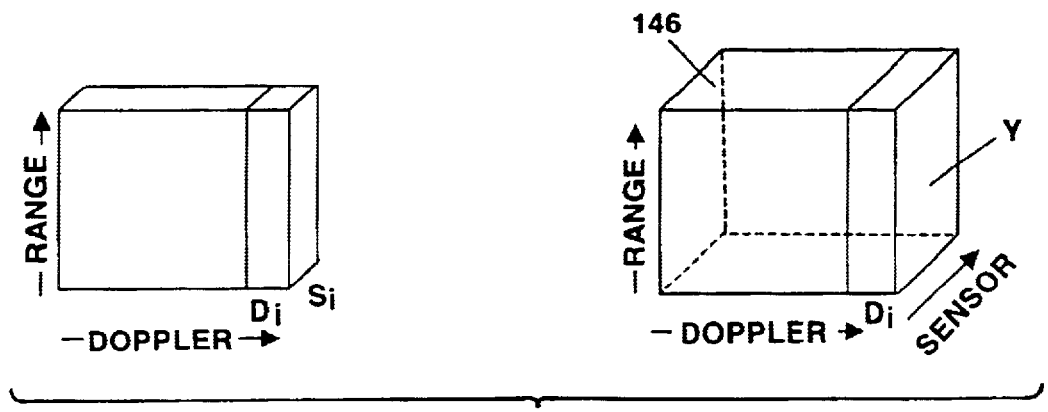

The autocorrelation matrix calculator 148 receives the portion of the mis-matched range-doppler-sensor data Y from the virtual auxiliary sensor array and generates the autocorrelation matrix $R_y$ according to equation 18 (i.e. $R_Y = Y_H \cdot Y$). Referring to FIG. 17e, the portion of radar data Y corresponds to a two-dimensional slice of range-sensor data for a given doppler index $D_I$. Therefore, the portion of radar data Y is a matrix having a dimension of N-by-L (i.e. N range cells and L sensors). The autocorrelation matrix calculator 148 generates the autocorrelation matrix $R_Y$ by performing matrix multiplication between the matrix Y and the matrix $Y^H$. The dimension of the autocorrelation matrix $R_Y$ is L-by-L (i.e. L rows and L columns).

The matrix inverter 150 receives the autocorrelation matrix $R_Y$ and performs matrix inversion to obtain the inverse autocorrelation matrix $P = R_Y^{-1}$ using any inversion means commonly known to those skilled in the art. In the event that the portion of radar data Y does not contain much noise, the autocorrelation matrix $R_Y$ may be rank deficient. This may be determined by calculating the condition number of the autocorrelation matrix $R_Y$. In this situation, the pseudo-inverse operator may be employed to obtain the inverse autocorrelation matrix P. The dimension of the inverse autocorrelation matrix P is L-by-L. The equations needed for obtaining the condition number and the pseudo-inverse of $R_Y$ are well known to those skilled in the art.

The cross correlator 152 receives the portion of mis-matched range-doppler-sensor data Y from the virtual auxiliary sensor array as well as the portion of matched range-doppler data B from the first processing module 106 and calculates the cross-correlation vector Q as given by equation 17 (i.e. $Q = Y^H \cdot B$). Referring again to FIG. 17e, the portion of radar data B is a range vector for a given sensor $S_i$ and the same doppler index $D_I$ corresponding to the portion of data Y. The portion of data B has a dimension of N-by-1. The cross correlator 152 performs matrix multiplication to generate the cross-correlation vector Q having a dimension of L-by-1 (i.e. (L-by-N)*(N-by-1)=L-by-1).

The weight calculator 154 receives the cross-correlation vector Q and the inverse autocorrelation matrix P and produces the adaptive weight vector W by performing matrix multiplication according to equation 16. Accordingly, the adaptive weight vector W is a row vector having a dimension of L-by-1. The auxiliary beam generator 156 receives the adaptive weight vector W and the portion of radar data Y and generates an estimate of the interference I in the portion of radar data B according to equation 19.

$$I = W^H \cdot Y \tag{19}$$

Accordingly, the interference estimate I is a vector having a dimension of 1-by-N.

The noise suppression module 102 further comprises the suppressor 124 which includes a subtractor 158 and a minimizer 160 in communication with the subtractor 158. The subtractor 158 receives the portion of radar data B and the external interference estimate I and provides a vector or subtraction signal T according to equation 20.

$$T = B - I \tag{20}$$

Figure 17F:
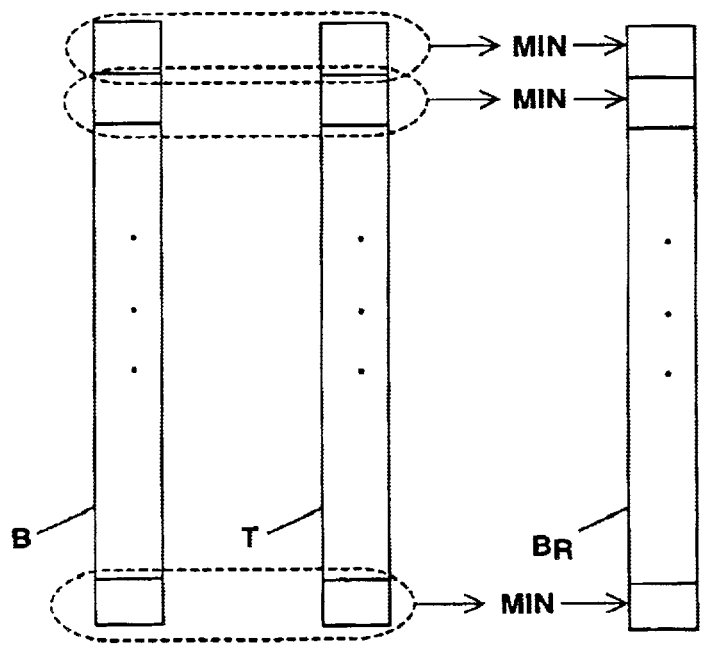

The minimizer 160 receives the vector T and the portion of radar data B and generates a portion of noise suppressed matched range-doppler data $B_R$ according to equation 21:

$$B_R = \min(B, T) \tag{21}$$

where the operator min( ) is defined by lining up the two vectors B and T, taking a value from a cell in the vector B, taking a value from the same cell in the vector T and placing the minimum of these two values in the same cell in the vector $B_R$ as shown in FIG. 17f. This operation is repeated for all cells in the vectors B and T.

Figure 17G:
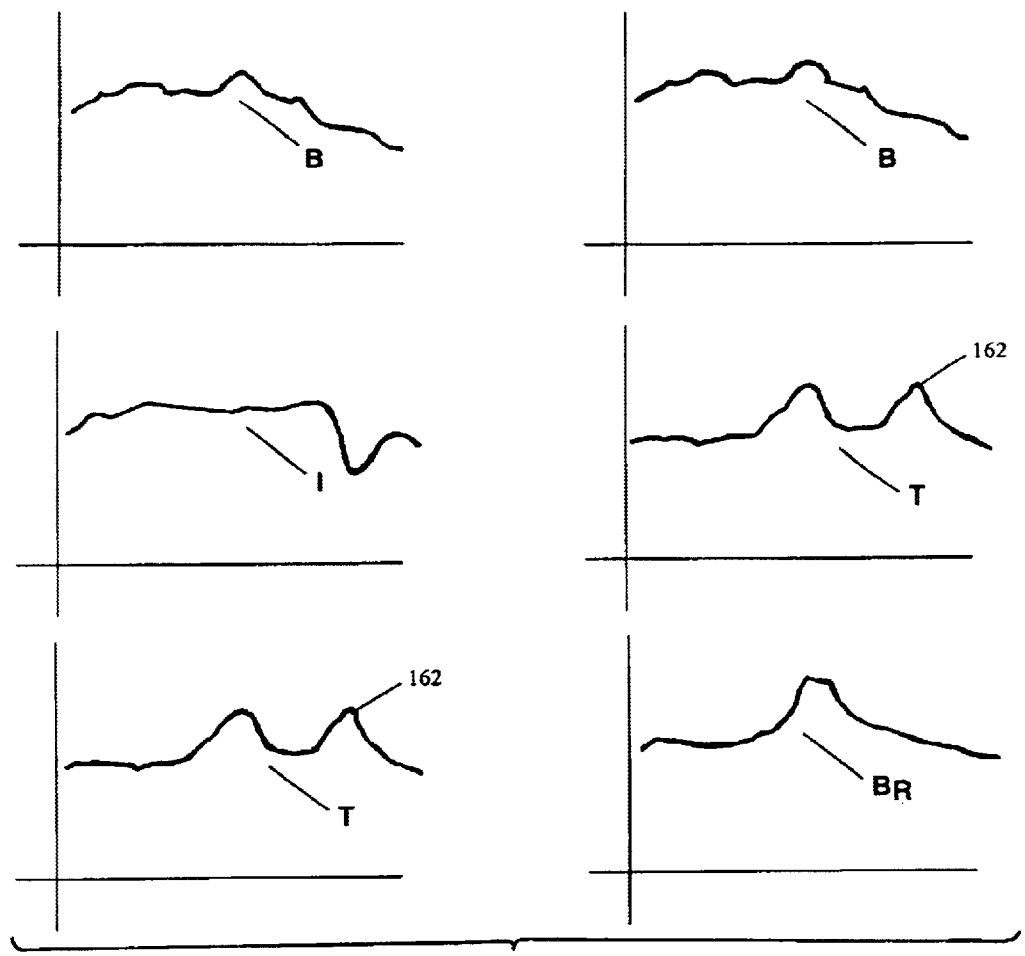

Referring now to FIG. 17g, shown therein are a series of vectors (which may also be referred to as data series or signals) which assist in explaining the function of the suppressor 124. For a given portion of radar data B and an external interference estimate I, the vector T is generated by vector subtraction. However, there is the possibility of extraneous noise 162 occurring in the external interference estimate I. The extraneous noise 162, which results from the operation of the mis-matched filter module 116, is also contained within the vector T. Accordingly, the vector T cannot be directly used as the portion of noise suppressed matched radar data $B_R$. Rather, the vector T and the portion of radar data B are processed by the minimizer 160 which lines up the two vectors B and T and selects the minimum elements of these two vectors when constructing the vector $B_R$ as previously discussed. Consequently, if there is any extraneous noise 162 within the external interference estimate I then the minimizer 160 will remove it.

Figure 17H:
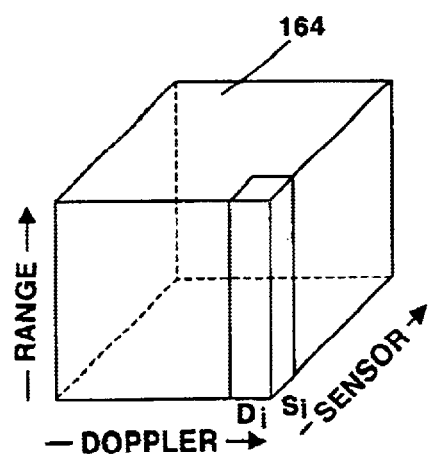

Referring now to FIG. 17h, the vector $B_R$ is used to construct the noise suppressed matched radar data 164. The position of the vector $B_R$ within the noise suppressed radar data 164 is the same as the position of the vector B within the radar data shown in FIG. 17e. Accordingly, the noise suppressed radar data 164 is built up one range vector at a time. In this fashion, for a given sensor $S_i$, the portion of data B may be obtained for a given doppler index $D_i$ and the external interference estimate I calculated for that same doppler index to provide a portion of noise suppressed data $B_R$ as discussed above. This operation is then repeated along the doppler dimension (i.e. for each doppler index) for the chosen sensor $S_i$ until all of the doppler indices have been processed. The range-doppler data of the next sensor is then selected by the sensor selector 112 and processed in the same fashion. This operation is repeated until all of the range-doppler data $RD_1, RD_2, \ldots, RD_K$ has been processed by the noise suppression module 102 in order to construct the noise suppressed radar data 164 (from which the range-doppler data signals $RD_1', RD_2', \ldots, RD_K'$ corresponding to sensors $S_1, S_2, \ldots, S_K$ is obtained).

Figure 18:
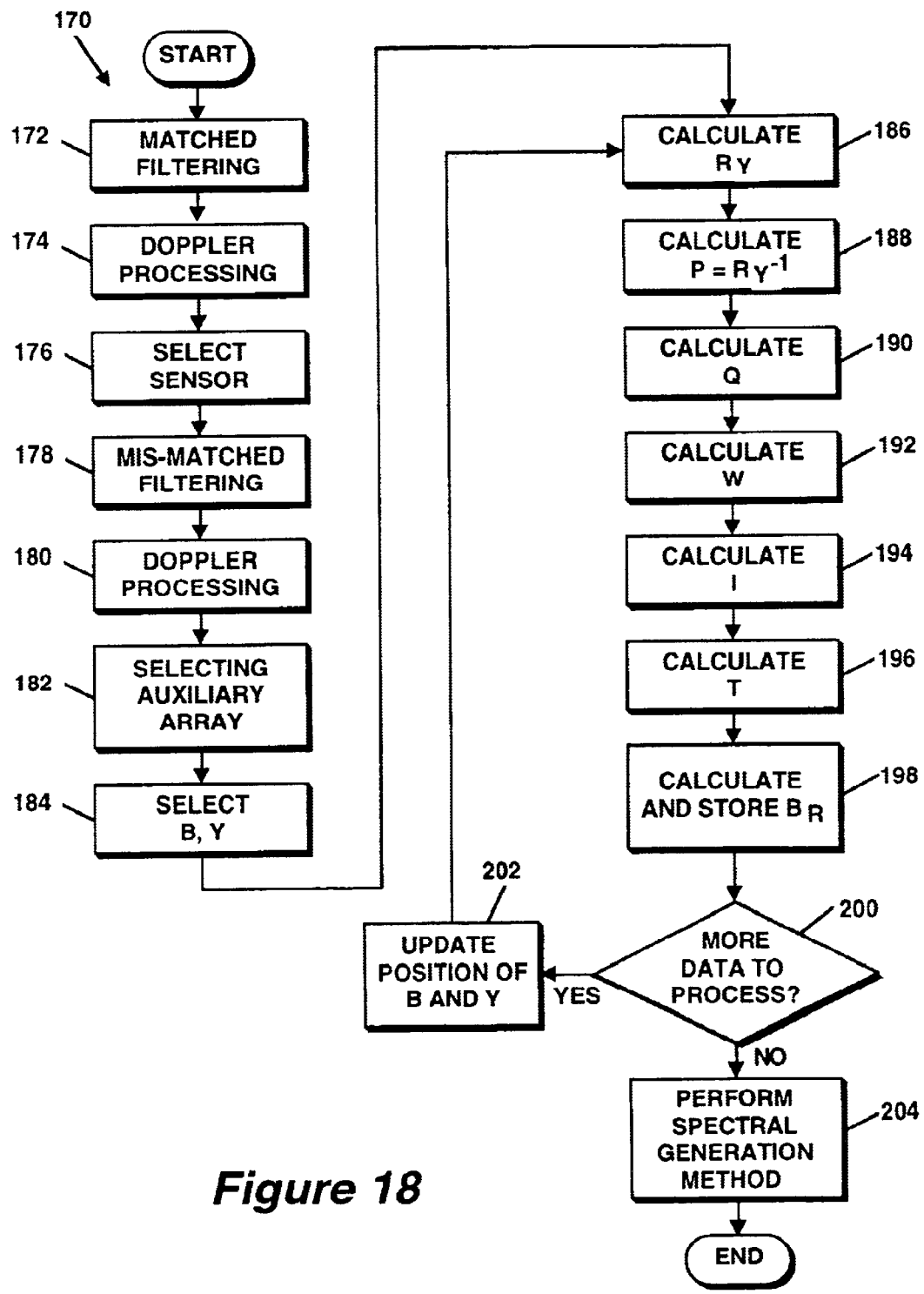
FIG. 18 is a flowchart of a noise suppression method in accordance with the noise suppression module of FIG. 16.

Referring now to FIG. 18, shown therein is a noise suppression method 170 for suppressing noise in radar data in accordance with the noise suppression module 102 of the present invention. The radar data has been sampled by the main sensor array 32 for a length of time in accordance with a CIT and has been preprocessed and calibrated as previously discussed. The duration of the CIT is set according to the radar mode of operation. The noise suppression method 170 begins at step 172 where the range-pulse-sensor radar data 104 is matched filtered as explained above. The next step 174 is to perform doppler processing on the match filtered range-pulse-sensor data to provide matched range-doppler-sensor data. As mentioned previously, doppler processing may comprise performing an FFT with an appropriate window function or utilizing filter bank processing. The next step 176 is to select matched range-doppler data for a sensor $S_i$.

At step 178, mis-matched filtering is performed on the range-pulse-sensor radar data 104. The next step 180 is to perform doppler processing on the mis-matched filtered range-pulse-sensor data to provide mis-matched range-doppler-sensor data. The next step 182 is to select a virtual auxiliary sensor array given the sensors from the main sensor array 32 that contributed to the range-doppler-sensor data signals 104. Accordingly, steps 178 to 182 may be summarized as providing mis-matched range-doppler-sensor data for the virtual auxiliary sensor array given the range-pulse-sensor data that was derived from the radar data recorded by the main sensor array 32. As mentioned previously, the selection of the virtual auxiliary sensor array may occur before the doppler processing step 180 or before the mis-matched filtering step 178 for more efficient signal processing.

At step 182, portions of radar data B and Y are selected. The radar data B is selected from the matched range-doppler data selected for a given sensor $S_I$ and is a range vector for a given doppler index. The radar data Y is selected from the mis-matched range-doppler-sensor data of the virtual auxiliary sensor array and is a two-dimensional slice of range-sensor data for the same doppler index of the radar data B.

The next series of steps 186 to 198 of the noise suppression method 170 perform adaptive beamforming on the portion of the mis-matched range-doppler-sensor data Y to provide an estimate I of the external interference in the portion of the matched range-doppler data B. The adaptive beamforming starts at step 186 where the autocorrelation matrix $R_Y$ ($R_Y = Y^H \cdot Y$) of the radar data Y is calculated. At step 188, the inverse autocorrelation matrix P ($P = R_Y^{-1}$) is calculated. The noise suppression method 170 then moves to step 190 where the cross-correlation vector Q ($Q = Y^H \cdot B$) is calculated. The adaptive weight vector W is then calculated at step 192 based on the inverse autocorrelation matrix P and the cross-correlation vector Q ($W = P \cdot Q$). The estimate of the external interference I ($I = W^H \cdot Y$) within the portion of matched range-doppler data B is then calculated at step 194.

The noise suppression method 170 then moves to steps 196 and 198 where the external interference estimate I and the portion of matched range-doppler data B is used to obtain a portion $B_R$ of noise suppressed matched range-doppler data. At step 196, the external interference estimate I is subtracted from the portion of matched range-doppler data B to form the vector or subtraction signal T. Next, at step 198, a given element in the portion of matched range-doppler data B is compared to an element at the same location in the vector T and the minimum of these two elements is stored at the same location in the portion of noise suppressed matched range-doppler data $B_R$. This is repeated for each element in the radar data B. Once the noise suppressed matched range-doppler data has been constructed, it is stored in its proper location in the storage means 126.

The next step 200 of the noise suppression method 170 is to determine if there is more radar data to process. If there is no more radar data to process then the noise suppression method 170 is finished. At this point (step 204) the noise suppressed data may be used in the spectral generation method 60 to produce at least one of a plurality of high-resolution spectrums 24. Otherwise, the next step 202 is to update the portion of beamformed range-doppler data B and the portion of mis-matched range-doppler-sensor data Y from the virtual auxiliary sensor array. The updating is performed as previously explained for the noise suppression module 102. Steps 186 to 200 are then repeated.

Under certain conditions, strong ionospheric noise may appear in the form of horizontal strips in the generated range-doppler data for a given sensor $S_I$. This appears as interference in a number of range-doppler cells at a given range index. In this situation, it is preferable to avoid the radar data from these range-doppler cells in the calculation of the autocorrelation matrix $R_Y$ and the cross-correlation matrix Q since these contaminated range-doppler cells may harm the performance of the adaptive beamformer 122. One way to remove the contaminated data from the calculation is to utilize a median filter which calculates the median (M) for a range vector B' and generates a threshold value ($\lambda$) according to equation 22:

$$\lambda = v \cdot M \quad (22)$$

where v represents a constant value. The data in the range vector B' may then be median filtered according to equation 23.

$$OB(i) = B'(i) \text{ if } B'(i) < \lambda$$
$$OB(i) = 0 \text{ if } B'(i) > \lambda \quad (23)$$

Accordingly, all values in B' that are above the threshold value $\lambda$ are set to zero in OB.

Figure 19:
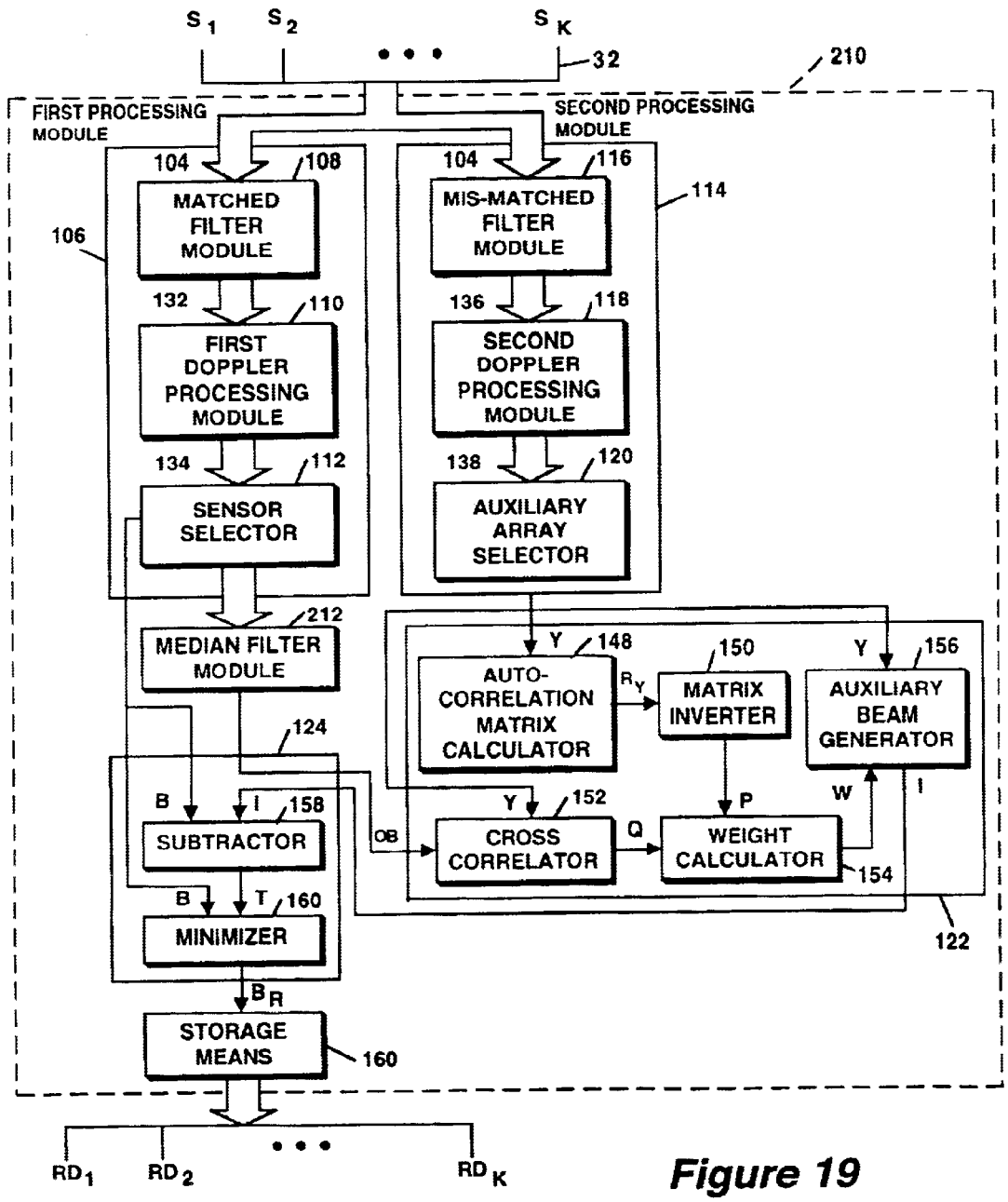
FIG. 19 is an alternative embodiment of the noise suppression module of the present invention.

Referring now to FIG. 19, shown therein is a noise suppression module 210 that incorporates a median filter module 212 that is coupled to the first processing module 106 and the adaptive beamformer 122. The rest of the noise suppression module 210 is similar to the noise suppression module 102 and will not be discussed. The median filter module 212 performs median filtering on the matched range-doppler data 214 for a given sensor $S_I$. The median filter module 212 preferably uses a value of 1.75 for the constant v. This value was determined empirically and may be changed if the results are not satisfactory. For instance, there may be situations in which the ionospheric clutter is extremely severe in which case the value of the constant v must be decreased to remove more ionospheric clutter. The median filter module 212 may operate column-wise on each range vector that makes up the matched range-doppler data 214. A vector OB, which is a portion of the median filtered matched range-doppler data, is provided to the adaptive beamformer 122 so that the external interference estimate may be generated and subtracted from the portion of the matched radar data as previously discussed.

As an alternative, other ordered statistics filtering methods may be used in place of median filtering. One such example comprises choosing a constant integer g (i.e. such as g=15), ordering the values in the vector B', removing the g highest and g lowest values, averaging the remainder of the values to obtain a mean value and then generating a threshold by multiplying the mean value by a constant. Values in B' that are above this threshold are set to zero. In general, a filter can be designed to prevent unwanted signals by looking at the interference statistics, bandwidth and other features. Accordingly, the median filter module 212 may be generally represented by an ordered-statistics filter module.

Figure 20:
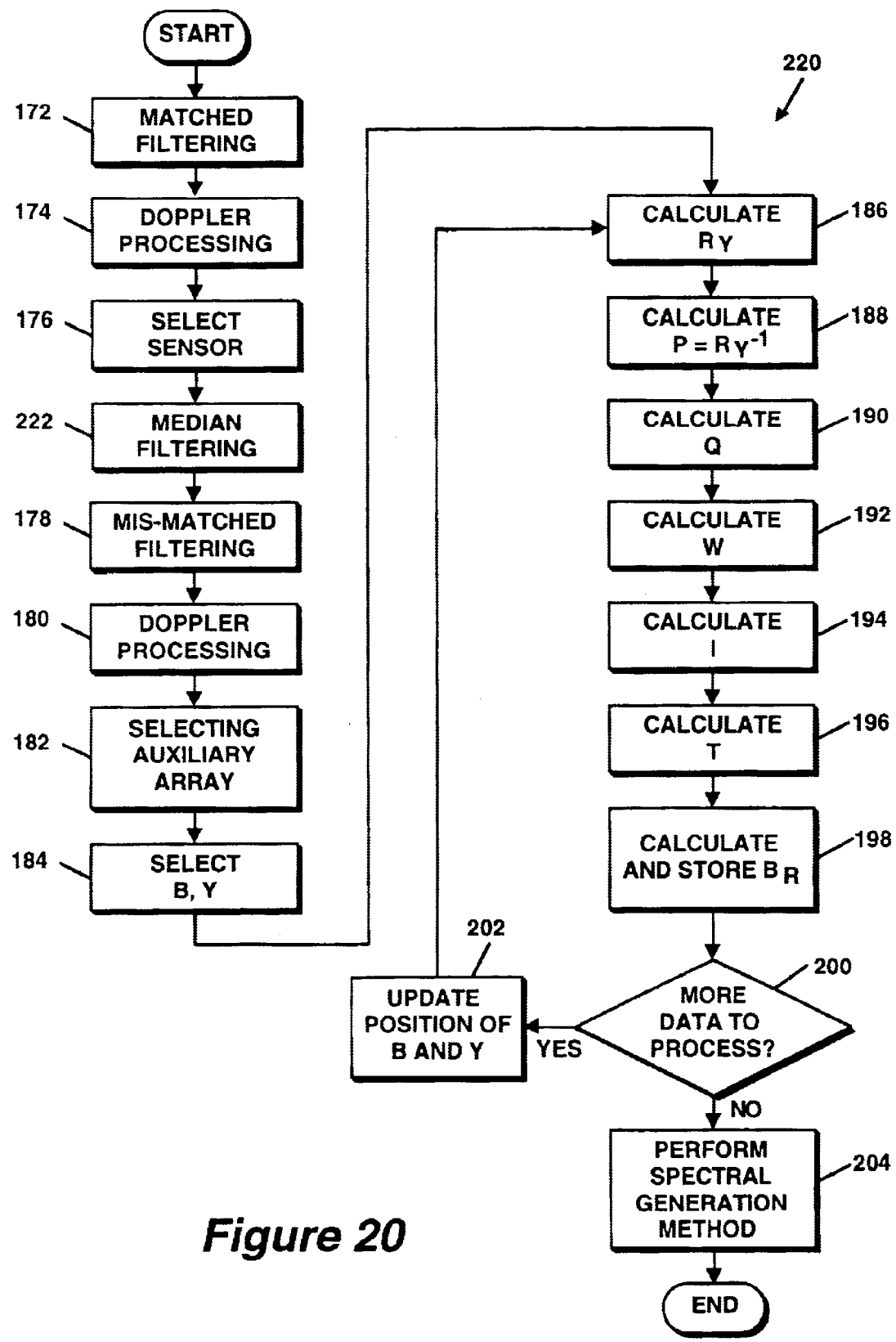
FIG. 20 is a flowchart of an alternative noise suppression method in accordance with the noise suppression module of FIG. 19.

Referring now to FIG. 20, shown therein is an alternative noise suppression method 220 which incorporates a median filtering step 222 to perform median filtering on the matched range-doppler radar data for a given sensor $S_i$ as described above. The rest of the noise suppression method 220 is identical to the noise suppression method 170 and will not be described. Another ordered-statistic filtering method may be used instead of median filtering as discussed previously.

Figure 21B:
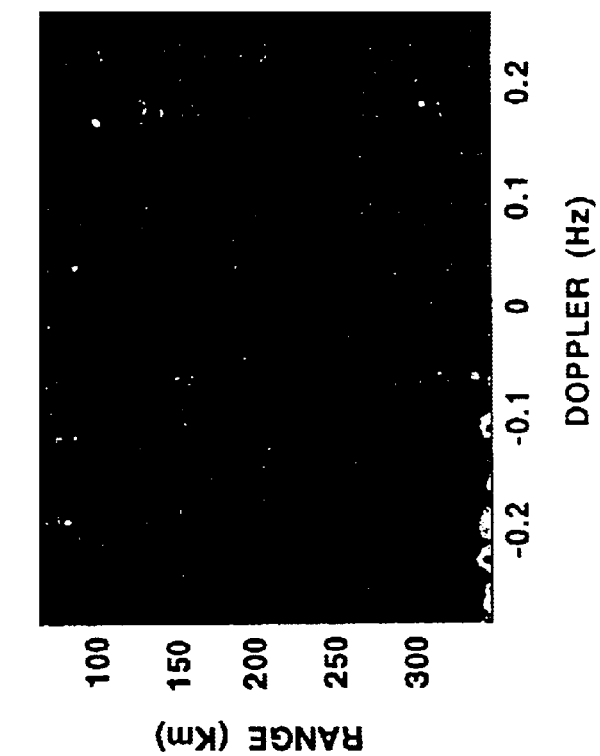
FIG. 21b is a high-resolution range-doppler plot of the radar data shown in FIG. 21a using the spectral generator of the present invention but not using the noise suppression module of the present invention.
Figure 21A:
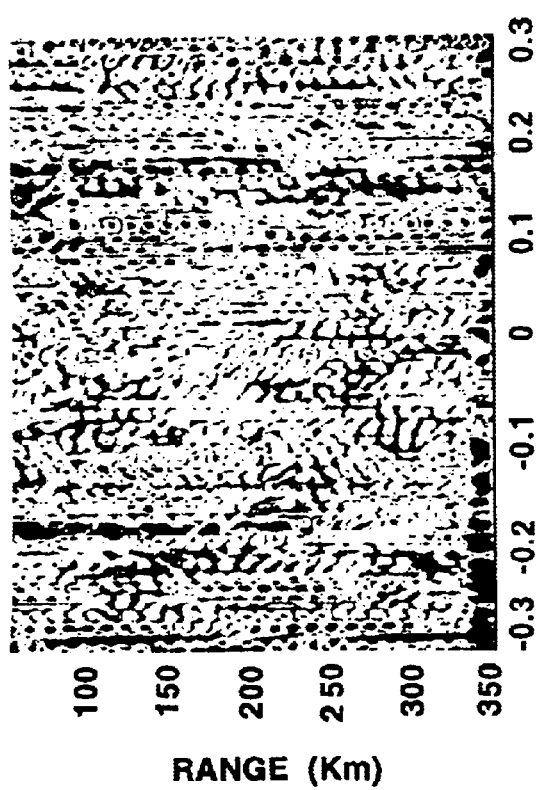
FIG. 21a is a range-doppler plot of an example of radar data produced by conventional beamforming without using the noise suppression module of the present invention.
Figure 21D:
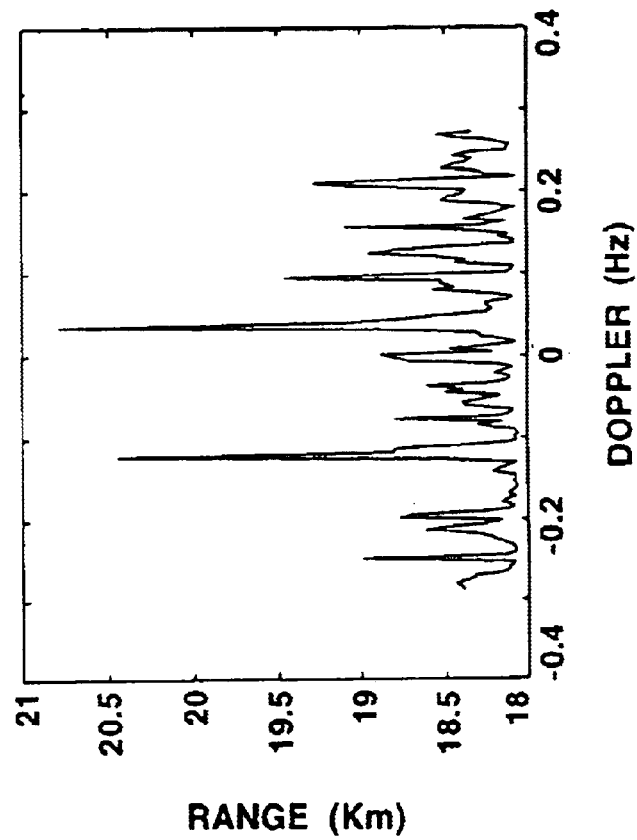
FIG. 21d is a slice along the doppler dimension of the high resolution range-doppler plot of FIG. 21b at the range of the target.
Figure 21C:
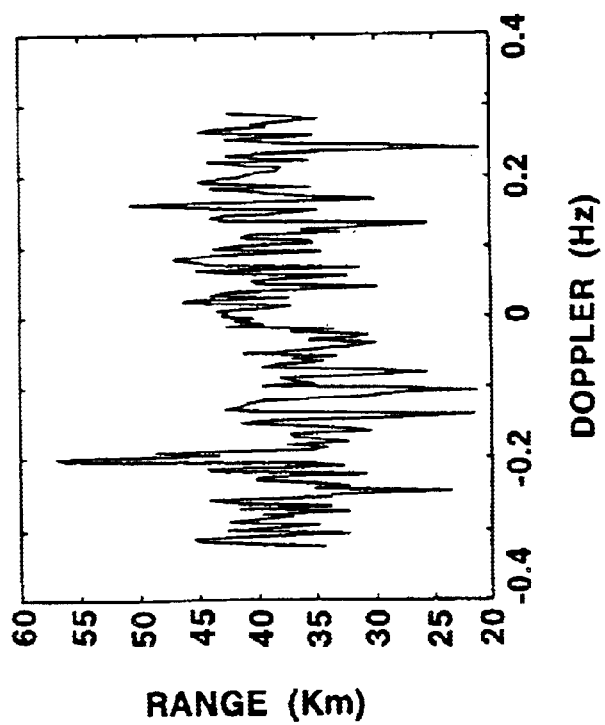
FIG. 21c is a slice along the doppler dimension of the range-doppler plot of FIG. 21a at the range of the target.

Referring now to FIG. 21a, shown therein is an example of a conventional beamformed range-doppler plot of radar data that was obtained without using the noise suppression method 170 of the present invention. The radar data was recorded during the fall season and has a ship target 230 (not visible in FIG. 21a) at a range of 83 km and an azimuth of 8°. The radar data is heavily contaminated with external interference. Referring now to FIG. 21b, shown therein is a high-resolution range-doppler plot of the radar data of FIG. 21a produced by the spectral generator 10 of the present invention without using the noise suppression method 170 of the present invention. FIGS. 21c and 21d show a slice along the Doppler dimension of FIGS. 21a and 21b respectively at the range of the ship target 230. The ship target 230 cannot be seen in any of FIGS. 21a to 21d.

Figure 22B:
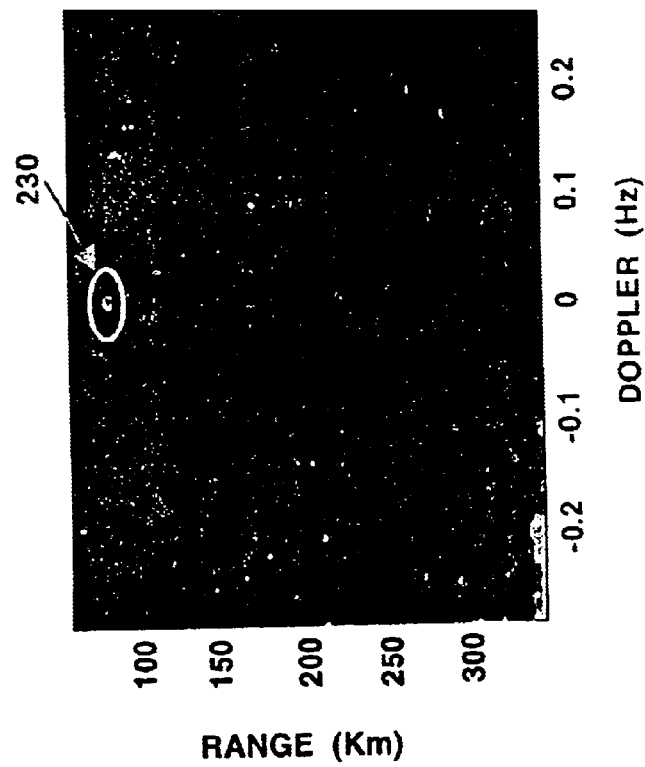
FIG. 22b is a high-resolution range-doppler plot of the radar data shown in FIG. 21a using the spectral generator and the noise suppression module of the present invention.
Figure 22A:
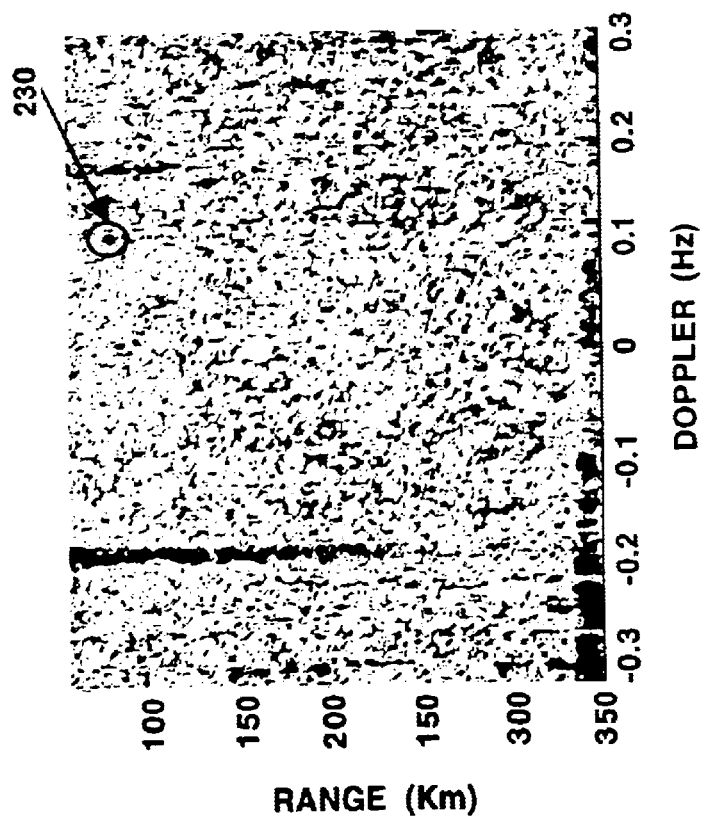
FIG. 22a is a range-doppler plot of the radar data of FIG. 21a produced by conventional beamforming and using the noise suppression module of the present invention.
Figure 22D:
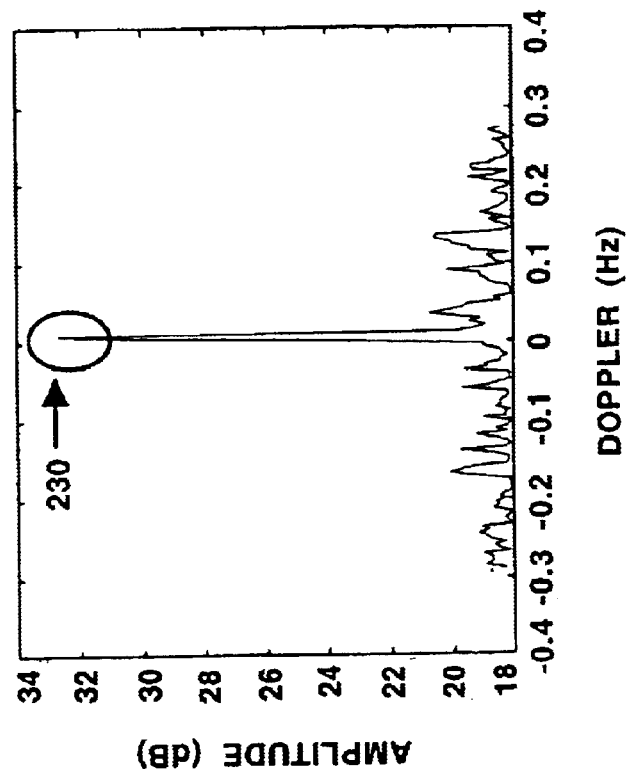
FIG. 22d is a slice along the doppler dimension of the high resolution range-doppler plot of FIG. 22b at the range of the target.
Figure 22C:
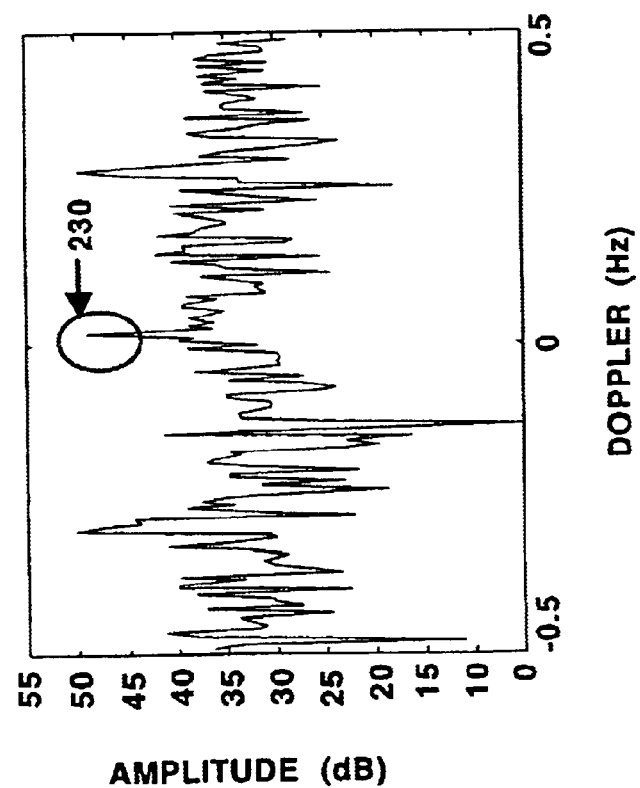
FIG. 22c is a slice along the doppler dimension of the range-doppler plot of FIG. 22a at the range of the target.

Referring now to FIGS. 22a to 22d, FIG. 22a shows a range-doppler plot of the radar data of FIG. 21a produced by a conventional beamformer after applying the noise suppression method 170 of the present invention. FIG. 22b shows a high-resolution range-doppler plot of the radar data of FIG. 21a produced by the spectral generator 100 of the present invention which incorporates the noise reduction module 102. In both range-doppler plots, the ship target 230 is visible. FIGS. 22c and 22d show a slice along the Doppler dimension of FIGS. 22a and 22b respectively at the range of the ship target 230. The ship target 230 can barely be seen in FIG. 22c. However, FIG. 22d shows a strong signal for the ship target 230. The use of the noise suppression method 170 along with the spectral estimation method 60 of the present invention has increased the SSCR of the target 230 to 15 dB. These results also suggest that the noise suppression method 170 may be used with other spectral estimators such as conventional FFT-based beamforming as was just shown.

Another difficulty in target detection is the low SSCR that results for targets that are surrounded by large amounts of noise. Since the SSCR of the target is low, the target will have a low spatial correlation. Accordingly, the signal power of the target may no longer appear in the signal subspace but will occur in the noise subspace. To make the spectral estimation method 60 of the present invention more sensitive to targets having a low SSCR, one approach is to form a noise subspace using the eigenvectors that correspond more to the smaller singular values (i.e. only those eigenvectors that lie more toward spatially white noise). Given a fixed number of sensors that contribute to the range-doppler data signals $RD_1, RD_2, \ldots, RD_K$, the dimension of the noise subspace may be predetermined and set within the dimension selector 54. This should increase the sensitivity of the subspace-based spectral generation method. Accordingly, targets having poor spatial correlation should be enhanced in a high-resolution range-doppler plot and subsequently detected by a radar detector. However, this method may also increase the number of detection hits by incorrectly enhancing clutter with poor spatial correlation that the radar detector may mistakenly consider to be a target. Accordingly, this approach allows targets to emerge from the background noise, however it also increases the false alarm rate by detecting interference with poor spatial correlation.

Figure 23B:
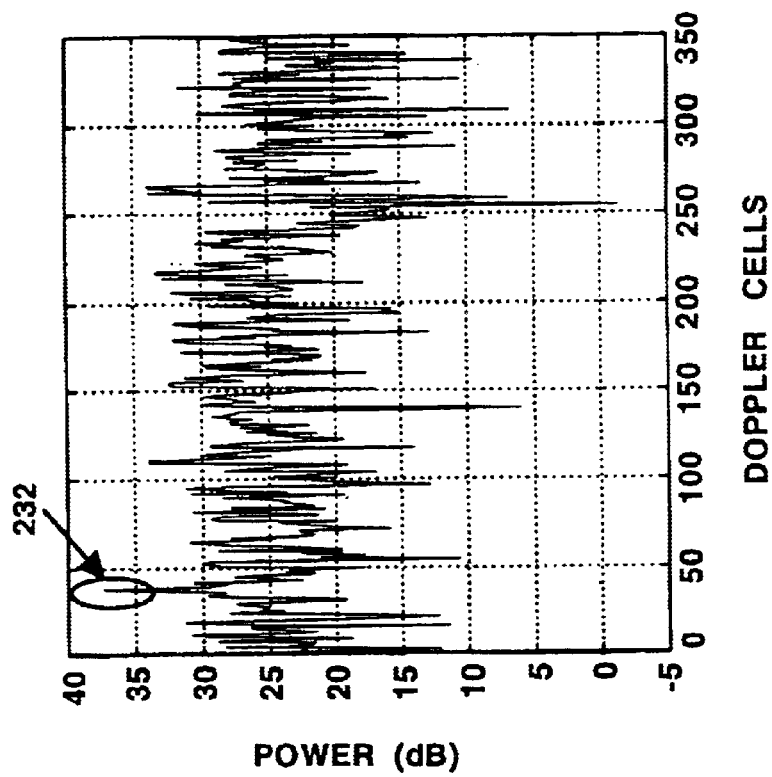
FIG. 23b is a slice along the doppler dimension of the range-doppler plot of FIG. 23a at the range of the target.
Figure 23A:
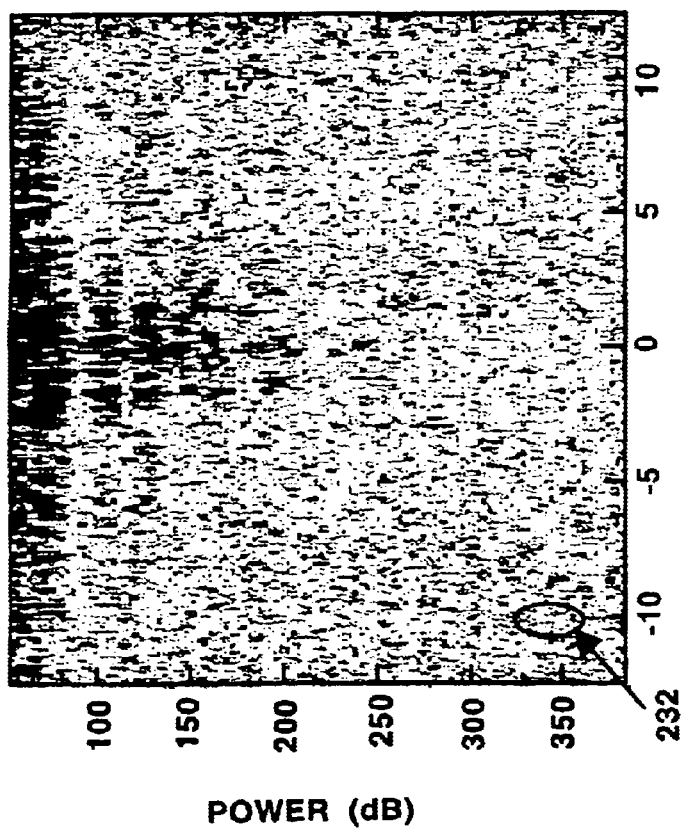
FIG. 23a is a range-doppler plot produced by conventional beamforming on another example of radar data.
Figure 23D:
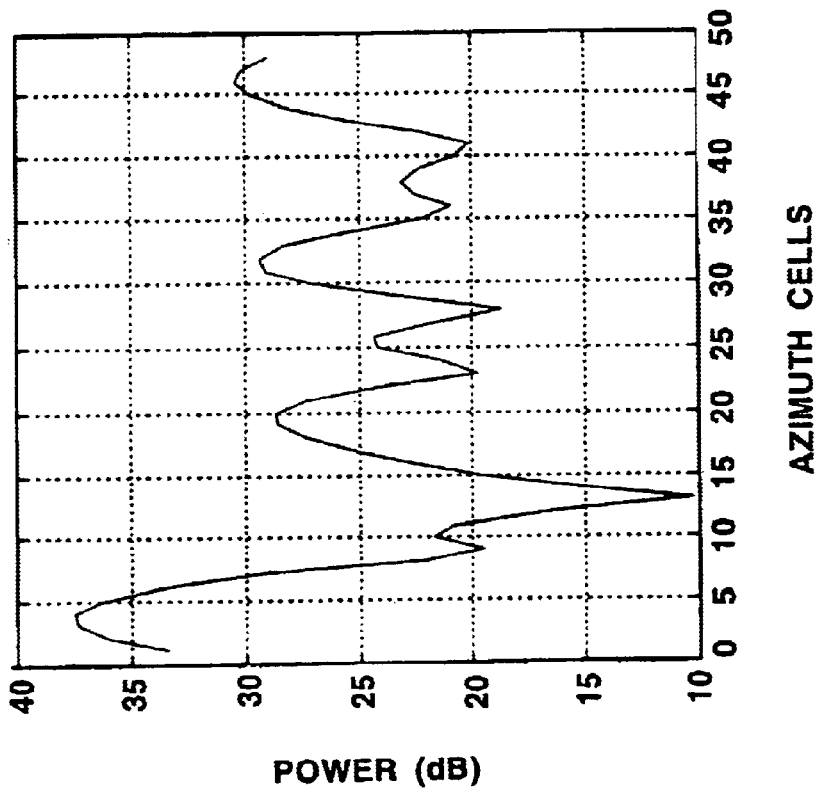
FIG. 23d is an azimuthal plot of the radar data of FIG. 23a at the range and doppler frequency of the target.
Figure 23C:
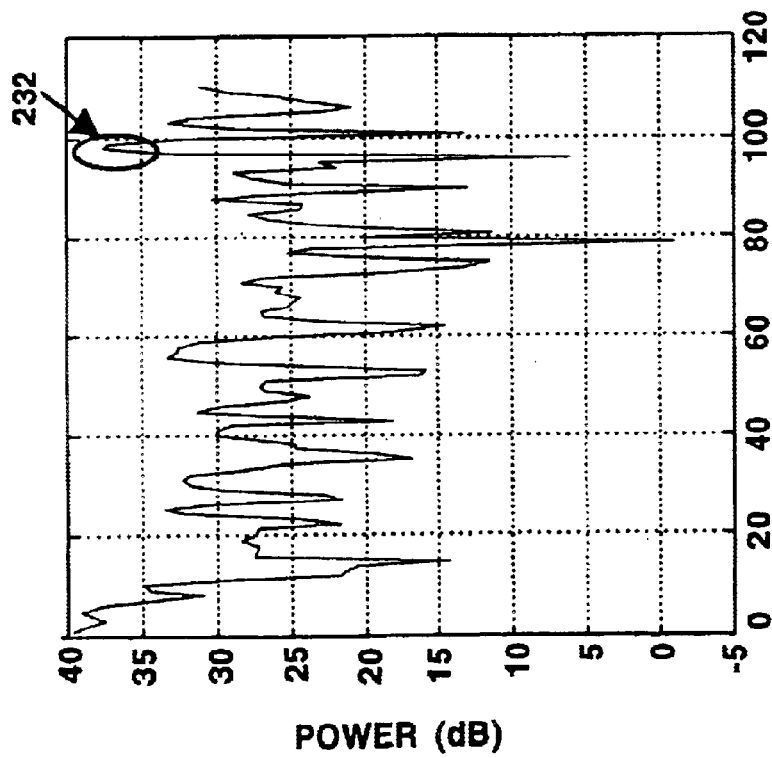
FIG. 23c is a slice along the range dimension of the range-doppler plot of FIG. 23a at the doppler frequency of the target.

Referring now to FIGS. 23a to 23d, shown therein is radar data containing a target 232 having a low SSCR of approximately 7 dB. The radar data was recorded during the summer season. FIG. 23a shows a range-doppler plot for the radar data produced by a conventional FFT-based beamformer. The target 232 is barely visible in FIG. 23a. FIG. 23b shows a slice along the doppler dimension of the range-doppler plot of FIG. 23a at the range of the target 232. The target 232 is barely visible above the background noise. FIG. 23c shows a slice along the range dimension of the range-doppler plot of FIG. 23a at the doppler frequency of the target 232. Once again, the target 232 is barely visible above the background noise. FIG. 23d shows an azimuthal plot for the radar data shown in FIG. 23a at the range and doppler frequency of the target 232.

Figure 24A:
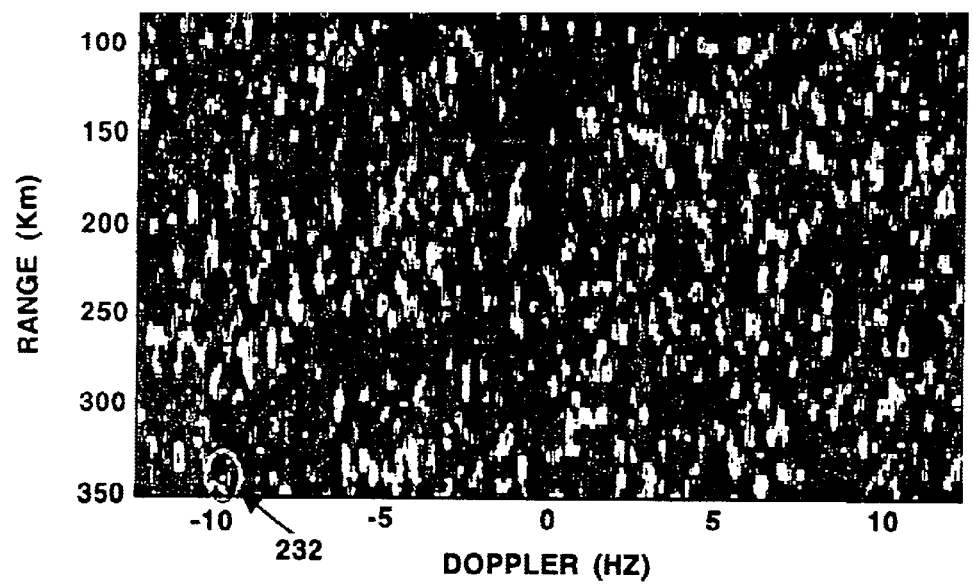
FIG. 24a is a high-resolution range-doppler plot of the radar data of FIG. 23a produced by the spectral generator of the present invention using a noise subspace dimension of 13.
Figure 24B:
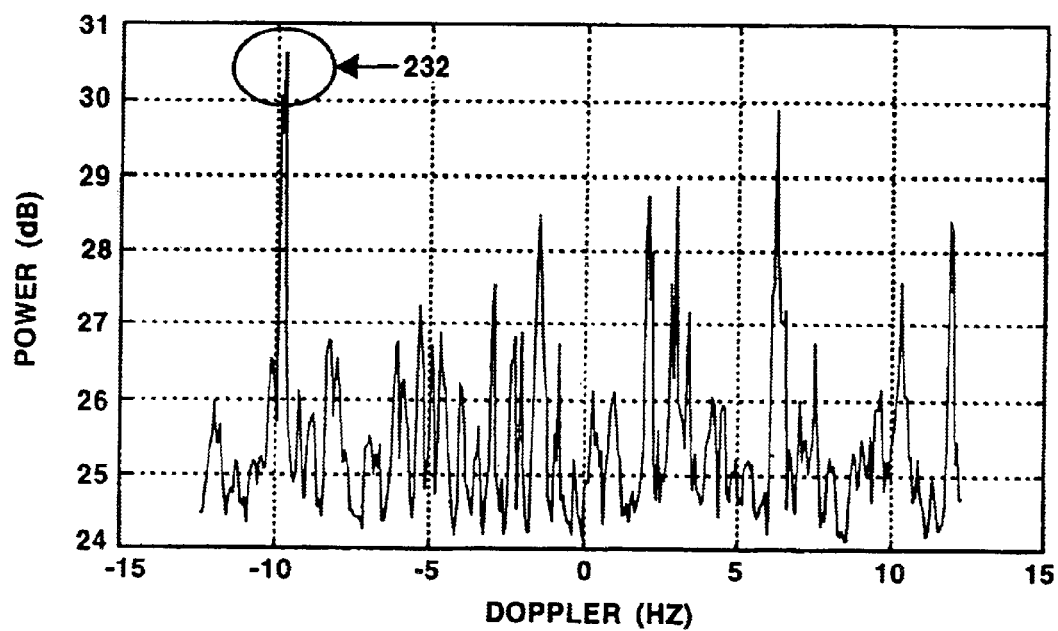
FIG. 24b is a slice along the doppler dimension of the high-resolution range-doppler plot of FIG. 24a at the range of the target.
Figure 24C:
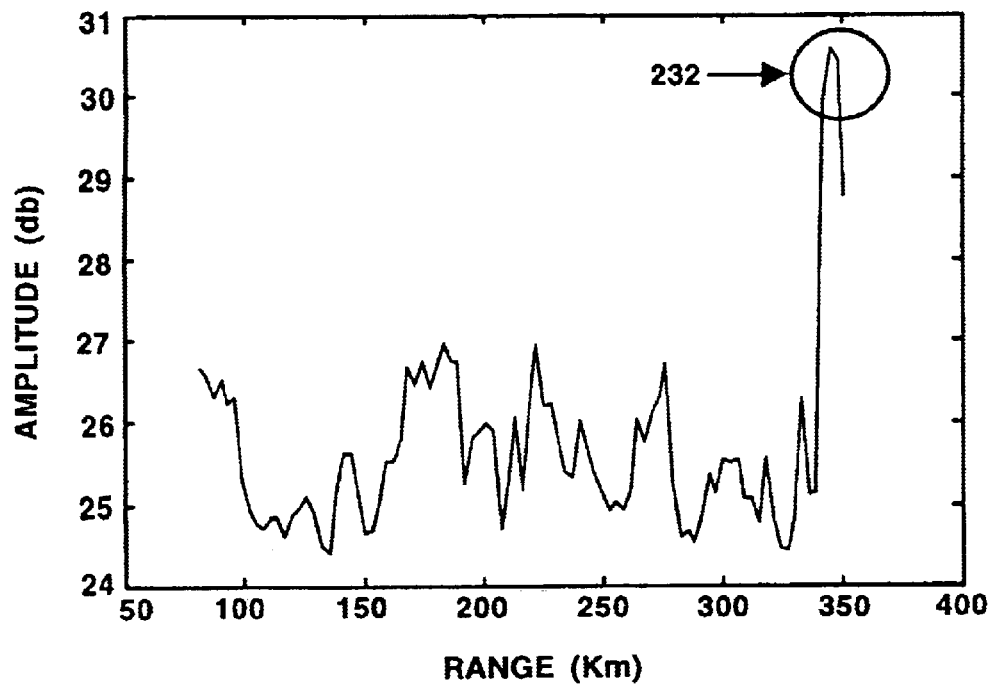
FIG. 24c is a slice along the range dimension of the high-resolution range-doppler plot of FIG. 24a at the doppler frequency of the target.
Figure 24D:
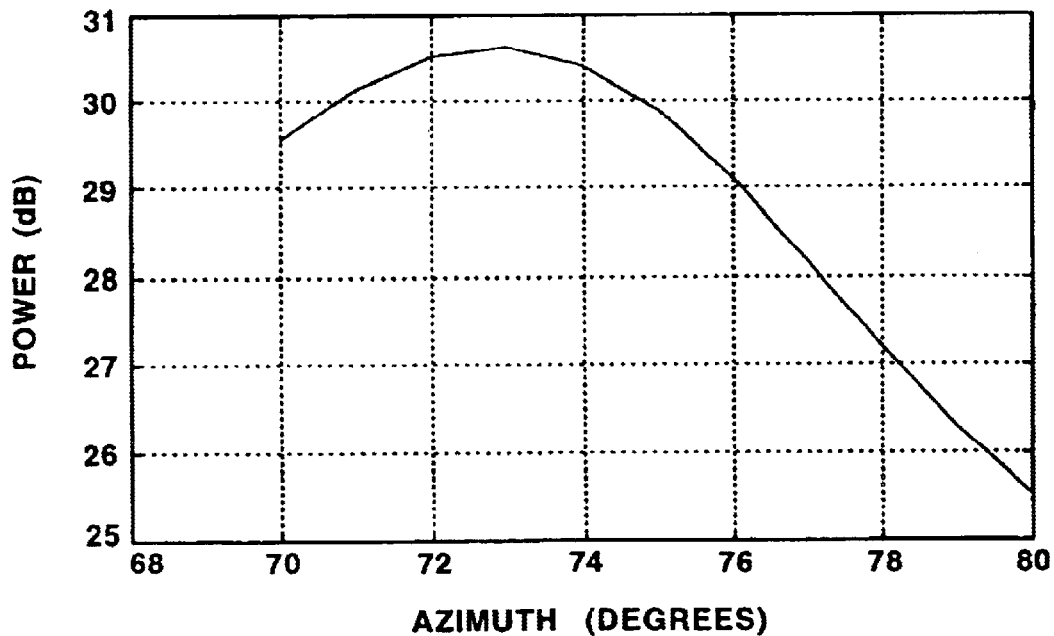
FIG. 24d is an azimuthal plot of the high-resolution range-doppler data of FIG. 24a at the range and the doppler frequency of the target.

Referring now to FIGS. 24a to 24d, shown therein is the radar data of FIG. 21a with the plots generated from the spectral generator 10 without incorporating the noise suppression module 102. The size of the noise subspace has been set to the 13 smallest singular values. FIG. 24a shows a high-resolution range-doppler plot for the radar data produced by the spectral generator 10. The target 232 is visible in FIG. 24a and has an SSCR of 6 dB. FIG. 24b shows a slice along the doppler dimension of the range-doppler plot of FIG. 24a at the range of the target 232. The target 232 is more clearly visible above the background noise compared to FIG. 23b. FIG. 24c shows a slice along the range dimension of the range-doppler plot of FIG. 24a at the doppler frequency of the target 232. Once again, the target 232 is clearly visible above the background noise compared to FIG. 23c. FIG. 24d shows an azimuthal plot for the radar data shown in FIG. 24a at the range and doppler frequency of the target 232. In both FIGS. 24b and 24c, the detectability of the target has been enhanced due to the suppression of ocean clutter and interference clutter.

Figure 25A:
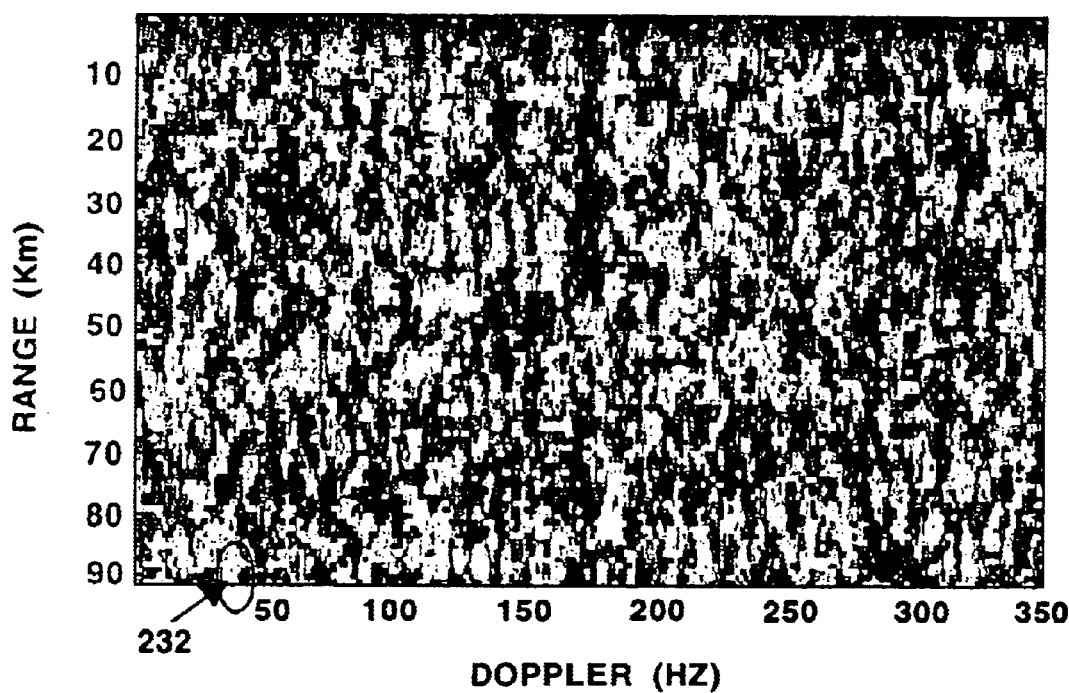
FIG. 25a is a high-resolution range-doppler plot of the radar data of FIG. 23a produced by the spectral generator of the present invention using a noise subspace dimension of 5.
Figure 25B:
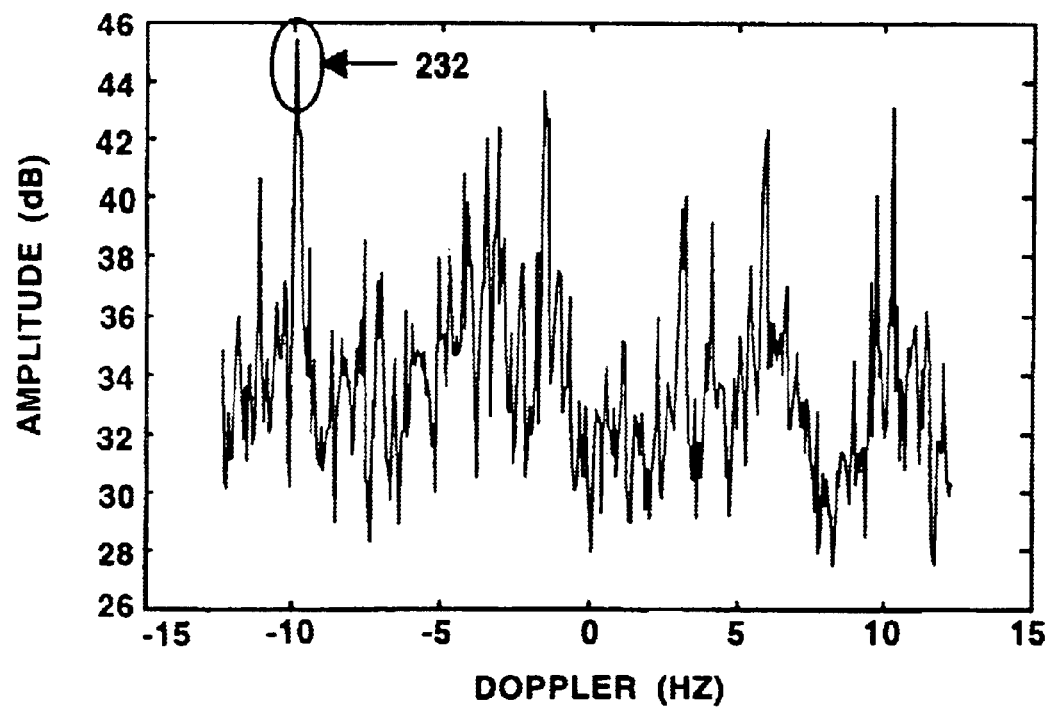
FIG. 25b is a slice along the doppler dimension of the high-resolution range-doppler plot of FIG. 25a at the range of the target.
Figure 25C:
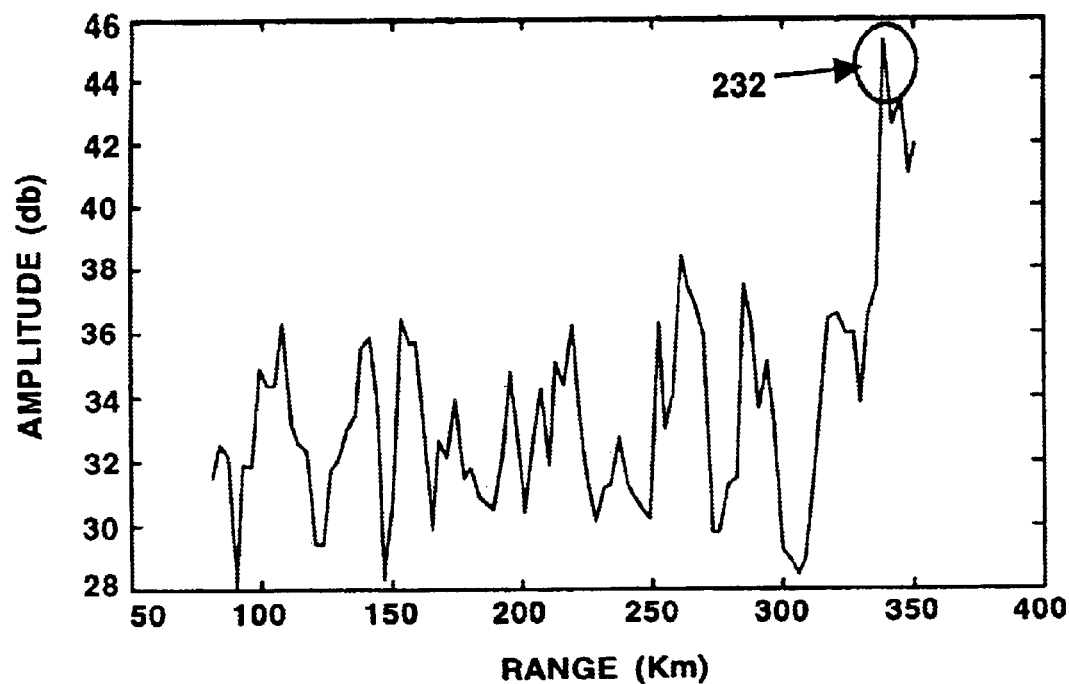
FIG. 25c is a slice along the range dimension of the high-resolution range-doppler plot of FIG. 25a at the doppler frequency of the target.
Figure 25D:
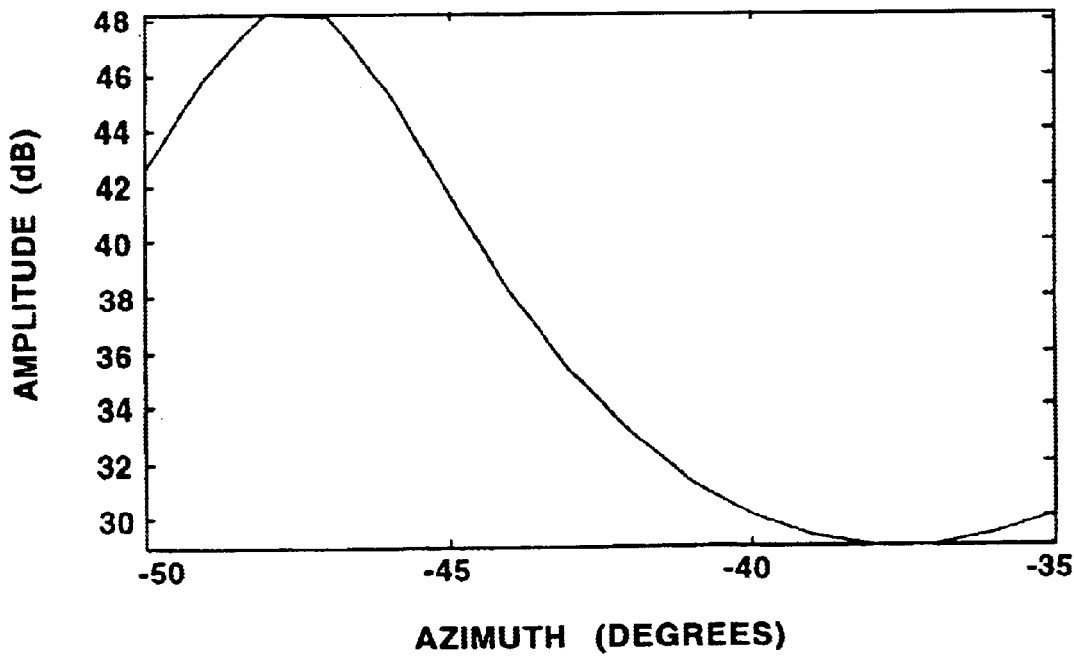
FIG. 25d is an azimuthal plot of the high-resolution radar data of FIG. 25a at the range and doppler frequency of the target.

To improve the enhancement of the target 232 in the radar data of FIGS. 22 and 23, the singular values that were used to generate the noise subspace was limited to the 5 smallest singular values. Referring now to FIGS. 25a to 25d, shown therein is the radar data of FIG. 22a with the plots generated from the spectral generator 10 using the 5 smallest singular values to construct the noise subspace and not incorporating the noise suppression module 102. FIG. 25a shows a high-resolution range-doppler plot for the radar data. The target 232 is visible in FIG. 25a and has an SSCR of 12 dB. However, target enhancement is not considerably improved due to the enhancement of many false targets that correspond to poor spatially correlated clutter. FIG. 25b shows a slice along the doppler dimension of the range-doppler plot of FIG. 25a at the range of the target 232. FIG. 25c shows a slice along the range dimension of the range-doppler plot of FIG. 25a at the doppler frequency of the target 232. FIG. 25d shows an azimuthal plot for the radar data shown in FIG. 25a at the range and doppler frequency of the target 232. The angular accuracy has improved considerably compared to the angular accuracy shown in FIG. 24d.

Figure 26:
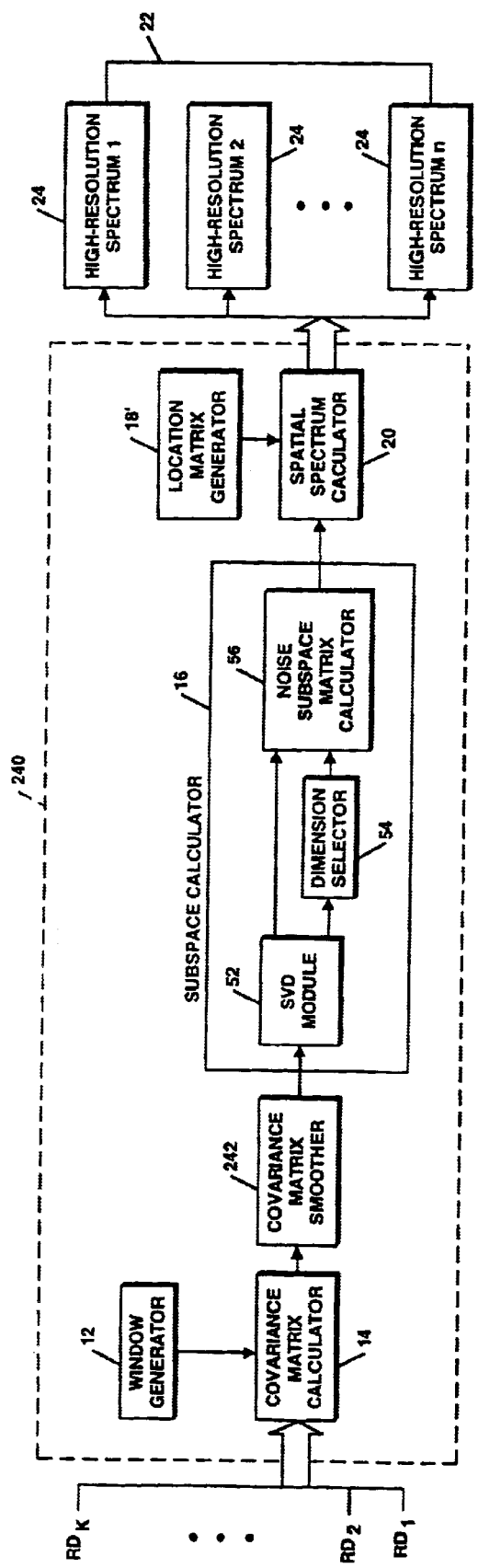
FIG. 26 is a block diagram of an alternate embodiment of the spectral generator utilizing spatial smoothing in accordance with the present invention.

Referring now to FIG. 26, shown therein is another alternative embodiment of a spectral generator 240 having a covariance matrix smoother 242 that is in communication with the covariance matrix calculator 14 and the subspace calculator 16. The covariance matrix smoother 242 is introduced to enhance the radar signature of a possible target (and hence target detectability) by spatially smoothing the covariance matrix estimate $C_{est}$ based on at least one of forward spatial smoothing, backward spatial smoothing and forward/backward spatial smoothing as shown further below. Furthermore, in the spectral generator 240, the location matrix generator 18' generates a slightly different location matrix A' as described further below. The remainder of the spectral generator 240 is identical to the spectral generator 10 and will not be discussed.

In HFSWR, using Frank complementary codes to generate the EM pulses and the corresponding matched filters along with the noise suppression method 170 of the present invention helps reduce the presence of ocean clutter and strong spatially correlated external interference in the high-resolution range-doppler plots. However, the high-resolution range-doppler plots still contain external interference and atmospheric noise having poor spatial correlation as a result of multi-path propagation which spreads throughout the range-doppler spectrum and decreases the detectability of possible targets. Spatial smoothing may be used to reduce this type of noise.

Spatial smoothing was originally developed to estimate the direction of arrival of multiple signals (Evans et al., (1982), "Application of advanced signal processing techniques to angle of arrival estimation in ATC navigation and surveillance system", Report 582, M.I.T. Lincoln Lab, Lexington, Mass., 1982.). However, the inventors have found that spatial smoothing also enhances target amplitude and increases azimuthal accuracy for targets in a low SCR environment without a corresponding increase in the false alarm rate. Spatial smoothing is also beneficial in addressing the main drawback to subspace-based spectral estimation techniques which is the inability to handle perfectly correlated (or highly correlated) signals which arises quite often in practice due to multipath propagation which is well known to those skilled in the art.

The covariance matrix smoother 242 performs spatial smoothing on the covariance matrix estimate $C_{est}$ to produce a spatially smoothed matrix $C_{SMest}$. Incorporating the smoothed covariance matrix estimate $C_{SMest}$ into the subspace-based spectral estimator 10 of the present invention makes it possible to identify targets irrespective of the correlated nature of the noise. The forward spatial smoothing method requires a larger number of sensor elements to distinguish between a given number of targets (for instance 2G sensors are needed to distinguish between G targets). However, by making use of forward and backward smoothing simultaneously, it is possible to distinguish between G targets if there are 3G/2 sensor elements in the main sensor array 32 (Pillai et al., "Forward/Backward spatial smoothing techniques for coherent signal identification", IEEE Trans. On ASSP, 37(1), pp. 8–15, 1989; Friedlander et al., "Direction finding using spatial smoothing with interpolated arrays", IEEE Trans. On AES, 28(2), pp. 574–587, 1992). There is a tradeoff between the size of the subarray and the number of averages performed during spatial smoothing. The size of the subarray determines the number of resolvable targets while the number of averages determines the amount of target enhanceability.

Spatial smoothing may be performed by forming uniformly overlapping subarrays of sensors, from a main sensor array having K sensors, with each subarray having K+1−G sensors. Covariance matrices are then generated for each subarray (hence there are G sub-matrices) and averaged to provide a spatially smoothed covariance matrix estimate $C_{SMest}$. An alternative way of effecting spatial smoothing is to generate the covariance matrix estimate $C_{est}$ as previously described herein (i.e. equation 6) and then partition the covariance matrix $C_{est}$ into G sub-matrices which are then averaged to obtain the smoothed covariance matrix estimate $C_{SMest}$. The implementation of spatial smoothing that is preferably utilized by the covariance matrix smoother 242 is the latter spatial smoothing method that was just described.

Forward spatial smoothing involves forming forward covariance matrix estimates according to equations 24 to 26.

$$C_{F,1}^{(K+1-G)\times(K+1-G)} = C^{K\times K}(1{:}(K+1-G),1{:}(K+1-G)) \qquad (24)$$

$$C_{F,2}^{(K+1-G)\times(K+1-G)} = C^{K\times K}(2{:}(K+1-G),2{:}(K+1-G+1)) \qquad (25)$$

$$\ldots$$

$$C_{F,G}^{(K+1-G)\times(K+1-G)} = C^{K\times K}(G{:}K,G{:}K) \qquad (26)$$

Equations 24 to 26 can be represented in general terms by equation 27.

$$C_{F,i}^{(K+1-G)\times(K+1-G)} = C^{K\times K}(i{:}(K+1-G+i-1),i{:}(K+1-G+i-1)) \qquad (27)$$

where the superscript (K+1−G)×(K+1−G) denotes the dimensions of the covariance sub-matrices (i.e. K+1−G is the number of sensors in each subarray) and the notation $C_{F,L}=C(G{:}K,G{:}K)$ means that the sub-matrix $C_{F,L}$ is formed from the sub-matrix in C that begins at the $G^{th}$ row and ends at the $K^{th}$ row and begins at the $G^{th}$ column and ends at the $K^{th}$ column. The forward spatially smoothed covariance matrix estimate $C_{FS}$ is then calculated according to equation 28.

$$C_{FS} = \frac{C_{F,1} + C_{F,2} + \ldots + C_{FG}}{G} \qquad (28)$$

Backward spatial smoothing involves forming backward covariance matrix estimates according to the equations 29 to 31.

$$C_{B,1}^{(K+1-G)\times(K+1-G)} = C^{K\times K}(K{:}G,K{:}G)^* \qquad (29)$$

$$C_{B,2}^{(K+1-G)\times C K+1-G)} = C^{K\times K}((K-1){:}(G-1),(K-1){:}(G-1))^* \qquad (30)$$

$$\ldots$$

$$C_{B,G}^{(K+1-G)\times C K+1-L)} = C^{K\times K}((K+1-G){:}1,(K+1-G){:}1)^* \qquad (31)$$

Equations 29 to 31 can be represented in general terms by equation 32.

$$C_{B,i}^{(K+1-G)\times C K+1-G)} = C^{K\times K}((K+1-i){:}(G+i-1),(K+1-i){:}(G+1i))^* \qquad (32)$$

The complex conjugate of the backward spatially smoothed covariance matrices $C_{B,I}$ are represented by the symbol *.

The backward spatially smoothed covariance matrix estimate $C_{BS}$ is then calculated according to equation 33.

$$C_{BS} = \frac{C_{B,1} + C_{B,2} + \ldots + C_{BG}}{G} \tag{33}$$

Forward/backward spatial smoothing is effected by utilizing both the forward covariance matrix estimates and backward covariance matrix estimates. Accordingly, a forward/backward spatially smoothed covariance matrix $C_{FBS}$ can be calculated according to equation 34:

$$C_{FBS} = \frac{C_{FS} + C_{BS}}{2} \tag{34}$$

The covariance matrix smoother 242 may perform spatial smoothing according to any one of the forward, backward and forward/backward smoothing methods. However, forward/backward spatial smoothing is preferable. Regardless of the method used for spatial smoothing, once the spatially smoothed covariance matrix estimate $C_{SMest}$ is calculated, the subspace calculator 16 operates on the smoothed covariance matrix $C_{SMest}$ to generate the noise subspace matrix estimate $N_{est}$ which is already spatially smoothed since the covariance matrix estimate $C_{SMest}$ has been spatially smoothed. The remainder of the spectral generator 240 operates similarly to the spectral generator 10 except that the location matrix generator 18' calculates a location matrix A' according to equation 35:

$$A'=[A'_{\theta 1}, A'_{\theta 2}, A'_{\theta 3}, \ldots, A'_{\theta Z}], -\pi \leq \theta_i \leq \pi \tag{35}$$

where an element $A'_{\theta i}$ is a vector given by $$A'_{\theta i}=[1 \; e^{j2\pi(d/\lambda)sin(\theta i)} \; e^{j4\pi(d/\lambda)sin(\theta i)} \ldots e^{j2\pi(K-G)d/\lambda sin(\theta i)}]^T \tag{36}$$

Hence the location matrix A' has a dimension of (K−G)-by-Z.

Figure 27:
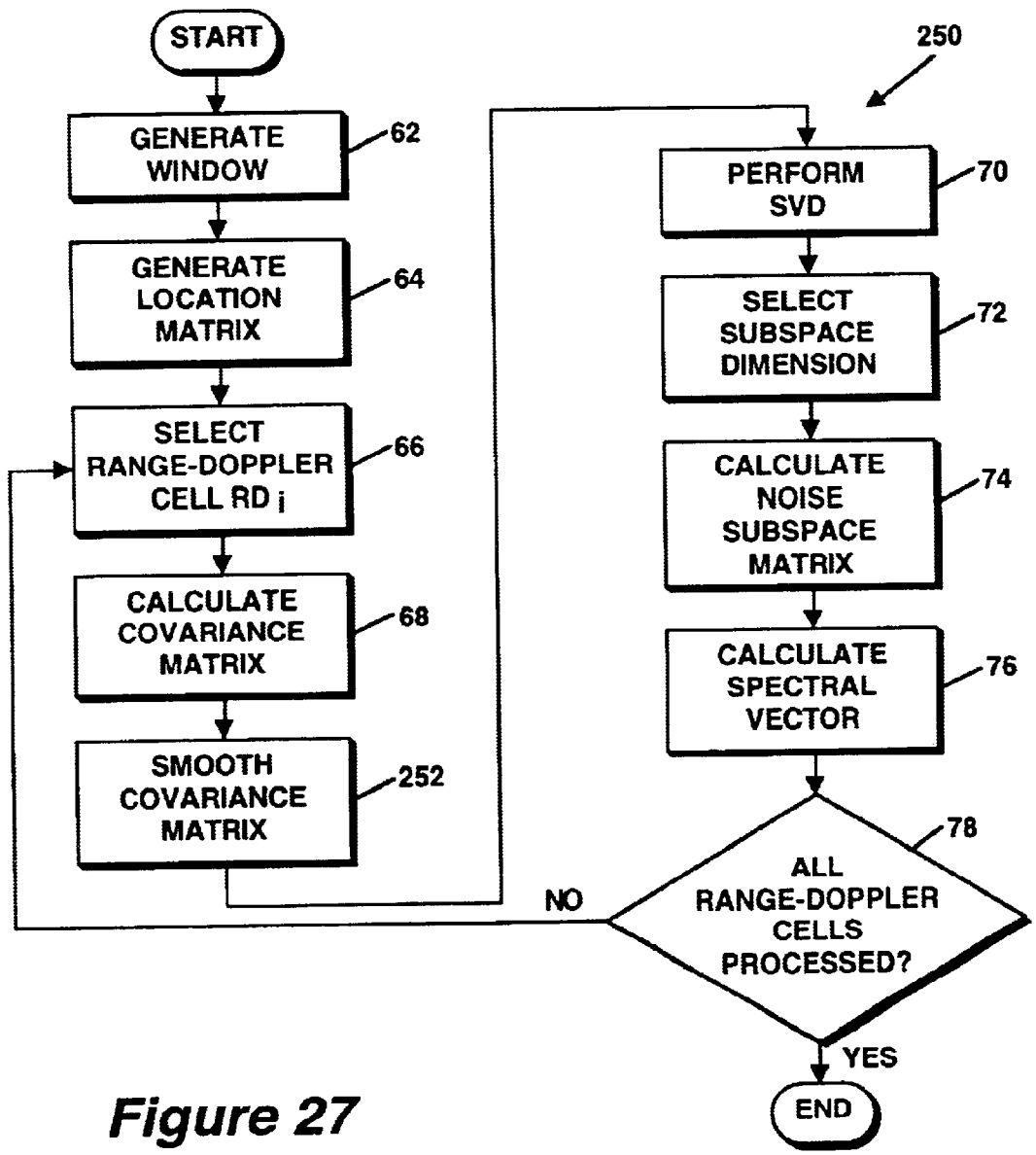
FIG. 27 is a flowchart of an alternate embodiment of the spectral generation method utilizing spatial smoothing in accordance with the present invention.

Referring next to FIG. 27, shown therein is an embodiment of a spectral generation method 250 in accordance with the spectral generator 240. The spectral generation method 250 is similar to the spectral generation method 60 except for two differences. The spectral generation method generates the location matrix A' in step 64' according to equations 35 and 36 rather than equations 8 and 9. Secondly, the spectral generation method 250 includes step 252 which performs spatial smoothing on the covariance matrix estimate $C_{est}$ to produce the spatially smoothed covariance matrix estimate $C_{SMest}$ which is then used to calculate the noise subspace matrix estimate $N_{est}$. The remainder of the method 250 is identical to the spectral estimation method 60 and will not be further discussed.

Figure 28A:
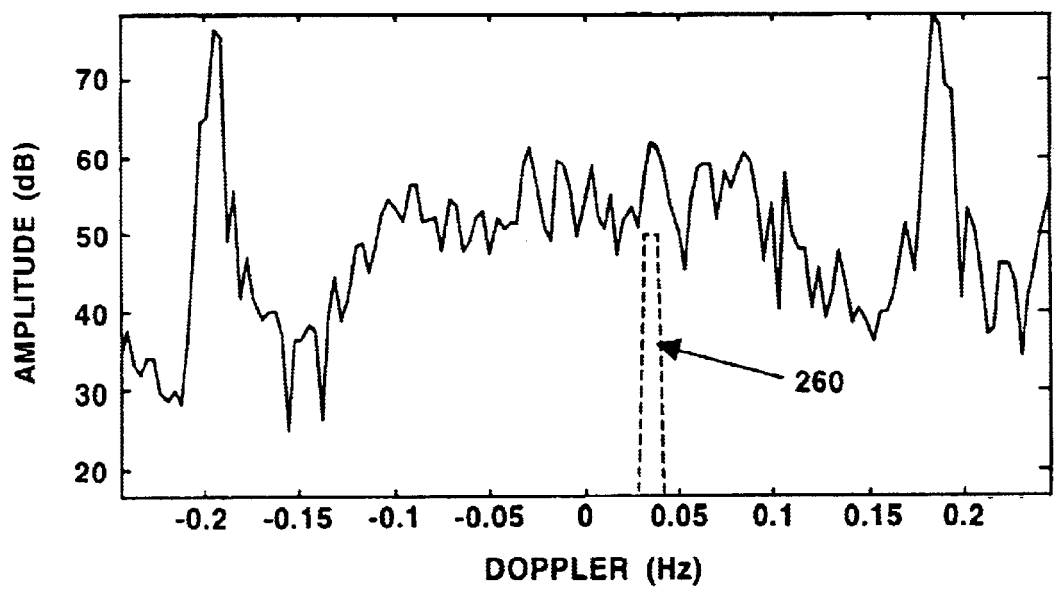
FIG. 28a is a doppler plot of radar data and a simulated target using radar data from a sensor.

Referring now to FIG. 28a, show therein is a doppler plot of radar data, represented by the solid curve, containing a simulated target 260 which is represented by the dotted line (the radar data of a single sensor is shown in FIG. 28a). The radar data was recorded during the summer season. The amplitude of the target 260 was adjusted to provide an SSCR of 0 dB and the azimuth of the target 260 was adjusted to −34° azimuth.

Figure 28B:
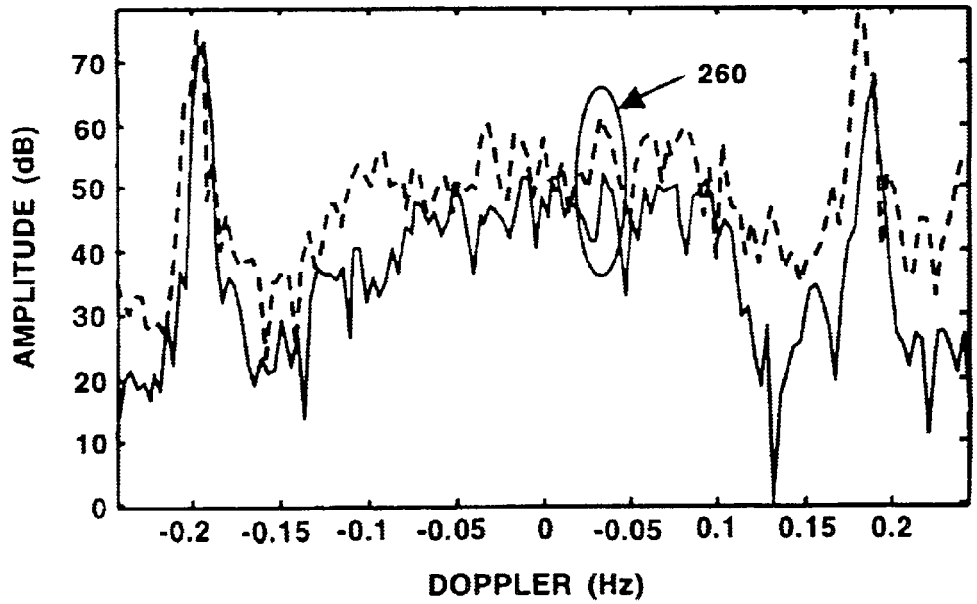

Reference is next made to FIG. 28b which shows the doppler plot of the radar data of FIG. 28a (i.e. for a single sensor) having the simulated target 260, represented by the dotted curve, and the doppler plot of conventional FFT-based beamformed data having the simulated target 260 which is represented by the solid curve. There is only a slight improvement in SSCR of approximately 3 dB. However, the detectability of the target 260 continues to suffer from the surrounding background noise.

Figure 29A:
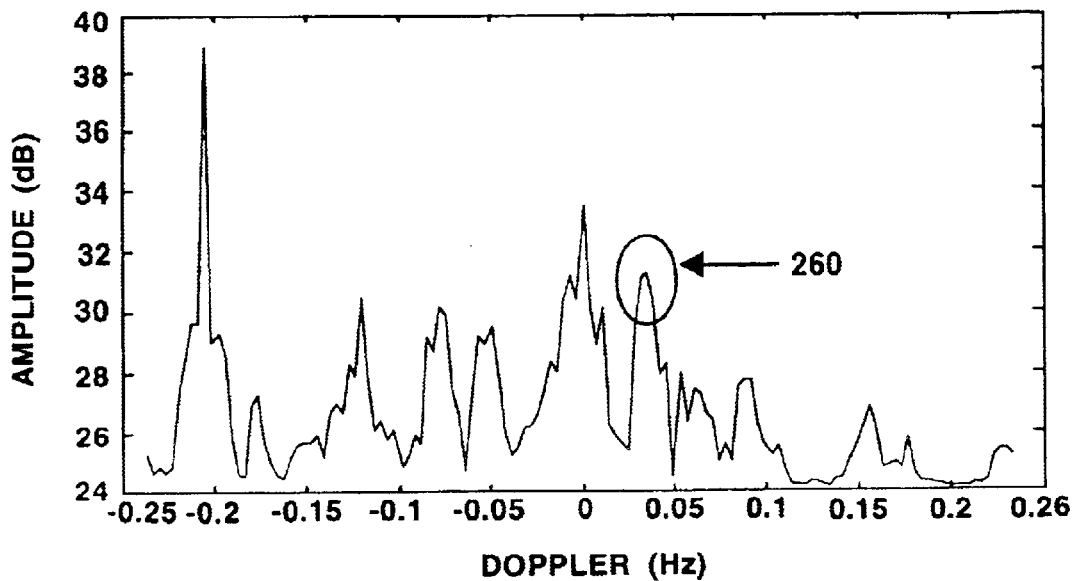
FIG. 29a is a high-resolution doppler plot of the radar data of FIG. 28a at the range of the target using a noise subspace of 13.
Figure 29B:
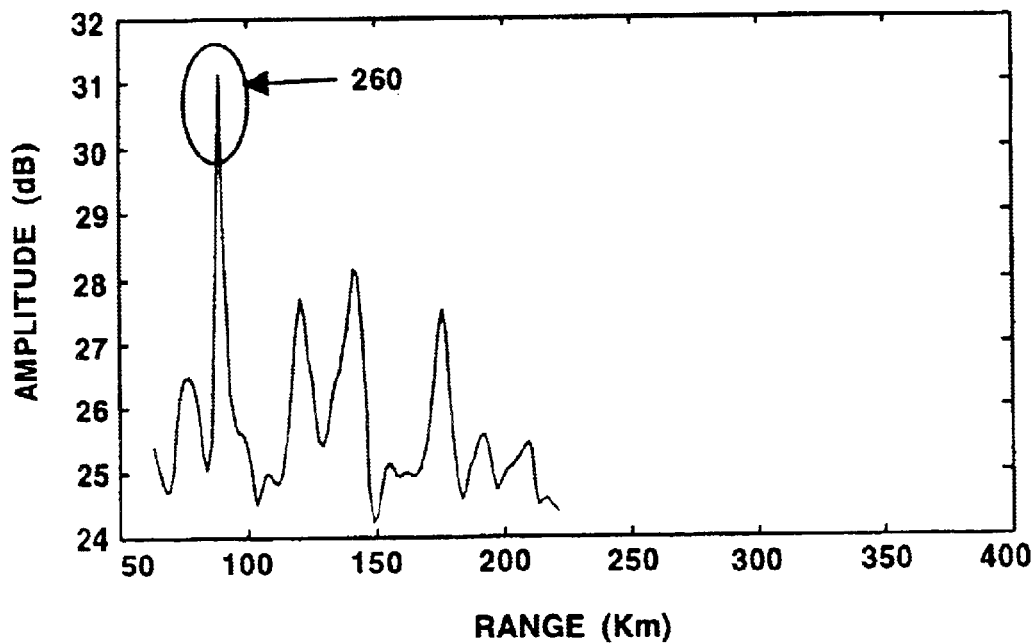
FIG. 29b is a high-resolution range plot of the radar data of FIG. 28a at the doppler frequency of the target using a noise subspace of 13.
Figure 29C:
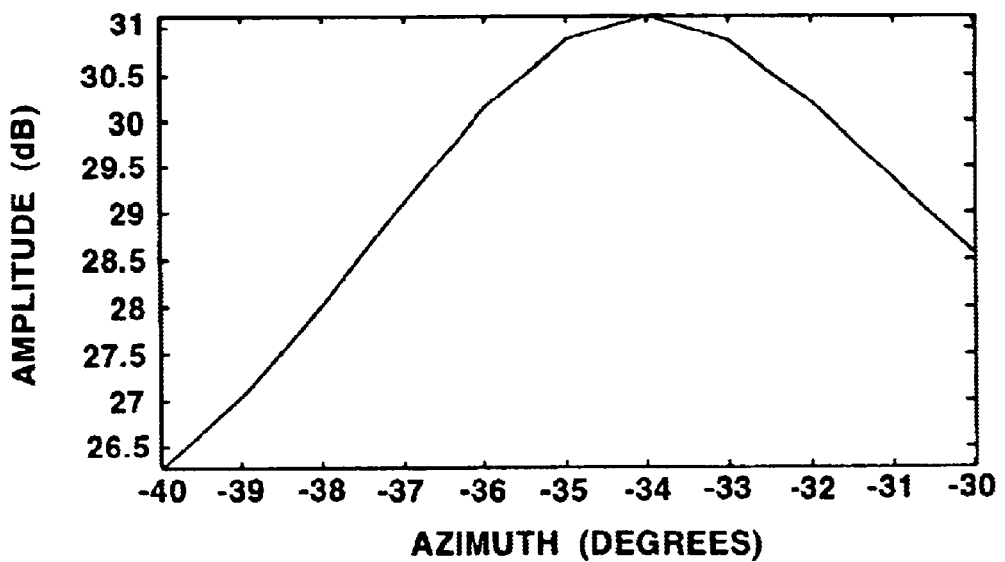
FIG. 29c is a high-resolution azimuthal plot of the radar data of FIG. 28a at the range and the doppler frequency of the target using a noise subspace of 13.

Referring now to FIGS. 29a to 29c, the spectral estimation method 60 of the present invention was then applied to the radar data shown in FIG. 28b. The noise subspace was formed using the 13 smaller singular values of the covariance matrix estimate. FIG. 29a shows the resulting high-resolution doppler plot at the range of the target 260. FIG. 29b shows the resulting high-resolution range plot at the doppler frequency of the target 260 and FIG. 29c shows the high-resolution azimuthal plot at the range and doppler frequency of the target 260. The target 260 now has an SSCR of 5 dB and has been enhanced due to the suppression of clutter during the calculation of the signal subspace.

Figure 30A:
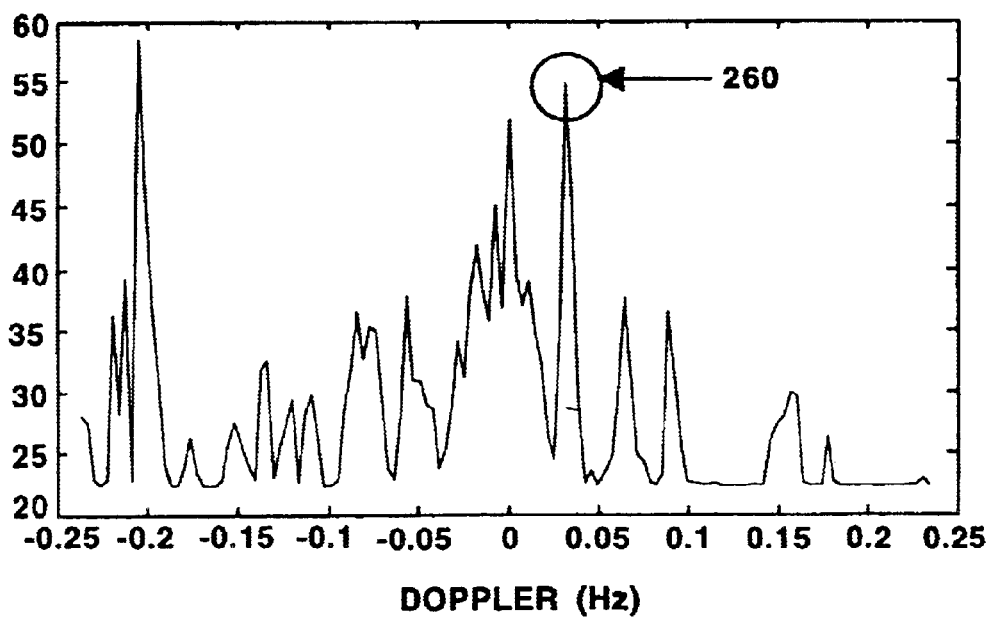
FIG. 30a is a high-resolution doppler plot of the radar data of FIG. 28a at the range of the target using the spatial smoothing method of the present invention.
Figure 30B:
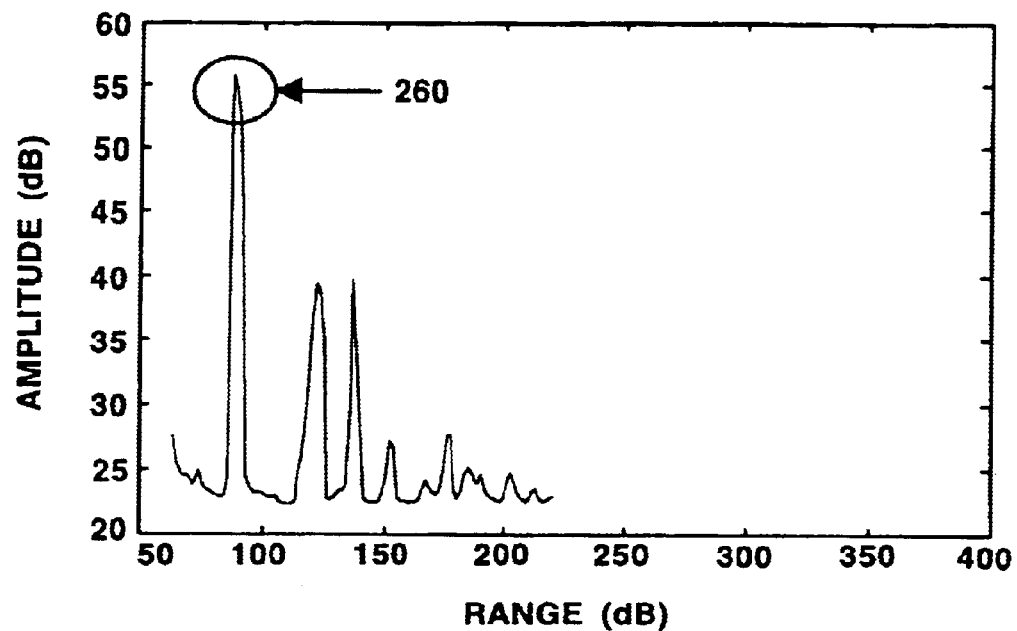
FIG. 30b is a high-resolution range plot of the radar data of FIG. 28a at the doppler frequency of the target using the spatial smoothing method of the present invention.
Figure 30C:
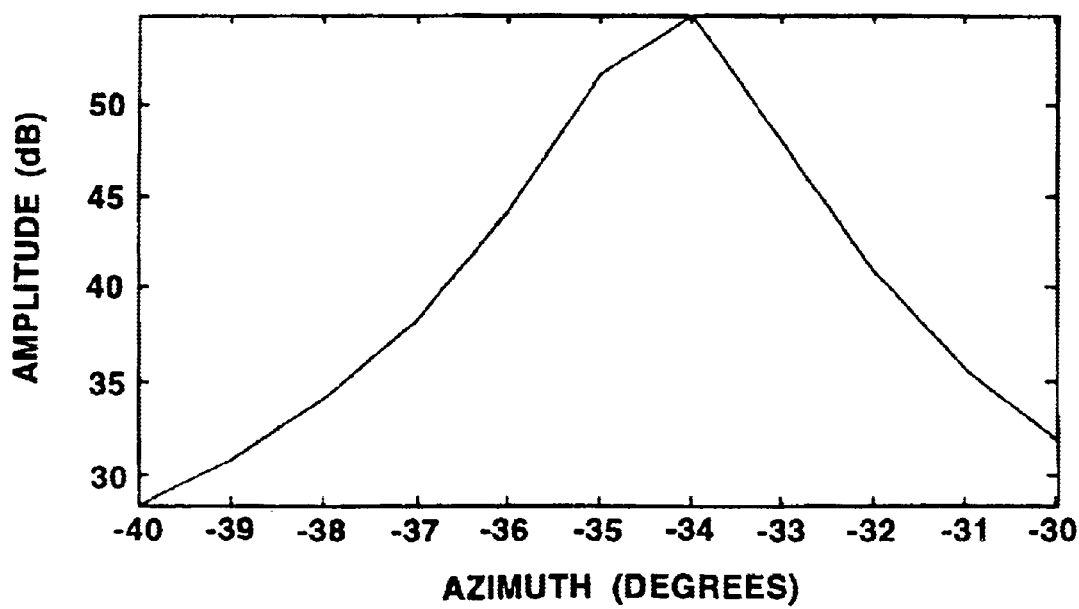
FIG. 30c is a high-resolution azimuthal plot of the radar data of FIG. 28a at the range and doppler frequency of the target using the spatial smoothing method of the present invention.

Referring now to FIGS. 30a to 30c, the spectral estimation method 250 of the present invention incorporating spatial smoothing was then applied to the radar data shown in FIG. 28b. The forward-backward spatial smoothing method was used to smooth the covariance matrix estimate. FIG. 30a shows the resulting high-resolution doppler plot at the range of the target 260. FIG. 30b shows the resulting high-resolution range plot at the doppler frequency of the target 260 and FIG. 30c shows the high-resolution azimuthal plot at the range and doppler frequency of the target 260. The target 260 now has an SSCR of 20 dB and the amplitude of the target 260 has been significantly increased.

Figure 31A:
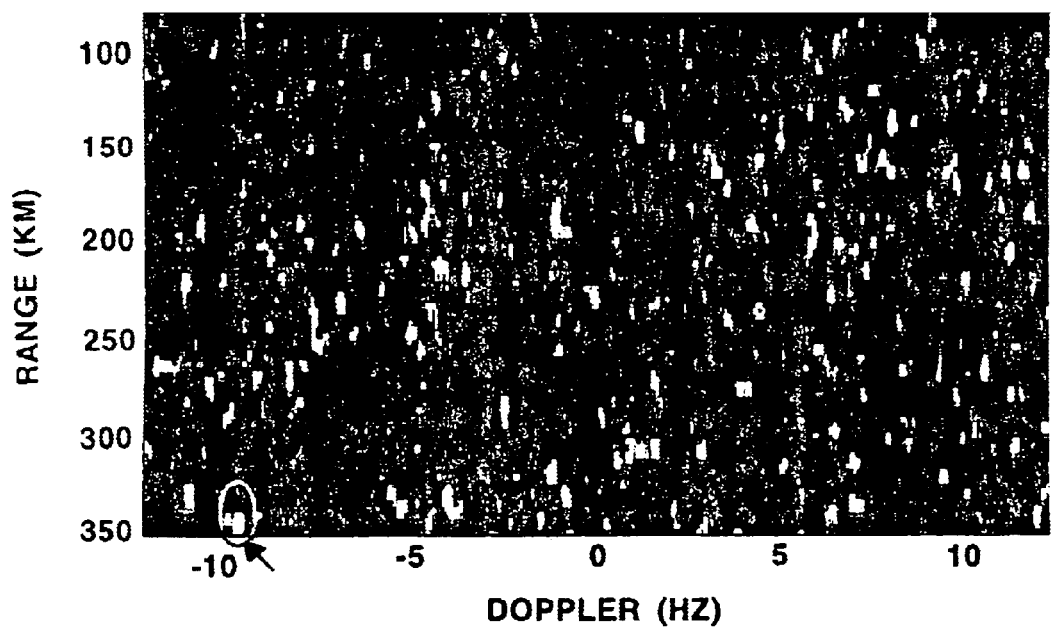
FIG. 31a is a high-resolution range-doppler plot for the radar data of FIG. 24a using the spectral generator and the spatial smoothing of the present invention.
Figure 31B:
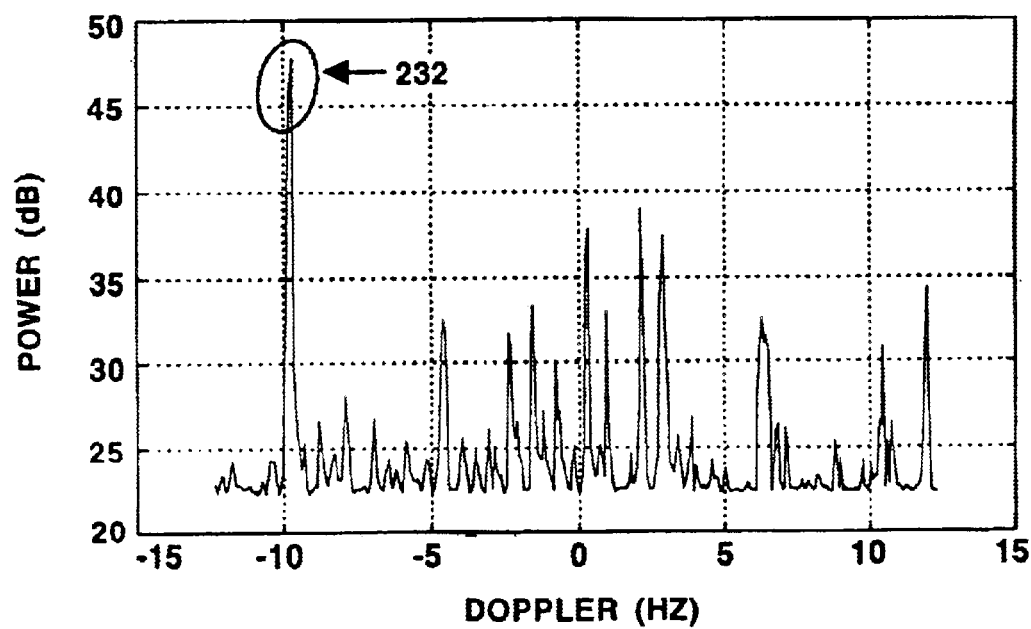
FIG. 31b is a slice along the doppler dimension of the high-resolution range-doppler plot of FIG. 31a at the range of the target.
Figure 31C:
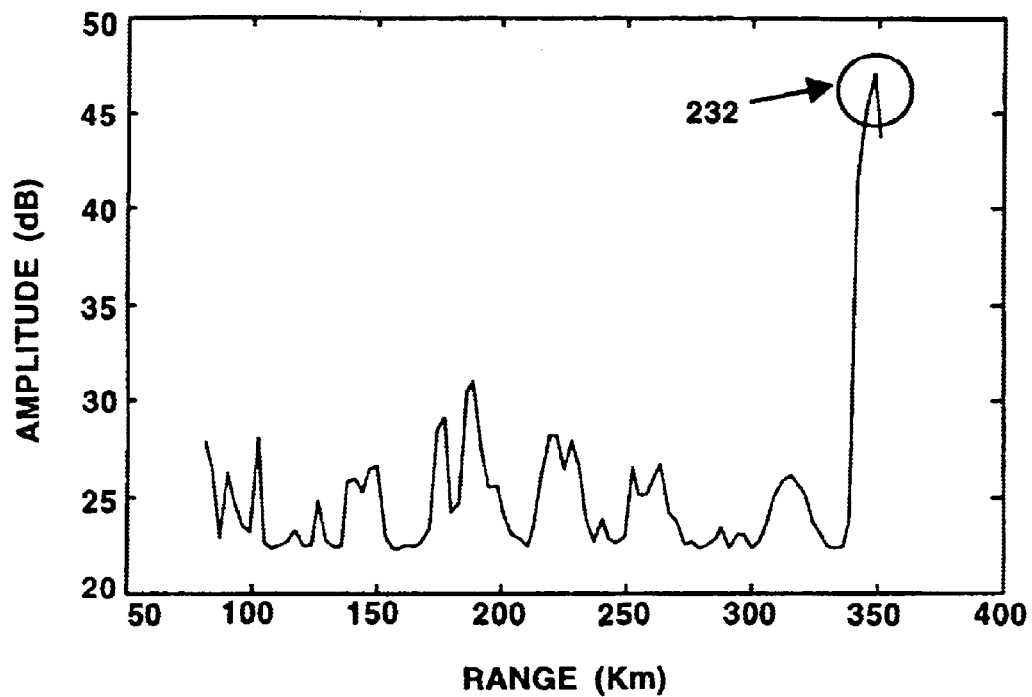
FIG. 31c is a slice along the range dimension of the high-resolution range-doppler plot of FIG. 31a at the doppler frequency of the target.
Figure 31D:
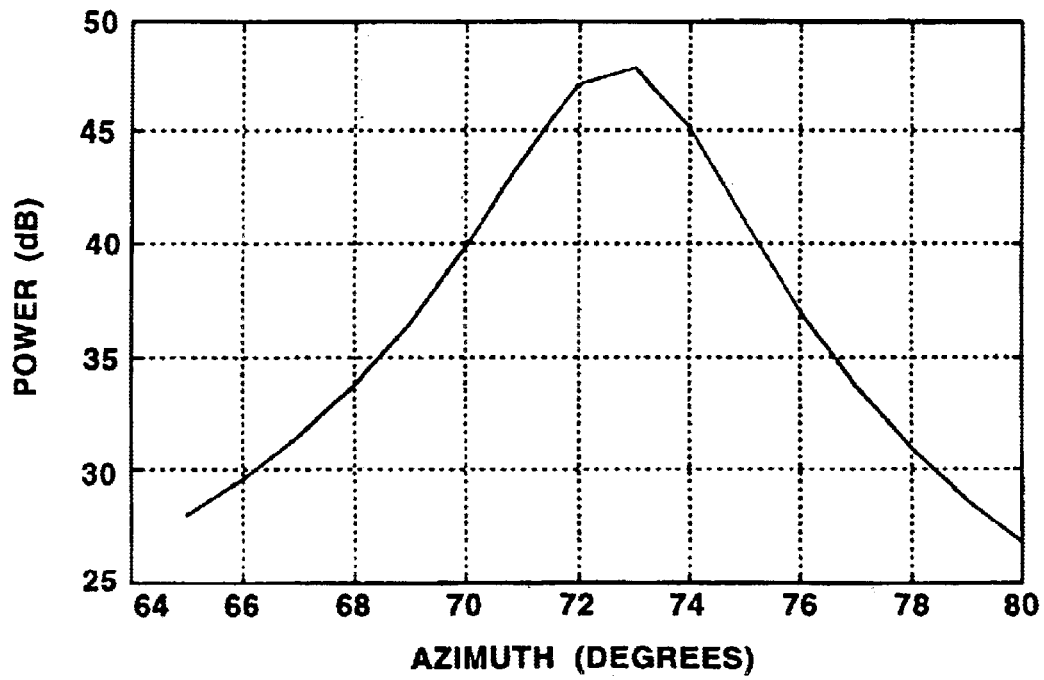
FIG. 31d is a high-resolution azimuthal plot of the radar data of FIG. 31a at the range and doppler frequency of the target.

Referring now to FIGS. 31a to 31d, the performance of the spectral estimation method 250 utilizing forward/backward spatial smoothing and a noise subspace based on the 13 smallest singular values was evaluated on the same radar data for which the high-resolution plots of FIGS. 24a to 24d were generated. FIGS. 24a to 24d were generated using the spectral estimation method with 13 singular values used to determine the noise subspace. FIG. 31a shows the high-resolution range-doppler plot. There is not as much clutter in FIG. 31a as there was in FIG. 24a. FIG. 31b shows the high-resolution doppler plot at the range of the target 232. FIG. 31c shows the high-resolution range plot at the doppler frequency of the target 232. FIG. 31d shows the high-resolution azimuthal plot at the range and doppler frequency of the target 232. Upon comparing FIG. 31b with FIG. 24b, FIG. 31c with FIG. 24c and FIG. 31d with FIG. 24d, the use of spatial smoothing has enhanced the amplitude of the target 232 with respect to the surrounding background noise in each of the doppler, range and azimuthal plots. The target 232 has an SSCR of approximately 23 dB.

Figure 32:
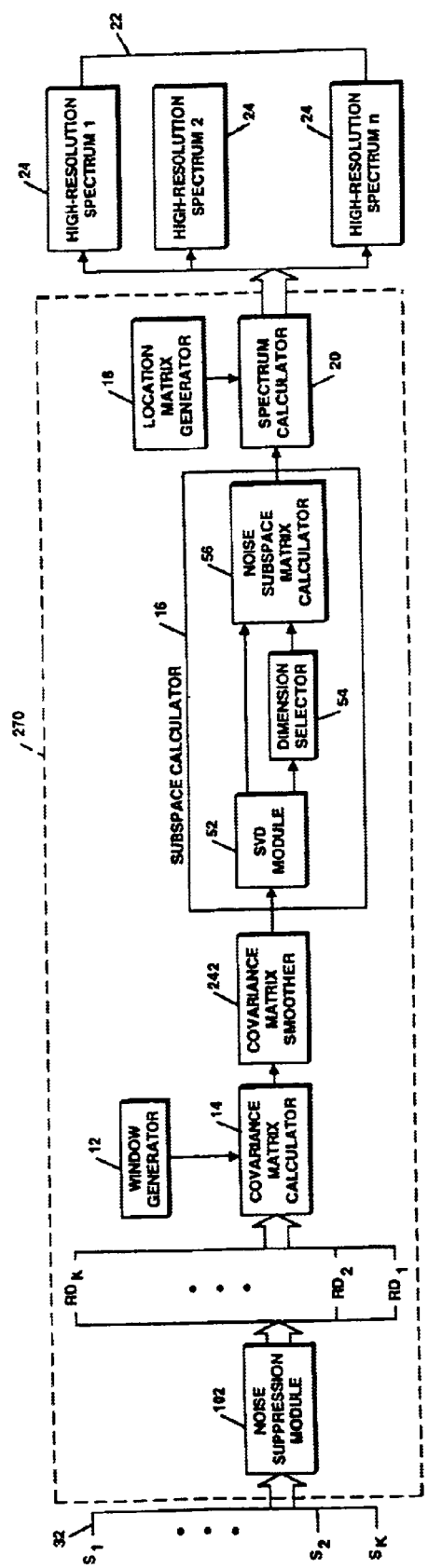
FIG. 32 is an alternate embodiment of the spectral generator in accordance with the present invention incorporating a noise suppression module and a covariance matrix smoother.

The embodiments of the various spectral generators described herein may be combined into one spectral generator. Referring now to FIG. 32, shown therein is an alternative embodiment of a spectral generator 270 in which the spectral generator 10 is combined with the noise suppression module 102 and the covariance matrix smoother 242. The spectral generator 270 contains the noise suppression benefits of high-resolution spectral estimation, external interference suppression and spatial smoothing. The components of the spectral generator 270 have been previously described and will not be further discussed.

Figure 33:
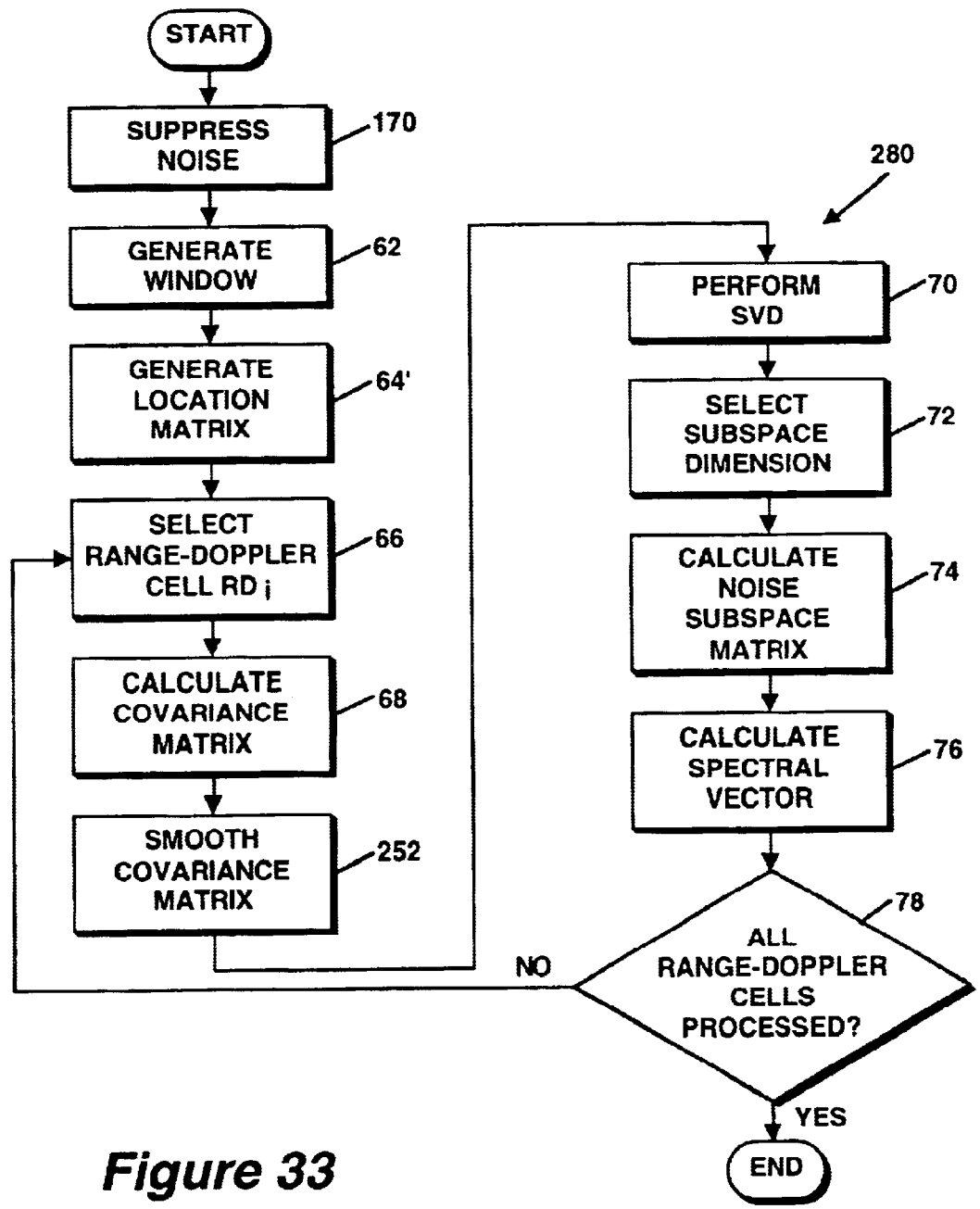
FIG. 33 is an alternative embodiment of the spectral generation method in accordance with the present invention incorporating noise suppression and covariance matrix smoothing steps.

The embodiments of the various spectral generation methods described herein may also be combined into one spectral generation method. Referring now to FIG. 33, shown therein is an alternative embodiment of a spectral generation method 280 in which the spectral generation method 10 is combined with the noise suppression method 170 and the spatial smoothing step 252. All of these steps have been previously described and will not be further discussed.

Figure 34:
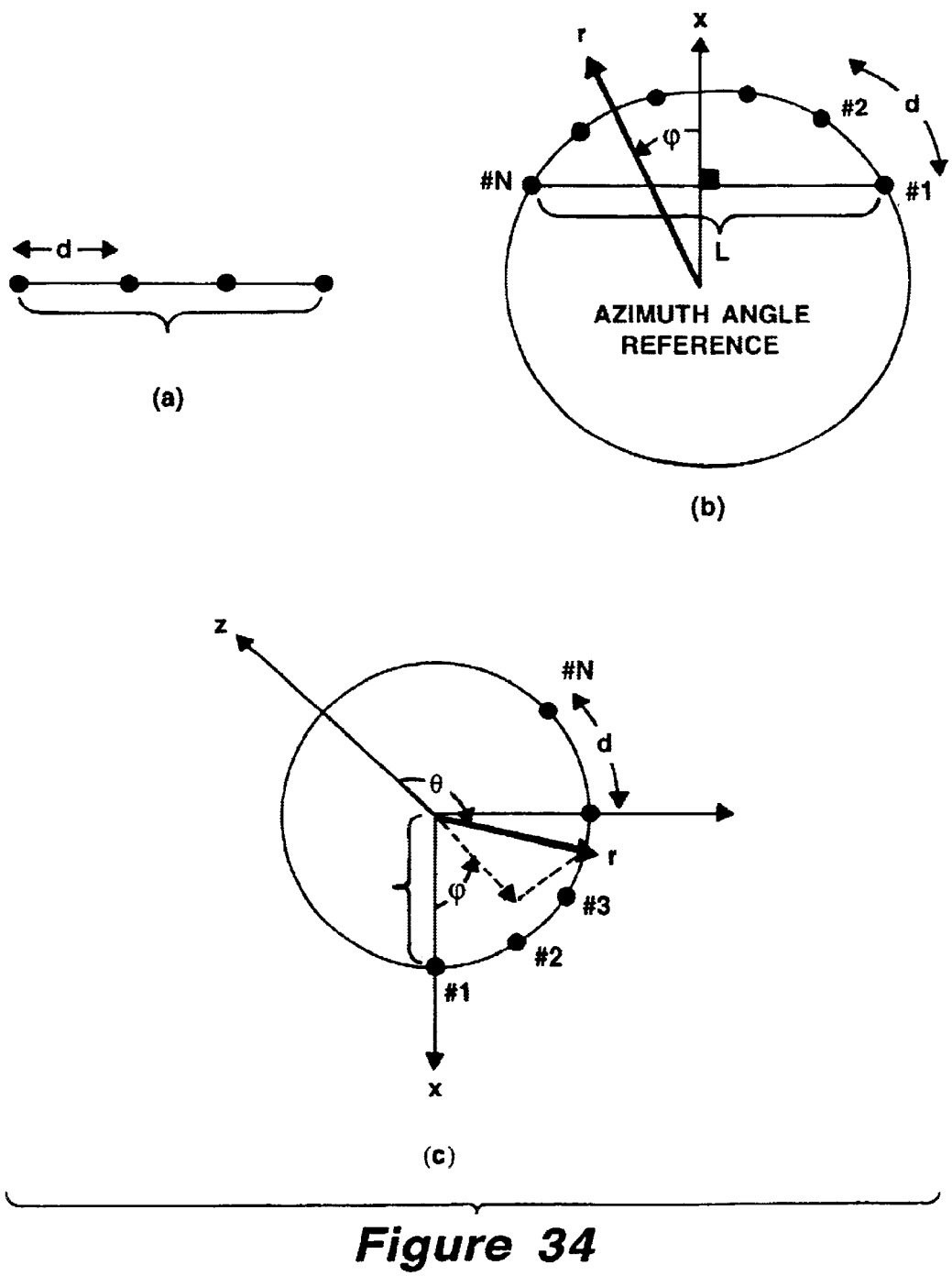
FIG. 34a is a diagram of a linear array.
FIG. 34b is a diagram of a uniform circular array.
FIG. 34c is a diagram of a uniform circular array showing the physical quantities represented by the symbols used in the array manifold.

The spectral generators 10, 100, 240 and 270 and the spectral generation methods 60, 170, 250 and 280 described herein may also be applied to a uniform circular array which is an array that has antenna elements that are oriented in a circular fashion. Accordingly, a uniform circular array may have antenna elements that form a circle or an arc of a circle. FIG. 34 shows a linear array (FIG. 34a) and a uniform circular array (FIG. 34b). In the case of a uniform circular array, each location vector in the array manifold or location matrix A is a function of φ and θ according to equations 37 and 38:

$$A = [A_{\phi 1}, A_{\phi 2}, A_{\phi 3}, \ldots, A_{100\,z}], \quad -\pi \leq \phi i \leq \pi \qquad (37)$$

$$A = [A_{\phi 1}, A_{\phi 2}, A_{\phi 3}, \ldots, A_{\phi z}], \quad -\pi \leq \phi_i \leq \pi \qquad (37)$$

$$A_i(\phi, \theta) = \qquad (38)$$

$$\left[ e^{j\frac{2\pi}{\lambda} R\sin(\phi)\cos(\phi)} e^{j\frac{2\pi}{\lambda} R\sin(\phi)\cos\left(\phi\frac{d}{R}\right)} \ldots e^{j\frac{2\pi}{\lambda} R\sin(\phi)\cos\left(\phi-\frac{(N-1)d}{R}\right)} \right]^T$$

where n=1, 2, . . . , N, R is the radius of the circle defined by the uniform circular array and N≦2πR/d where the various elements are shown in FIG. 34c. The symbol θ is elevation and is bounded by 0 and 90 degrees. The symbol φ is azimuth and is bounded by 0 and 360 degrees. The symbol r is a wave unit vector. The antenna elements of the uniform circular array would be omni-directional. A uniform circular array may be installed in small islands or on large ships to provide up to 360 degree azimuthal coverage and also estimates of target elevation angle. The high resolution techniques of the present invention can be used with uniform circular arrays to increase the radar angular resolution and improve ocean clutter suppression by substituting the location matrix A given by equations 37 and 38 into the appropriate formulas that were shown above.

The elements of the spectral generators 10, 100, 240 and 270 described herein may be implemented through any means known in the art although the use of dedicated hardware such as a digital signal processor may be preferable. Alternatively, discrete components such as filters, comparators, multipliers, shift registers, memory and the like may also be used. Furthermore, certain components of the spectral generators 10, 100, 240 and 270 may be implemented by the same structure. For instance, the first doppler processing module 106 and the second doppler processing module 114 may be the same structure.

Alternatively, the elements of the alternative embodiments disclosed herein may preferably be implemented via a computer program which may be written in Matlab, C, C++, LABVIEW™ (LABVIEW™ is a trademark of National Instruments Corporation for computer programs and instructional manuals) or any other suitable programming language embodied in a computer readable medium on a computing platform having an operating system and the associated hardware and software that is necessary to implement the spectral generators 10, 100, 240 and 270. The computer program would comprise computer instructions that are adapted to perform the steps of the various spectral generation methods 60, 170, 250 and 280. The computer programs may comprise modules or classes, as is known to those skilled in object oriented programming, that are implemented and structured according to the structure of the spectral generators 10, 100, 240 and 270. Accordingly, separate software modules may be designed for each component of the spectral generators 10, 100, 240 and 270. Alternatively, the functionality of these components may be combined into a smaller number of software modules where appropriate.

It should be understood that various modifications can b e made to the preferred embodiments described and illustrated and illustrated herein, without departing from the present invention, the scope of which is defined in the appended claims.

What is claimed is:

1. A spectral generator for radar comprising:
   a) a window generator for generating a window, said window defining a plurality of range-doppler cells;
   b) a covariance matrix calculator in communication with said window generator to for calculating a covariance matrix estimate for a range-doppler cell of interest in said window from pre-processed range-doppler-sensor data, wherein said covariance matrix estimate is obtained from covariance matrices calculated for at least a portion of said plurality of range-doppler cells within said window; and,
   c) a spectral calculator, in communication with said covariance matrix calculator, for calculating a high-resolution spectral vector based on a location matrix, and a noise subspace matrix estimate, said noise subspace matrix estimate being derived from said covariance matrix estimate.

2. The spectral generator of claim 1, wherein said covariance matrix calculator generates said covariance matrix estimate according to a weighted average of said covariance matrices, and said window generator defines weights used in said weighted average.

3. The spectral generator of claim 2, wherein said window generator varies the size of said window according to a radar mode of operation.

4. The spectral generator of claim 2, wherein said window generator varies the weights in said window according to a radar mode of operation.

5. The spectral generator of claim 2, wherein said window has at least two regions comprising a first region at an inner portion of said window and a second region surrounding said first region, wherein the weights in said second region are less than or equal to the weights in said first region.

6. The spectral generator of claim 2, wherein said window has three regions comprising a first region at an inner portion of said window, a second region surrounding said first region, and a third region surrounding said first region, wherein the weights in said second region are less than or equal to the weights in said first region and the weights in said third region are less than or equal to the weights in said second region.

7. The spectral generator of claim 1, wherein said spectral generator further comprises:
   a) a subspace calculator in communication with said covariance matrix calculator for receiving said covariance matrix estimate and calculating said noise subspace matrix estimate based on at least a portion of the noise subspace of said covariance matrix estimate; and,
   b) a location matrix generator, in communication with said spectral calculator, for generating said location matrix to have at least one location vector defining an azimuth for which said high-resolution spectral vector is generated.

8. The spectral generator of claim 7, wherein said subspace calculator comprises:
   a) a Singular Value Decomposition (SVD) module for receiving said covariance matrix estimate and performing a singular value decomposition thereon;
   b) a dimension selector, in communication with said SVD module, for selecting a dimension b for said noise subspace; and,
   c) a noise subspace matrix calculator, in communication with said dimension selector and said SVD module, for calculating said noise subspace matrix estimate.

9. The spectral generator of claim 1, wherein said spectral calculator is adapted to calculate said high-resolution spectral vector according to $$MUS_{RDC} = \frac{1}{diag(A^H \cdot N_{est} \cdot N_{est}^H \cdot A)}$$

where A is said location matrix and $N_{est}$ is said noise subspace matrix estimate.

10. The spectral generator of claim 9, wherein a location vector $A_{\theta i}$ in the location matrix A is given by $A_{\theta i}=[1 \ e^{j2\pi(d/\lambda)sin(\theta i)} \ e^{j4\pi(d/\lambda)sin(\theta i)} \ldots \ e^{j2\pi(K-1)d/\lambda sin(\theta i)}]^T$ where d is the spacing of a linear array that provides said range-doppler-sensor data, K is the number of sensors in the linear array, $\theta_i$ is an azimuth angle and $\lambda$ is the wavelength of transmitted radar pulses.

11. The spectral generator of claim 9, wherein a location vector $A_i(\phi,\theta)$ in the location matrix A is given by $$A_i(\phi, \theta) = \left[ e^{j\frac{2\pi}{\lambda}Rsin(\phi)cos(\phi)} e^{j\frac{2\pi}{\lambda}Rsin(\phi)cos(\phi)\left(\phi\frac{d}{R}\right)} \ldots e^{j\frac{2\pi}{\lambda}Rsin(\phi)cos\left(\phi-\frac{(N-1)d}{R}\right)} \right]^T$$

where d is the circumferential spacing between adjacent sensors in a uniform circular array, N is the number of sensors in the uniform circular array, $\phi$ is an azimuthed angle, $\theta$ is an elevation angle and R is the radius of the uniform circular array.

12. The spectral generator of claim 1, wherein said spectral generator further comprises a covariance matrix smoother, in communication with said covariance matrix calculator for smoothing said covariance matrix estimate by averaging two or more forward covariance matrices where each forward covariance matrix ($C_{Fi}$) is obtained from said covariance matrix estimate ($C_{est}$) according to $C_{Fi}=C_{est}$(i: (K+1−G+i−1), i:(K+1−G+i−1)).

13. The spectral generator of claim 1, wherein said spectral generator further comprises a covariance matrix smoother, in communication with said covariance matrix calculator for smoothing said covariance matrix estimate by averaging two or more backward covariance matrices where each backward covariance matrix ($C_{Bi}$) is obtained from said covariance matrix estimate ($C_{est}$) according to $C_{Bi}=C*((K+1−i):(G+1−i), (K+1−i):(G+1−i))$.

14. The spectral generator of claim 1, wherein said spectral generator further comprises a covariance matrix smoother, in communication with said covariance matrix calculator, for smoothing said covariance matrix estimate by averaging at least one forward covariance matrix and at least one backward covariance matrix where each forward covariance matrix ($C_{Fi}$) and each backward covariance matrix ($C_{Bi}$) is obtained from said covariance matrix estimate ($C_{est}$) according to $C_{Fi}=C_{est}$(i:(K+1−G+i1), i:(K+1G+i−1)) and $C_{Bi}=C*((K+1−i):(G+1−i), (K+1−I):(G+1−i))$.

15. The spectral generator of claim 1, wherein the spectral generator further comprises a noise suppression module, in communication with said covariance matrix calculator, for providing noise suppressed radar data instead of said pre-processed range-doppler-sensor data to said covariance matrix calculator, said noise suppression module estimating external interference in said pre-processed radar data and suppressing said external interference to produce said noise suppressed radar data.

16. The spectral generator of claim 15, wherein the noise suppression module comprises:

a) a first processing module for receiving said pre-processed radar data and producing matched radar data;

b) a second processing module for receiving said pre-processed radar data and producing mis-matched radar data;

c) an adaptive beamformer in communication with said processing modules, for receiving a portion of matched and mis-matched radar data producing an estimate of external interference in said portion of matched radar data; and, d) a suppressor, in communication with said first processing module and said adaptive beamformer, for providing a portion of said noise suppressed radar data by suppressing said estimate of external interference from said portion of matched radar data.

17. A method of spectral generation for radar, said method comprising:

a) generating a window that defines a plurality of range-doppler cells;

b) calculating a covariance matrix estimate for a range-doppler cell of interest in said window from pre-processed range-doppler-sensor data, wherein said covariance matrix estimate is generated from covariance matrices calculated for at least a portion of said plurality of range-doppler cells within said window; and, c) calculating a high-resolution spectral vector based on a location matrix and a noise subspace matrix estimate, said noise subspace matrix estimate being derived from said covariance matrix estimate.

18. The spectral generation method of claim 17, wherein step (b) includes calculating said covariance matrix estimate based on a weighted average of said covariance matrices wherein said window defines weights used in said weighted average.

19. The spectral generation method of claim 18, wherein step (a) includes varying the size of said window according to a radar mode of operation.

20. The spectral generation method of claim 18, wherein step (a) includes varying the weights in said window according to a radar mode of operation.

21. The spectral generation method of claim 17, wherein step (c) includes:

d) calculating said noise subspace matrix estimate based on at least a portion of the noise subspace of said covariance matrix estimate; and, e) generating said location matrix having at least one location vector defining an azimuth for which said high-resolution spectral vector is generated.

22. The spectral generation method of claim 21, wherein step (d) includes:

i) performing a singular value decomposition of said covariance matrix estimate;

ii) selecting a dimension for said noise subspace; and, iii) calculating said noise subspace matrix estimate.

23. The spectral generation method of claim 17, wherein step (c) includes calculating said high-resolution spectral vector according to $$MUS_{RDC} = \frac{1}{diag(A^H \cdot N_{est} \cdot N_{est}^H \cdot A)}$$

where A is said location matrix and $N_{est}$ is said noise subspace matrix estimate.

24. The spectral generation method of claim 17, wherein said method further comprises smoothing said covariance matrix estimate by averaging two or more forward covariance matrices where each forward covariance matrix ($C_{Fi}$) is obtained from said covariance matrix estimate ($C_{est}$) according to $C_{Fi}=C_{est}(i:(K+1-G+i-1), i:(K+1-G+i-1))$.

25. The spectral generation method of claim 17, wherein said method further comprises smoothing said covariance matrix estimate by averaging two or more backward covariance matrices where each backward covariance matrix ($C_{Bi}$) is obtained from said covariance matrix estimate ($C_{est}$) according to $C_{Bi}=C*((K+1-i):(G+1-i), (K+1-i):(G+1-i))$.

26. The spectral generation method of claim 17, wherein said method further comprises smoothing said covariance matrix estimate by averaging at least one forward covariance matrix and at least one backward covariance matrix where each forward covariance matrix ($C_{Fi}$) and each backward covariance matrix ($C_{Bi}$) is obtained from said covariance matrix estimate ($C_{est}$) according to $C_{Fi}=C_{est}(i:(K+1-G+i-1), i:(K+1-G+i-1))$ and $C_{Bi}=C*((K+1-i):(G+1-i), (K+1-i):(G+1-i))$.

27. The spectral generation method of claim 17, wherein said method further comprises a step of suppressing noise to provide noise suppressed radar data instead of said pre-processed range-doppler-sensor data in step (b), said step of suppressing noise is effected by estimating external interference in said pre-processed radar data and suppressing said external interference to produce said noise suppressed radar data.

28. The spectral generation method of claim 27, wherein said step of suppressing noise comprises:
  i) processing pre-processed radar data to produce matched radar data;
  ii) processing pre-processed radar data to produce mis-matched radar data;
  iii) selecting a portion of said matched and said mis-matched radar data and performing adaptive beam-forming to produce an estimate of external interference in said portion of matched radar data; and,
  iv) producing a portion of said noise suppressed radar data by suppressing said estimate of external interference from said portion of matched radar data.

29. A noise suppression module for suppressing external interference in pre-processed radar data, said noise suppression module comprising:
  a) a first processing module, in communication with said pre-processed radar data for producing matched radar data;
  b) a second processing module, in communication with said pre-processed radar data for producing mis-matched radar data;
  c) an adaptive beamformer in communication with said processing modules for receiving a portion of matched radar data and a portion of mis-matched radar data, and for producing an estimate of external interference in said portion of matched radar data; and,
  d) a suppressor, in communication with said first processing module and said adaptive beamformer, for providing a portion of noise suppressed radar data by suppressing said estimate of external interference from said portion of matched radar data.

30. The noise suppression module of claim 29, wherein the module further comprises a storage means, in communication with said suppressor for storing radar data.

31. The noise suppression module of claim 29, wherein said first processing module comprises:
  a) a matched filter module, in communication with said pre-processed radar data for producing matched range-pulse-sensor data;
  b) a first doppler processing module, in communication with said matched filter module for producing matched range-doppler-sensor data; and,
  c) a sensor selector, in communication with said first doppler processing module for selecting matched range-doppler data for a given sensor.

32. The noise suppression module of claim 29, wherein said second processing module comprises:
  a) a mis-matched filter module, in communication with said pre-processed radar data for producing mis-matched range-pulse-sensor data;
  b) a second doppler processing module, in communication with said mis-matched filter module for producing mis-matched range-doppler-sensor data; and,
  c) an auxiliary array selector in communication with said second doppler processing module for selecting at least a portion of said plurality of sensors to construct a virtual auxiliary sensor array and provide mismatched range-doppler-sensor data for said virtual auxiliary sensor array.

33. The noise suppression module of claim 29, wherein said second processing module comprises:
  a) a mis-matched filter module, in communication with said pre-processed radar data for producing mis-matched range-pulse-sensor data;
  b) an auxiliary array selector, in communication with said mis-matched filter module for selecting at least a portion of said plurality of sensors to construct a virtual auxiliary sensor array and provide mismatched range-pulse-sensor data for said virtual auxiliary sensor array; and,
  c) a second doppler processing module in communication with said auxiliary array selector for producing mis-matched range-doppler-sensor data for said virtual auxiliary sensor array.

34. The noise suppression module of claim 29, wherein said second processing module comprises:
  a) an auxiliary array selector, in communication with pre-processed radar data for selecting at least a portion of said plurality of sensors to construct a virtual auxiliary sensor array and provide pre-processed radar data for said virtual auxiliary sensor array;
  b) a mis-matched filter module, in communication with said auxiliary array selector for producing mis-matched range-pulse-sensor data for said auxiliary sensor array; and,
  c) a second doppler processing module, in communication with said mis-matched filter module for producing mis-matched range-doppler-sensor data for said auxiliary sensor array.

35. The noise suppression module of claim 29, wherein said adaptive beamformer comprises:
  a) an autocorrelation matrix calculator, in communication with said second processing module for calculating the autocorrelation matrix of said portion of mis-matched radar data;
  b) a matrix inverter, in communication with said autocorrelation matrix calculator for providing an inverse autocorrelation matrix;
  c) a cross-correlator, in communication with said processing modules for providing the cross-correlation of said portion of mis-matched radar data and said portion of matched radar data;
  d) a weight calculator, in communication with said matrix inverter and said cross-correlator for calculating an adaptive weight vector based on said inverse autocorrelation matrix and said cross-correlation; and, e) an auxiliary beam generator, in communication with said second processing module and said weight calculator for providing said estimate of external interference based on said adaptive weight vector and said portion of mis-matched radar data.

36. The noise suppression module of claim 29, wherein said suppressor comprises:

a) a subtractor, in communication with said first processing module and said adaptive beamformer for subtracting said estimate of external interference from said portion of matched radar data to provide a subtraction signal; and, b) a minimizer, in communication with said subtractor and said first processing module for providing a portion of said noise suppressed radar based on said subtraction signal and said portion of matched radar data.

37. The noise suppression module of claim 29, wherein said noise suppression module further comprises an ordered-statistics filter module, in communication with said first processing module for producing ordered-statistics filtered matched radar data.

38. The noise suppression module of claim 37, wherein said ordered-statistics filter module performs median filtering.

39. The noise suppression module of claim 37, wherein said adaptive beamformer comprises:

a) an autocorrelation matrix calculator, in communication with said second processing module for calculating the autocorrelation matrix of said portion of mis-matched radar data;

b) a matrix inverter, in communication with said autocorrelation matrix calculator for providing an inverse autocorrelation matrix;

c) a cross-correlator, in communication with said ordered-statistics filter module and said second processing module for providing the cross-correlation of said portion of mis-matched radar data and a portion of ordered-statistics filtered matched radar data;

d) a weight calculator, in communication with said matrix inverter and said cross-correlator for calculating an adaptive weight vector based on said inverse autocorrelation matrix and said cross-correlation; and, e) an auxiliary beam generator, in communication with said second processing module and said weight calculator for producing said estimate of external interference based on said adaptive weight vector and said portion of mis-matched radar data.

40. A method of suppressing external interference in pre-processed radar data, said method comprising:

a) processing said pre-processed radar data to produce matched radar data;

b) processing said pre-processed radar data to produce mis-matched radar data;

c) selecting a portion of said matched radar data and a portion of said mis-matched radar data and performing adaptive beamforming to produce an estimate of the external interference in said portion of matched radar data; and, d) producing a portion of noise suppressed radar data by suppressing said estimate of external interference from said portion of matched radar data.

41. The method of claim 40, wherein said method further comprises:

e) storing said portion of noise suppressed radar data.

42. The method of claim 40, wherein step (a) comprises:

i) match filtering said radar data to produce matched range-pulse-sensor data;

ii) doppler processing said matched range-pulse-sensor data to produce matched range-doppler-sensor data; and, iii) selecting a portion of matched range-doppler data for a given sensor.

43. The method of claim 40, wherein step (b) comprises:

i) mis-match filtering said pre-processed radar data to produce mis-matched range-pulse-sensor data;

ii) doppler processing said mis-matched range-pulse sensor data to produce mis-matched range-doppler-sensor data; and, iii) constructing a virtual auxiliary sensor array from at least a portion of said plurality of sensors to provide mis-matched range-doppler-sensor data for said virtual auxiliary sensor array.

44. The method of claim 40, wherein step (b) comprises:

i) mis-match filtering said pre-processed radar data to produce mis-matched range-pulse-sensor data;

ii) constructing a virtual auxiliary sensor array from at least a portion of said plurality of sensors to provide mismatched range-pulse-sensor data for said virtual auxiliary sensor array; and, iii) doppler processing said mis-matched range-pulse sensor data from said virtual auxiliary sensor array to produce mis-matched range-doppler-sensor data for said virtual auxiliary sensor array.

45. The method of claim 40, wherein step (b) comprises:

i) constructing a virtual auxiliary array from at least a portion of said plurality of sensors to provide pre-processed radar data for said virtual auxiliary sensor array;

ii) mis-match filtering said pre-processed radar data from said virtual auxiliary sensor array to produce mis-matched range-pulse-sensor data for said auxiliary sensor array; and, iii) doppler processing said mis-matched range-pulse-sensor data to produce mis-matched range-doppler-sensor data for said virtual auxiliary sensor array.

46. The method of claim 40, wherein step (c) comprises:

i) autocorrelating said portion of mis-matched radar data to produce an autocorrelation matrix;

ii) inverting said autocorrelation matrix to produce an inverse autocorrelation matrix;

iii) cross-correlating said portion of mis-matched radar data and said portion of matched radar data to produce a cross-correlation vector;

iv) calculating an adaptive weight vector; and, v) generating an auxiliary beam to produce said estimate of external interference.

47. The method of claim 40, wherein step (d) comprises:

i) subtracting said estimate of external interference from said portion of matched radar data to produce a subtraction signal; and, ii) producing said portion of noise suppressed matched radar data based on said subtraction signal and said portion of matched radar data.

48. The method of claim 40, wherein said method further comprises performing ordered-statistics filtering on said matched radar data to produce ordered-statistics filtered matched radar data.

49. The method of claim 48, wherein said ordered-statistics filtering comprises median filtering.

50. The method of claim 48, wherein step (c) comprises:
   i) autocorrelating said portion of mis-matched radar data to produce an autocorrelation matrix;
   ii) inverting said autocorrelation matrix to produce an inverse autocorrelation matrix;
   iii) cross-correlating said portion of mis-matched radar data and a portion of ordered-statistics filtered matched radar data to produce a cross-correlation vector;
   iv) calculating an adaptive weight vector; and,
   v) generating an auxiliary beam to produce said external interference estimate.

* * * * *

UNITED STATES PATENT AND TRADEMARK OFFICE
CERTIFICATE OF CORRECTION

PATENT NO. : 6,822,606 B2
APPLICATION NO. : 10/383775
DATED : November 23, 2004
INVENTOR(S) : Ponsford et al.

It is certified that error appears in the above-identified patent and that said Letters Patent is hereby corrected as shown below:

Column 18, line 43 delete "MUSRDC" and replace with --$MUS_{rdc}$--.

Column 24, line 42 delete "$B_R$" and replace with --$B_r$--.

Column 36, lines 48-49 delete

" $$C_{FS} = \frac{C_{F,1} + C_{F,2} + \ldots + C_{F,G}}{G} \qquad (28)$$ "

and replace with

-- " $$C_{FS} = \frac{C_{F,1} + C_{F,2} + \ldots + C_{F,G}}{G} \qquad (28)$$ --.

Column 36, line 64 delete

" $$C_{B,i}^{(K+1-G) \times CK+1-G)} = C^{K \times K}((K+1-i):(G+i-1),(K+1-i):G+1i))^{*} \quad (32)$$ "

and replace with

-- $$C_{B,i}^{(K+1-G) \times (K+1-G)} = C^{K \times K}((K+1-i):(G+i-1),(K+1-i):(G+1-i))^{*} \quad (32)$$ --

Column 37, lines 4-5 delete

" $$C_{BS} = \frac{C_{B,1} + C_{B,2} + \ldots + C_{B,G}}{G} \qquad (33)$$ "

and replace with

-- $$C_{BS} = \frac{C_{B,1} + C_{B,2} + \ldots + C_{B,G}}{G} \qquad (33)$$ --

Column 37, line 53 delete "show therein" and replace with --shown therein--.

UNITED STATES PATENT AND TRADEMARK OFFICE
CERTIFICATE OF CORRECTION

PATENT NO. : 6,822,606 B2
APPLICATION NO. : 10/383775
DATED : November 23, 2004
INVENTOR(S) : Ponsford et al.

It is certified that error appears in the above-identified patent and that said Letters Patent is hereby corrected as shown below:

Column 39, line 10 delete "$A=[A_{\Phi 1}, A_{\Phi 2}, A_{\Phi 3}, \ldots, A_{100\ Z}], -\pi \leq \Phi_i \leq \pi$ (37)"

Column 39, lines 66-67 delete "b e" and replace with --be--.

Column 40, line 1 delete "and illustrated".

Column 40, line 9 delete "to for calculating" and replace with --for calculating--.

Column 41, line 53 delete "(i:(K+1-G+i1), i:(K+1G+i-1))"

and replace with --(i:K+1-G+i-1), i:(K+1-G+i-1)) --.

Signed and Sealed this

Twenty-sixth Day of September, 2006

JON W. DUDAS
*Director of the United States Patent and Trademark Office*